(12) United States Patent
Engerman

(10) Patent No.: US 11,692,617 B2
(45) Date of Patent: Jul. 4, 2023

(54) MULTI-SPEED GEARBOX AND THE DRIVE AXLE MADE THEREWITH

(71) Applicant: Dana Automotive Systems Group, LLC, Maumee, OH (US)

(72) Inventor: Eric M. Engerman, Novi, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 17/650,646

(22) Filed: Feb. 10, 2022

(65) Prior Publication Data

US 2022/0163101 A1 May 26, 2022

Related U.S. Application Data

(63) Continuation of application No. 16/582,393, filed on Sep. 25, 2019, now Pat. No. 11,280,391.

(60) Provisional application No. 62/767,360, filed on Nov. 14, 2018, provisional application No. 62/736,440, filed on Sep. 25, 2018.

(51) Int. Cl.
*B60K 1/00* (2006.01)
*F16H 37/04* (2006.01)

(52) U.S. Cl.
CPC ...... *F16H 37/042* (2013.01); *B60K 2001/001* (2013.01); *F16H 2200/0021* (2013.01); *F16H 2200/0034* (2013.01); *F16H 2200/20* (2013.01); *F16H 2200/2094* (2013.01); *F16H 2702/02* (2013.01)

(58) Field of Classification Search
CPC ........... F16H 37/042; F16H 2200/0034; F16H 2200/20; F16H 2200/2094; F16H 2702/02; F16H 2200/0021; F16H 3/091; F16H 3/08; F16H 3/093; B60K 2001/001
See application file for complete search history.

(56) References Cited

U.S. PATENT DOCUMENTS

| 6,044,719 | A | 4/2000 | Reed, Jr. et al. |
| 8,441,161 | B2 | 5/2013 | Makino et al. |
| 8,678,969 | B2 | 3/2014 | Sato et al. |
| 8,777,796 | B2 | 7/2014 | Petersen et al. |
| 8,974,341 | B2 * | 3/2015 | Smetana ................ H02K 7/112 |
| | | | 475/8 |

(Continued)

FOREIGN PATENT DOCUMENTS

| AT | 512942 A4 | 12/2013 |
| CN | 102392885 A * | 3/2012 |

(Continued)

OTHER PUBLICATIONS

European Patent Office, Extended European Search Report Issued in Application No. 19199469.8, dated Nov. 25, 2020, Germany, 12 pages.

*Primary Examiner* — Sherry L Estremsky
(74) *Attorney, Agent, or Firm* — McCoy Russell LLP

(57) ABSTRACT

A drive axle of a vehicle includes an electric motor having an output shaft. At least one of a gear and a planetary gear set is operably connected to the output shaft of the electric motor. The at least one of the gear and the planetary gear set is operably connected to a differential configured to transfer torque to two axle half shafts of the vehicle. At least one clutch configured to facilitate a plurality of gear ratios between the electric motor and the differential.

13 Claims, 17 Drawing Sheets

(56) References Cited

U.S. PATENT DOCUMENTS

| | | | |
|---|---|---|---|
| 8,979,695 B2* | 3/2015 | Smetana | B60K 1/00 |
| | | | 192/48.91 |
| 9,039,559 B2 | 5/2015 | Gassmann | |
| 9,062,744 B2 | 6/2015 | Valente et al. | |
| 9,140,335 B2* | 9/2015 | Knoblauch | B60K 17/046 |
| 9,707,834 B2 | 7/2017 | Lee et al. | |
| 9,739,355 B2 | 8/2017 | Khanzode et al. | |
| 9,822,860 B2* | 11/2017 | Kaltenbach | B60K 1/00 |
| 9,951,850 B2 | 4/2018 | Kramer et al. | |
| 10,744,862 B2* | 8/2020 | Sekiguchi | B60K 25/00 |
| 11,207,962 B2* | 12/2021 | Engerman | F16H 37/042 |
| 2011/0218716 A1 | 9/2011 | Olsson et al. | |
| 2014/0256493 A1 | 9/2014 | Knoblauch | |
| 2016/0312870 A1 | 10/2016 | Peterson et al. | |
| 2016/0348734 A1 | 12/2016 | Sten | |
| 2017/0136867 A1 | 5/2017 | Holmes et al. | |
| 2019/0017573 A1* | 1/2019 | Schilder | B60K 1/04 |

FOREIGN PATENT DOCUMENTS

| | | | | |
|---|---|---|---|---|
| CN | 106945515 A | 7/2017 | | |
| DE | 102011110258 A1 | 12/2011 | | |
| DE | 102010031746 A1 | 1/2012 | | |
| DE | 102012213859 A1 * | 2/2014 | | B60K 1/00 |
| DE | 102012220971 A1 | 5/2014 | | |
| DE | 102015104203 A1 | 9/2016 | | |
| DE | 102015016939 A1 | 6/2017 | | |
| DE | 102016212867 A1 * | 1/2018 | | |
| DE | 102016212867 A1 | 1/2018 | | |
| EP | 2511570 A1 | 10/2012 | | |
| JP | H05116549 A | 5/1993 | | |
| JP | 6338003 B1 * | 6/2018 | | B60K 1/00 |
| WO | 2014005698 A1 | 1/2014 | | |
| WO | WO-2017108168 A1 * | 6/2017 | | B60K 1/00 |
| WO | WO-2017185901 A1 * | 11/2017 | | B60K 1/00 |

* cited by examiner 100, 200, 300, 400, 500, 600, 700,
800, 1100, 1200, 1300, 1400,
1500, 1600, 1700, 1800, 1900

MULTI-SPEED GEARBOX AND THE DRIVE AXLE MADE THEREWITH

CROSS-REFERENCE TO RELATED APPLICATIONS

The present application is a continuation of U.S. Non-Provisional patent application Ser. No. 16/582,393, entitled "MULTI-SPEED GEARBOX AND THE DRIVE AXLE MADE THEREWITH", and filed on Sep. 25, 2019. U.S. Non-Provisional application Ser. No. 16/582,393 claims priority to U.S. Provisional Application No. 62/736,440, filed Sep. 25, 2018, and 62/767,360, filed Nov. 14, 2018. The entire contents of each of the above-listed applications are hereby incorporated by reference for all purposes.

FIELD

The present disclosure relates to electric drive axles, and more particularly to a multi-speed gearbox for an electric drive axle.

BACKGROUND

Electric and hybrid-electric vehicles utilize an electric power source in communication with an electric motor to provide drive, or augmented drive, to the vehicle. Electric vehicles have several characteristics superior to conventional internal combustion engine driven vehicles. For example, electric motors produce fewer vibrations than internal combustion engines, and electric motors achieve maximum torque more quickly than internal combustion engines.

It would be desirable to produce an electric drive axle having a gear arrangement and differential which generates a plurality of gear ratios, and yet remains compact in size and weight.

SUMMARY

In concordance and agreement with the present disclosure, an electric drive axle having a gear arrangement and differential which generates a plurality of gear ratios, and yet remains compact in size and weight, has surprisingly been discovered.

The present disclosure provides for an electric drive axle for a vehicle. In one embodiment, an electric drive axle, comprises: an electric motor having an output shaft; at least one of a gear and a planetary gear set operably connected to the output shaft, wherein the planetary gear set includes a sun gear, a planet carrier having a plurality of planet gears disposed therein, and an annulus; a differential operably connected to the at least one of the gear and the planetary gear set; and at least one clutch disposed between the electric motor and the differential, wherein the at least one clutch is configured to facilitate a plurality of gear ratios between the electric motor and the differential.

As aspects of certain embodiments, the electric drive axle further comprises an idler shaft disposed parallel to the output shaft, the planetary gear set is selectively coupled to the idler shaft by the at least one clutch.

As aspects of certain embodiments, the idler shaft is fixedly coupled to a stationary structure.

As aspects of certain embodiments, the planet carrier of the planetary gear set is selectively coupled to the idler shaft by the at least one clutch.

As aspects of certain embodiments, the annulus of the planetary gear set is coupled to at least one of a gear disposed about the idler shaft and the at least one clutch.

In another embodiment, an electric drive axle, comprises: an electric motor including a first shaft, wherein a first gear and a second gear are disposed about the first shaft; a second shaft disposed parallel to the first shaft, wherein a third gear and a fourth gear are disposed about the second shaft; a differential operably connected to the electric motor; a first clutch disposed between the electric motor and the differential, wherein the first clutch is configured to facilitate a first gear ratio of the electric drive axle; and a second clutch disposed between the electric motor and the differential, wherein the second clutch is configured to facilitate a second gear ratio of the electric drive axle.

As aspects of certain embodiments, the first clutch is configured to selectively couple one of the first gear and the second gear to the first shaft.

As aspects of certain embodiments, the second clutch is configured to selectively couple one of the first gear and the second gear to the first shaft.

As aspects of certain embodiments, the first clutch is configured to selectively coupled one of the third gear and the fourth gear to the second shaft.

As aspects of certain embodiments, the second clutch is configured to selectively couple one of the third gear and the fourth gear to the second shaft.

As aspects of certain embodiments, at least one of the first and second clutches is one of a sliding collar clutch, a one-way clutch, a wet clutch having a plurality of clutch plates, a dog clutch, and a dog clutch with a synchronizer.

As aspects of certain embodiments, the second clutch is concentrically disposed about the first clutch.

As aspects of certain embodiments, the electric drive axle further comprises a third shaft disposed parallel to at least one of the first and second shafts.

As aspects of certain embodiments, a fifth gear is disposed about one of the second shaft and the third shaft.

As aspects of certain embodiments, a sixth gear is disposed about one of the second shaft and the third shaft.

As aspects of certain embodiments, at least one of the fifth gear and the sixth gear is in operably coupled with at least one of a planetary gear set and the differential.

As aspects of certain embodiments, at least one planetary gear set is disposed between the electric motor and the differential.

As aspects of certain embodiments, the at least one planetary gear set is coupled to at least one of the differential and a fifth gear, and wherein the fifth gear is in meshed engagement with at least one of the third and fourth gears.

As aspects of certain embodiments, the differential is another planetary gear set coupled to the at least one planetary gear set.

In yet another embodiment, an electric drive axle, comprises: an electric motor having an output shaft; a first planetary gear set operably connected to the output shaft, wherein the first planetary gear set includes a sun gear, a planet carrier having a plurality of planet gears disposed therein, and an annulus; a second planetary gear set operably connected to the output shaft, wherein the second planetary gear set includes a sun gear, a planet carrier having a plurality of planet gears disposed therein, and an annulus; a differential operably connected to at least one of the first and second planetary gear sets; and at least one clutch disposed between the electric motor and the differential, wherein the at least one clutch is configured to facilitate a plurality of gear ratios between the electric motor and the differential.

As aspects of certain embodiments, at least one of the sun gear, the planet carrier, and the annulus of the first planetary gear set is selectively coupled to the electric motor by the at least one clutch.

As aspects of certain embodiments, at least one of the sun gear, the planet carrier, and the annulus of the second planetary gear set is selectively coupled to the electric motor by the at least one clutch.

As aspects of certain embodiments, at least one of the sun gear, the planet carrier, and the annulus of the second planetary gear set is selectively coupled to the first planetary gear set by the at least one clutch.

In another embodiment, an electric drive axle, comprises: an electric motor; a first shaft having a first gear coupled thereon; a second gear disposed about the first shaft; a differential operably connected to at least one of the first and second gears; and a movable member coupled to the first shaft and configured to selectively couple one of the first and second gears to the first shaft, wherein the movable member is translatable between a first position and a second position, wherein the movable member in the first position is configured to facilitate a first gear ratio between the electric motor and the differential, and wherein the movable member in the second position is configured to facilitate a second gear ratio between the electric motor and the differential.

As aspects of certain embodiments, the movable member is a collar disposed about the first shaft.

As aspects of certain embodiments, the movable member is coupled to the first shaft by a splined engagement.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

Figure 1:
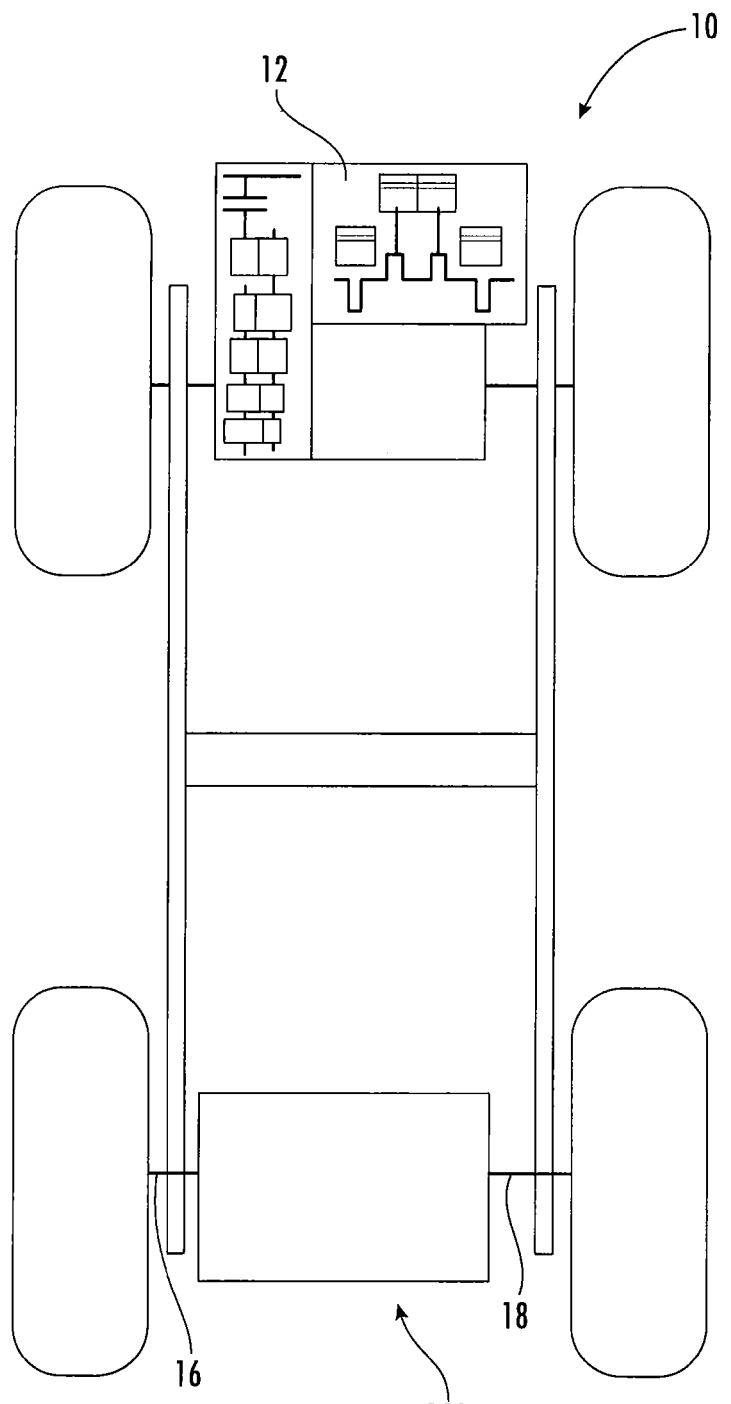
FIG. 1 is a schematic diagram of a vehicle driveline according to an embodiment of the presently disclosed subject matter.

It is to be understood that the presently disclosed subject matter may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

The electric drive axle of the present disclosure has a high or first gear ratio which may be best suitable for highway driving and certain applications where speed is desired. Contrarily, the electric drive axle of the present disclosure also has a low or second gear ratio which may be best suitable for initiating movement of a large mass from a stationary position such as off-roading, boat launching, towing, and the like, for example, or certain applications where torque is desired. It should be appreciated that the electric drive axle of the present disclosure may be configured such that it shifts between various gear ratios during operation of the vehicle or when the vehicle is at rest. In applications where the electric drive axle of the present disclosure is a secondary drive, at least one clutch included in the electric drive axle may be employed as a method to disconnect the electric drive axle when operation thereof is not desired. The electric drive axle of the present disclosure may also include a secondary disconnect. The secondary disconnect may be positioned in close proximity to a wheel of the vehicle to maximize an efficiency thereof while in the disconnected state.

Embodiments of electric drive axles 100, 200, 300, 400, 500, 600, 700, 800, 1100, 1200, 1300, 1400, 1500, 1600, 1700, 1800, 1900, are described below. The electric drive axles 100, 200, 300, 400, 500, 600, 700, 800, 1100, 1200, 1300, 1400, 1500, 1600, 1700, 1800, 1900 may be utilized with a pure electric vehicle (not depicted) where one of the electric drive axles 100, 200, 300, 400, 500, 600, 700, 800, 1100, 1200, 1300, 1400, 1500, 1600, 1700, 1800, 1900 is the only driving axle. In other embodiments, as illustrated in FIG. 1, the electric drive axles 100, 200, 300, 400, 500, 600, 700, 800, 1100, 1200, 1300, 1400, 1500, 1600, 1700, 1800, 1900 are utilized with a hybrid four-wheel-drive vehicle 10 where the front axle is driven by an internal combustion engine 12, and the rear axle is one of the electric drive axles 100, 200, 300, 400, 500, 600, 700, 800, 1100, 1200, 1300, 1400, 1500, 1600, 1700, 1800, 1900 (or vice versa). In still other embodiments, the electric drive axles 100, 200, 300, 400, 500, 600, 700, 800, 1100, 1200, 1300, 1400, 1500, 1600, 1700, 1800, 1900 may be utilized in a hybrid commercial vehicle (not depicted) comprising a tandem axle in which the front tandem axle is driven by an internal combustion engine, and the rear tandem axle is one of the electric drive axles 100, 200, 300, 400, 500, 600, 700, 800, 1100, 1200, 1300, 1400, 1500, 1600, 1700, 1800, 1900 (or vice versa). The electric drive axles 100, 200, 300, 400, 500, 600, 700, 800, 1100, 1200, 1300, 1400, 1500, 1600, 1700, 1800, 1900 may have applications in commercial vehicles, both light duty and heavy duty vehicles, and for passenger, off-highway, and sport utility vehicles. Additionally, the electric drive axles 100, 200, 300, 400, 500, 600, 700, 800, 1100, 1200, 1300, 1400, 1500, 1600, 1700, 1800, 1900 described herein may be adapted for use in front and/or rear driving axles, and in steerable and non-steerable axles. It would be understood by one of ordinary skill in the art that the electric drive axles 100, 200, 300, 400, 500, 600, 700, 800, 1100, 1200, 1300, 1400, 1500, 1600, 1700, 1800, 1900 also have industrial, locomotive, military, agricultural, and aerospace applications.

Figure 2:
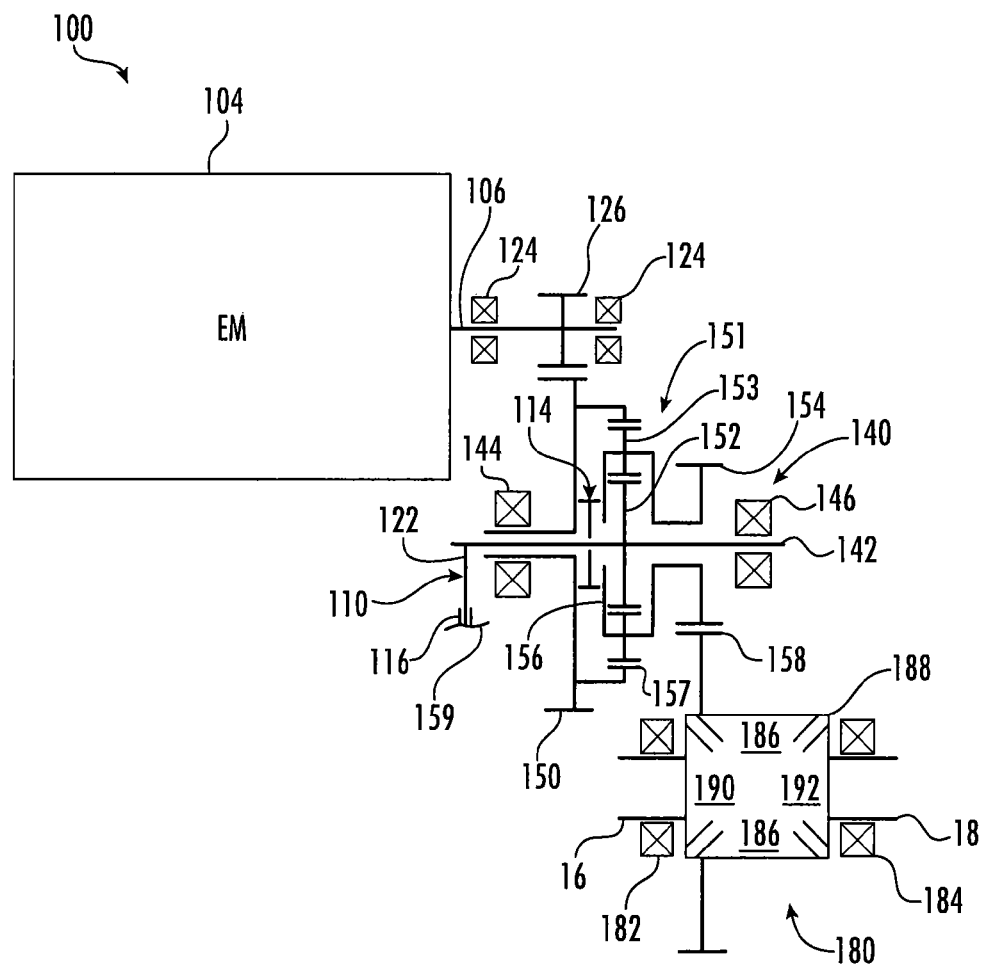
FIG. 2 is a schematic diagram of a portion of an electric drive axle of the vehicle driveline shown in FIG. 1 according to an embodiment, including an electric motor, a compound idler assembly having a planetary gear set, and a differential.

In certain embodiment illustrated in FIG. 2, the electric drive axle 100 may comprise an integrated drive system. In an embodiment, the, electric drive axle 100 includes an electric motor 104 (e.g., electromotor) coupled with a power source (not depicted). The electric motor 104 may be a permanent magnet synchronous machine comprising a stator disposed concentrically about a rotor. The electric drive axle 100 may additionally comprise an inverter (not depicted) for converting direct current to alternating current when the electric motor 104 is utilized to drive the vehicle, and for converting alternating current to direct current when the vehicle decelerates. The electric motor 104 may be referred to herein as a motor-generator. Further, the electric drive axle 100 may include cooling fluid (not depicted) such as, but not limited to, automatic transmission fluid or axle oil integrated with the electric drive axle 100 lubricant for cooling the electric motor 104 and the inverter. In another embodiment (not depicted), the cooling fluid for the electric motor 104 and the inverter may not be integrated with the axle oil. The electric drive axle 100 may have either a co-axial or off axis layout where the axle shaft connecting the wheel to the differential does not pass through the center or the motor but rather parallel to the motor axis.

A motor output shaft 106 is coupled with the rotor of the electric motor 104 for rotation therewith. The output shaft 106 is rotatably supported in a housing 159 (e.g. an axle housing) by at least one bearing 124. In the embodiment shown, the output shaft 106 is rotatably supported by a pair of bearings 124. However, it is understood that any number of bearings 124 may be employed as desired. It is further understood that the at least one bearing 124 can be any type of bearing as desired such as a roller bearing, a ball bearing, a tapered bearing, and the like, for example. A first gear 126 is coupled for rotation with the output shaft 106. Accordingly, the electric motor 104 drives the first gear 126 when the electric motor 104 is in operation. In certain embodiments, the first gear 126 is disposed axially adjacent to the at least one bearing 124.

The electric motor 104 is in driving engagement with a compound idler assembly 140. As illustrated in FIG. 2, the compound idler assembly 140 is disposed parallel with the output shaft 106 of the electric motor 104. The compound idler assembly 140 comprises an idler shaft 142 rotatably supported in the housing via first and second bearings 144, 146. It is understood that each of the bearings 144, 146 can be any type of bearing as desired such as a roller bearing, a ball bearing, a tapered bearing, and the like, for example.

The compound idler assembly 140 shown includes a second gear 150 directly coupled to a planetary gear set 151. The second gear 150 is concentrically disposed about the idler shaft 142 between the first and second bearings 144, 146, and more particularly between the first bearing 144 and the planetary gear set 151. The second gear 150 may rotate relative to the idler shaft 142 via at least one bearing (not depicted) disposed radially therebetween. It is understood that the at least one bearing can be any type of bearing as desired such as a needle bearing, a roller bearing, a ball bearing, a tapered bearing, and the like, for example.

The planetary gear set 151 includes a sun or third gear 152, a plurality of planet gears 153 mounted in a carrier 156, and an annulus 157. The planetary gear set 151 is configured to produce a certain gear ratio between the electric motor 104 and a differential 180. In certain embodiments, the planetary gear set 151 is configured to produce a reduction in the gear ratio between the first gear 126 and the differential 180. It is understood, however, that the reduction in the gear ratio between the first gear 126 and the differential 180 depends upon which one of the sun gear 152, the planet gears 153, and the annulus 157 is operatively connected to the first gear 126 via the second gear 150, which one of the sun gear 152, the planet gears 153, and the annulus 157 is stationary, and which one of the sun gear 152, the planet gears 153, and the annulus 157 is operatively connected to the differential 180. It is also understood that the planetary gear set 151 can include any number and size of planet gears 153 as desired. One of ordinary skill in the art should further understand that the planet gears 153 may be mounted at various positions on the carrier 156. As illustrated, each of the planet gears 153 is in meshed engagement with the sun gear 152 and the annulus 157. Various methods of meshed engagement between each of the planet gears 153, the sun gear 152, and the annulus 157 can be employed as desired.

In the embodiment shown in FIG. 2, the sun gear 152 is concentrically disposed about the idler shaft 142 and selectively connected to the housing 159, the planet gears 153 are selectively connected to the second gear 150 and operatively coupled to a fourth gear 154 via the carrier 156, and the annulus 157 is operatively connected to the second gear 150. It should be appreciated that the annulus 157 may be operatively connected to the second gear 150 by any suitable method as desired.

In certain embodiments, the electric motor 104 drives the annulus 157 of the planetary gear set 151 via the first and second gears 126, 150 when a first clutch 110 (described in further detail hereinafter) is engaged, or drives the carrier 156 and the annulus 157 of the planetary gear set 151 via the first and second gears 126, 150 when a second clutch 114 (described in further detail hereinafter) is engaged. It should be appreciated that any type of clutch or clutch assembly can be employed as desired for each of the first clutch 110 and the second clutch 114 such as a brake, a wet clutch or assembly, a simple dog clutch or assembly, a dog clutch or assembly with a synchronizer, and the like, for example. In certain embodiments, only one of the clutches 110, 114 is engaged at anyone time. An actuator mechanism (not depicted) for each of the clutches 110, 114 may include an actuator (not depicted), an additional gear set (not depicted) and a roller and ramp assembly (not depicted). The actuator may be a reversible electric motor as it is compact and easily controllable. It is understood that any other appropriate type of actuator and actuator mechanism for each of the clutches 110, 114 may be used such as hydraulic, mechanical, or pneumatic actuators, for example.

In the embodiment shown, the first clutch 110 includes a set of clutch plates 116 extending inward from the housing 159. The clutch plates 116 are mounted for axial movement within the housing 159. The idler shaft 142 of the compound idler assembly 140 further includes at least one clutch plate 122 extending outward from the idler shaft 142. The clutch plate 122 is interposed between the clutch plates 116. It should be appreciated that the first clutch 110 may include any number of clutch plates 116, 122 as desired. The first clutch 110 is configured to maintain a stationary position of the idler shaft 142, and therefore the sun gear 152 when engaged.

In certain embodiments, the second clutch 114 is a dog clutch. The second clutch 114 includes a plurality of clutch teeth (not depicted) disposed on the second gear 150 and a plurality of clutch teeth (not depicted) disposed on the carrier 156 of the planetary gear set 151. It should appreciated that the clutch teeth may be formed on a separate and distinct component or integrally formed with each of the second gear 150 and the carrier 156. In one embodiment, the clutch teeth of the second gear 150 extend outwardly therefrom in a first axial direction and the clutch teeth of the carrier 156 extend outwardly therefrom in an opposite second axial direction. The clutch teeth of the second gear 150 are configured to mesh with the clutch teeth of the carrier 156. At least one of the second gear 150 and the carrier 156 is operatively connected to at least one of the idler shaft 142, the sun gear 152, the planet gears 153, and the annulus 157 in such manner to allow movement thereof in both the first and second axial directions. The axial movement of at least one of the second gear 150 and the carrier 156 facilitates a meshed engagement and disengagement of the clutch teeth of both the second gear 150 and the carrier 156, and therefore engagement and disengagement of the second clutch 114. A biasing mechanism (not depicted) such as a spring element, for example, may be disposed within the housing 159, or interposed between the second gear 150 and the carrier 156, to urge at least one of the second gear 150 and the carrier 156 in opposite axial directions to cause the disengagement of the clutch teeth thereof.

In certain other embodiments, the second clutch 114 is a shift collar clutch. The second clutch 114 includes both the second gear 150 and the carrier 156 each having an annular hub (not depicted) extending axially. outwardly from an outer surface. Each of the annular hubs includes a plurality of splines (not depicted) formed on an outer peripheral surface thereof. The annular hubs may be integrally formed on the respective second gear 150 and carrier 156 or coupled thereto as a separate and distinct components thereof, if desired. Each of the annular hubs of the second gear 150 and the carrier 156, respectively, is disposed concentrically about the idler shaft 142 and the annular hub of the carrier 156 may rotate relative thereto via a needle bearing (not depicted), disposed radially therebetween. At least one spacer (not depicted) and/or at least one positioning element (not depicted) may be employed to militate against an axial movement of the needle bearing along the idler shaft 142. It is understood that the positioning element can be any type of positioning element as desired such as a snap ring, for example. A thrust bearing (not depicted) may be disposed concentrically about the idler shaft 142 and interposed between the annular hub of the second gear 150 and the annular hub of the carrier 156. The thrust bearing is configured to militate against friction between the annular hubs. The planetary gear system 151 may further include a thrust bearing (not depicted) disposed concentrically about the idler shaft 142 and interposed between the carrier 156 and the sun gear 152 to militate against friction therebetween. It should be appreciated that additional thrust bearings may be employed to militate against friction between other components of the electric drive axle 100, if desired, such as between the second gear 150 and the bearing 144, for example. Various types of thrust bearings can be employed as desired.

The second clutch 114 further includes sleeve (not depicted). The sleeve is concentrically disposed about the annular hub of the carrier 156 when the second clutch 114 is disengaged. It is understood, however, that the sleeve may be concentrically disposed about the annular hub of the second gear 150 when the second clutch 114 is disengaged, if desired. An inner peripheral surface of the sleeve includes a plurality of splines (not depicted) formed thereon. The splines are of such shape, size, and number so as to cooperate with the splines of the annular hub of both the second gear 150 and the carrier 156. In certain embodiments, the sleeve has an axial length sufficient to enable a meshed engagement with both the annular hubs when the second clutch 114 is engaged. The sleeve is coupled to the annular hubs of the second gear 150 and the carrier 156 to permit a linear actuation thereof to cause the second clutch 114 to be activated from a disengaged position to an engaged position. In certain embodiments, the linear actuation of the sleeve is caused by a controller (not shown) in electrical communication with an operating device (not shown). The operating device (not shown) may be any operating device as desired such as a high-speed low-torque brushless direct current motor, for example. The operating device (not shown) may include an actuator coupled therewith. The actuator may be operatively connected with the sleeve to move the sleeve from a first position when the second clutch 114 is in the disengaged position to a second position when the second clutch 114 is in the engaged position. It is understood that the linear actuation of the sleeve from the first position to the second position thereof may be caused by other methods as desired.

Referring to FIG. 2, the fourth gear 154 is directly coupled to the carrier 156. In certain embodiments, the fourth gear 154 is concentrically disposed about the idler shaft 142 between the first and second bearings 144, 146, and more particularly between the planetary gear set 151 and the second bearing 146. The fourth gear 154 may rotate relative to the idler shaft 142 via at least one bearing (not depicted) disposed radially therebetween. It is understood that the at least one bearing can be any type of bearing as desired such as a needle bearing, a rollerbearing, a ball bearing, a tapered bearing, and the like, for example. The fourth gear 154 receives torque from the second gear 150 and the planetary gear set 151 when the first clutch 110 is engaged and the electric motor 104 drives the electric drive axle 100. Contrarily, the fourth gear 154 receives torque only from the second gear 150 through the carrier 156 of the planetary gear set 151 when the second clutch 114 is engaged and the electric motor 104 drives the electric drive axle 100.

A pair of positioning elements (not depicted) may be respectively disposed on ends of the idler shaft 142 to maintain a position of the bearings 144, 146 and the second gear 150, the planetary gear set 151, and the fourth gear 154. It is understood that each of the positioning elements can be any type of positioning element as desired such as a snap ring, for example but could use a shim and press fit bearings if the application allows for it.

As illustrated, the fourth gear 154 is in meshed engagement with a fifth gear 158. The fourth gear 154 drives the fifth gear 158, when one of the first and second clutches 110, 114, respectively, is engaged and the electric motor 104 drives the electric drive axle 100. The fifth gear 158 is coupled for rotation with a differential 180. The differential 180 is, rotatably supported within the housing 159 via a pair of bearings 182, 184. It is understood that each of the bearings 182, 184 can be any type of bearing as desired such as a roller bearing, a ball bearing, a tapered bearing, and the like, for example. The differential 180 shown includes two or more differential pinions 186 disposed within a differential case 188. The differential pinions 186 are coupled with the differential case 188 via a pinion shaft (not depicted). In an embodiment, the pinion shaft may comprise a cross member. The differential pinions 186 are in meshed engagement with first and second side gears 190, 192. The first and second side gears 190, 192 are coupled for rotation with the first and second half shafts 16, 18, respectively, shown in FIG. 1.

In operation, when a first gear ratio is desired (e.g. 20:1 gear ratio reduction), the actuator mechanism causes the first clutch 110 to engage, while the second clutch 114 remains disengaged. The output shaft 106 of the electric motor 104 causes the first gear 126 coupled thereto, to rotate therewith. A rotation of the first gear 126 drives the second gear 150, and causes the second gear 150 to rotate therewith. When the first clutch 110 is engaged, the sun gear 152 and the idler shaft 142 are fixedly connected to the housing, and held in a stationary position. As such, a rotation of the second gear 150 drives the annulus 157 of the planetary gear set 151, and causes torque to transfer thereto. Since the sun gear 152 is maintained in the stationary position, a rotation of the annulus 157 drives the planet gears 153, and causes torque to transfer through the planet gears 153 to the carrier 156. The carrier 156 rotates with the planet gears 153. A rotation of the carrier 156 drives the fourth gear 154 coupled thereto, and causes the fourth gear 154 to rotate therewith. Accordingly, the torque is transferred from the carrier 156 to the fourth gear 154. A rotation of the fourth gear 154 drives the fifth gear 158, and causes the differential case 188 to rotate therewith. The torque is transferred from the fourth gear 154 to the differential case 188. A rotation of the differential case 188 further causes the first and second half shafts 16, 18 to rotate therewith. The rotation of the differential 180 transfers a desired first torque from the output shaft 106 of the electric motor 104 to the first and second axle shafts 16, 18. When the electric drive axle 100 is in a power generation mode, the torque transfer described above is reversed.

When a second gear ratio (e.g. 13:1 gear ratio reduction), which is less than the first gear ratio, is desired, the actuator mechanism causes the second clutch 114 to engage, while the first clutch 110 remains disengaged. The output shaft 106 of the electric motor 104 causes the first gear 126 coupled thereto, to rotate therewith. A rotation of the first gear 126 drives the second gear 150, and causes the second gear 150 to rotate therewith. When the second clutch 114 is engaged, the sun gear 152 and the idler shaft 142 freely rotate with the planet gears 153 of the planetary gear set 151, and the second gear 150 is coupled to the carrier 156 of the planetary gear set 151. As such, a rotation of the second gear 150 drives the annulus 157 and the carrier 156 of the planetary gear set 151. Since the sun gear 152 and the idler shaft 142 freely rotate, the planetary gear set 151 is essentially bypassed. Accordingly, a rotation of the annulus 157 and the carrier 156 causes torque to transfer from the second gear 150 through the planet gears 153 and the carrier 156 without a further reduction in gear ratio. A rotation of the second gear 150, thereby drives the fourth gear 154 coupled to the carrier 156, and causes the fourth gear 154 to rotate therewith. The torque is transferred from the second gear 150 to the fourth gear 154. A rotation of the fourth gear 154 drives the fifth gear 158, and causes the differential case 188 to rotate therewith. The torque is transferred from the fourth gear 154 to the differential case 188. A rotation of the differential case 188 further causes the first and second half shafts 16, 18 to rotate therewith. The rotation of the differential 180 transfers a desired second torque from the output shaft 106 to the first and second axle shafts 16,18. When the electric drive axle 100 is in a power generation mode, the torque transfer described above is reversed.

Figure 3:
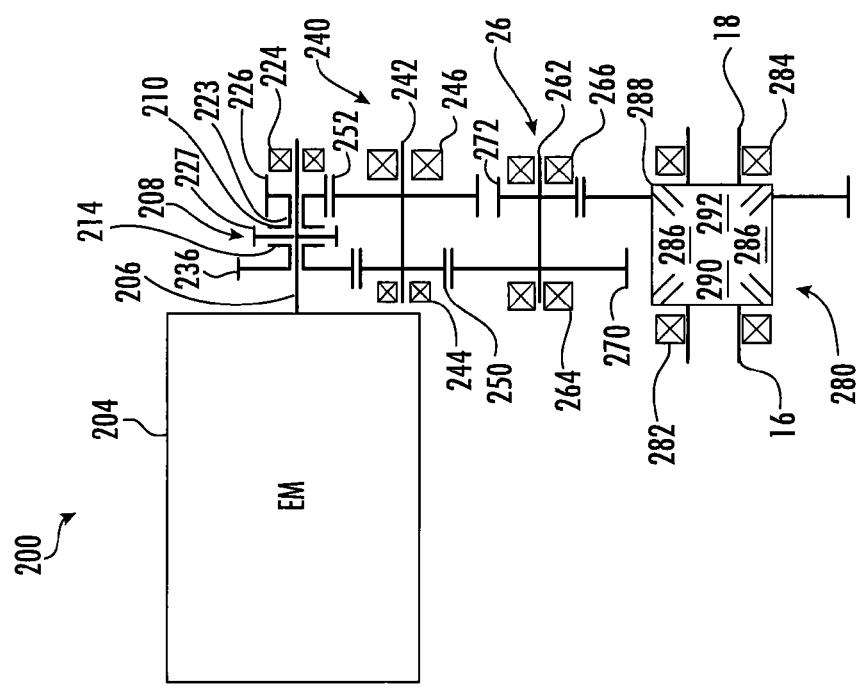
FIG. 3 is a schematic diagram of a portion of an electric drive axle of the vehicle driveline shown in FIG. 1 according to another embodiment, including an electric motor, a first compound idler assembly, a second compound idler assembly, and a differential.

In certain embodiments illustrated in FIG. 3, the vehicle 10 may include the electric drive axle 200. The electric drive axle 200 may comprise an integrated drive system. In an embodiment, the electric drive axle 200 includes an electric motor 204 (e.g., electromotor) coupled with a power source (not depicted). The electric motor 204 may be a permanent magnet synchronous machine comprising a stator disposed concentrically about a rotor. The electric drive axle 200 may additionally comprise an inverter (not depicted) for converting direct current to alternating current when the electric motor 204 is utilized to drive the vehicle, and for converting alternating current to direct current when the vehicle decelerates. The electric motor 204 may be referred to herein as a motor-generator. Further, the electric drive axle 200 may include cooling fluid (not depicted) such as, but not limited to, automatic transmission fluid or axle oil integrated with the electric drive axle 200 lubricant for cooling the electric motor 204 and the inverter. In another embodiment (not depicted), the cooling fluid for the electric motor 204 and the inverter may not be integrated with the axle oil. The electric drive axle 200 may have either a co-axial or off axis layout where the axle shaft connecting the wheel to the differential does not pass through the center or the motor but rather parallel to the motor axis.

A motor output shaft 206 is coupled with the rotor of the electric motor 204 for rotation therewith. The output shaft 206 is connected to a clutch assembly 208. It should be appreciated that any type of clutch assembly 208 can be employed as desired such as a wet clutch assembly, a simple dog clutch assembly, a dog clutch assembly with a synchronizer, and the like, for example.

In the embodiment shown, the clutch assembly 208 includes a first or axially outer clutch 210 concentrically disposed about the output shaft 206 and a second or axially inner clutch 214 concentrically disposed about the output shaft 206. The clutches 210, 214 are positioned axially adjacent to each other such that a single actuator mechanism (not depicted) can separate actuate each Of the clutches 210, 214. Accordingly, only one of the clutches 210,214 is engaged at any one time. The actuator mechanism can include an actuator (not depicted), an additional gear set (not depicted) and a roller and ramp assembly (not depicted). The actuator may be a reversible electric motor as it is compact and easily controllable. It is understood that any other appropriate type of actuator and actuator mechanism may be used such as hydraulic, mechanical, or pneumatic actuators, for example.

The clutches 210,214 are connected to a common shaft 223. The common shaft 223 is disposed co-axially with the output shaft 206 and is rotatably supported in a housing (not depicted) (e.g. an axle housing) by at least one bearing 224. It is understood that the at least on~bearing 224 can be any type of bearing as desired such as a roller bearing, a ball bearing, a tapered bearing, and the like, for example. A first gear 226 is coupled for rotation with the common shaft 223. The first gear 226 may rotate relative to the output shaft 206 via at least one bearing (not depicted) disposed radially therebetween. It is understood that the at least one bearing can be any type of bearing as desired such as a needle bearing, a roller bearing, a ball bearing, a tapered bearing, and the like, for example. Accordingly, the electric motor 204 drives the first gear 226 when the first clutch 210 is engaged. In certain embodiments, the first gear 226 is disposed axially adjacent to the at least one bearing 224.

A second gear 236 is operably connected to the second clutch 214. In certain embodiments, the second gear 236 is coupled for rotation with the common shaft 223. The second gear 236 may rotate relative to the output shaft 206 via at least one bearing (not depicted) disposed radially therebetween. It is understood that the at least one bearing can be any type of bearing as desired such as a needle bearing, a roller bearing, a ball bearing, a tapered bearing, and the like, for example. Accordingly, the electric motor 204 drives the second gear 236 when the second clutch 214 is engaged. In certain embodiments, the second gear 236 is disposed axially adjacent to the electric motor 204.

In the embodiment shown, the first clutch 210 is a dog clutch. The first clutch 210 includes a plurality of clutch teeth (not depicted) disposed on the first gear 226 and a plurality of clutch teeth (not depicted) disposed on a clutch plate 227 coupled to the output shaft 206. It should be appreciated that the clutch teeth may be formed on a separate and distinct component or integrally formed with each of the first gear 226 and the clutch plate 227. In one embodiment, the clutch teeth of the first gear 226 extend outwardly therefrom in a first axial direction and the clutch teeth of the clutch plate 227 extend outwardly therefrom in an opposite second axial direction. The clutch teeth of the first gear 226 are configured to mesh with the clutch teeth of the clutch plate 227. At least one of the first gear 226 and the clutch plate 227 is operatively connected to at least one of the output shaft 206 and the common shaft 223 in such manner to allow movement thereof in both the first and second axial directions. The axial movement of at least one of the first gear 226 and the clutch plate 227 facilitates a meshed engagement and disengagement of the clutch teeth of both the first gear 226 and the clutch plate 227, and therefore engagement and disengagement of the first clutch 210. A biasing mechanism (not depicted) such as a spring element, for example, may be disposed within the housing, or interposed between the first gear 226 and the clutch plate 227, to urge at least one of the first gear 226 and the clutch plate 227 in opposite axial directions to cause the disengagement of the clutch teeth thereof.

In the embodiment shown, the second clutch 214 is also a dog clutch. The second clutch 214 includes a plurality of clutch teeth (not depicted) disposed on the second gear 236 and a plurality of clutch teeth (not depicted) disposed on the clutch plate 227 coupled to the output shaft 206. It should appreciated that the clutch teeth may be formed on a separate and distinct component or integrally formed with each of the second gear 236 and the clutch plate 227. In one embodiment, the clutch teeth of the second gear 236 extend outwardly therefrom in the second axial direction and the clutch teeth of the clutch plate 227 extend outwardly therefrom in the first axial direction. The clutch teeth of the second gear 236 are configured to mesh with the clutch teeth of the clutch plate 227. At least one of the second gear 236 and the clutch plate 227 is operatively connected to at least one of the output shaft 206 and the common shaft 223 in such manner to allow movement thereof in both the first and second axial directions. The axial movement of at least one of the second gear 236 and the clutch plate 227 facilitates a meshed engagement and disengagement of the clutch teeth of both the second gear 236 and the clutch plate 227, and therefore engagement and disengagement of the second clutch 214. A biasing mechanism (not depicted) such as a spring element, for example, may be disposed within the housing, or interposed between the second gear 236 and the clutch plate 227, to urge at least one of the second gear 236 and the clutch plate 227 in opposite axial directions to cause the disengagement of the clutch teeth thereof.

In certain other embodiments, at least one of the first and second clutches 210, 214 is a shift collar clutch. In such embodiments, the first clutch 210 includes both the first gear 226 and the clutch plate 227 each having an annular hub (not depicted) extending axially outwardly from an outer surface.

Each of the annular hubs includes a plurality of splines (not depicted) formed on an outer peripheral surface thereof. The annular hubs may be integrally formed on the respective first gear 226 and clutch plate 227 or coupled thereto as a separate and distinct components thereof, if desired. It should be appreciated that the annular hub of the clutch plate 227 may be integrally formed on the output shaft 206, eliminating the clutch plate 227 as a separate component. The annular hub of the first gear 226 is disposed concentrically about the common shaft 223 and may rotate relative thereto via a needle bearing (not depicted), disposed radially therebetween. At least one spacer (not depicted) and/or at least one positioning element (not depicted) may be employed to militate against an axial movement of the needle bearing along the common shaft 223. It is understood that the positioning element can be any type of positioning element as desired such as a snap ring, for example. A thrust bearing (not depicted) may be disposed concentrically about the common shaft 223 and interposed between the annular hub of the first gear 226 and the annular hub of the clutch plate 227 or output shaft 206. The thrust bearing is configured to militate against friction between the annular hubs. It should be appreciated that additional thrust bearings may be employed to militate against friction between other components of the electric drive axle 200, if desired, such as between the first gear 226 and the bearing 224, for example. Various types of thrust bearings can be employed as desired.

The first clutch 210 further includes a sleeve (not depicted). The sleeve is concentrically disposed about the annular hub of the clutch plate 227 or output shaft 206 when the first clutch 210 is disengaged. It is understood, however, that the sleeve may be concentrically disposed about the annular hub of the first gear 226 when the first clutch 210 is disengaged, if desired. An inner peripheral surface of the sleeve includes a plurality of splines (not depicted) formed thereon. The splines are of such shape, size, and number so as to cooperate with the splines of the annular hub of both the first gear 226 and the clutch plate 227 or the output shaft 206. In certain embodiments, the sleeve has an axial length sufficient to enable a meshed engagement with both the annular hubs when the first clutch 210 is engaged. The sleeve is coupled to the annular hubs of the first gear 226 and the clutch plate 227 or the output shaft 206 to permit a linear actuation thereof to cause the first clutch 210 to be activated from a disengaged position to an engaged position. In certain embodiments, the linear actuation of the sleeve is caused by a controller (not shown) in electrical communication with an operating device (not shown). The operating device (not shown) may be any operating device as desired such as a high-speed low-torque brush less direct current motor, for example. The operating device (not shown) may include an actuator coupled therewith. The actuator may be operatively connected with the sleeve to move the sleeve from a first position when the first clutch 210 is in the disengaged position to a second position when the first clutch 210 is in the engaged position. It is understood that the linear actuation of the sleeve from the first position to the second position thereof may be caused by other methods as desired.

The second clutch 214 includes both the second gear 236 and the clutch plate 227 each having an annular hub (not depicted) extending axially outwardly from an outer surface. Each of the annular hubs includes a plurality of splines (not depicted) formed on an outer peripheral surface thereof. The annular hubs may be integrally formed on the respective second gear 236 and clutch plate 227 or coupled thereto as a separate and distinct components thereof, if desired. It should be appreciated that the annular hub of the clutch plate 227 may be integrally formed on the output shaft 206, eliminating the clutch plate 227 as a separate component. The annular hub of the second gear 236 is disposed concentrically about the common shaft 223 and may rotate relative thereto via a needle bearing (not depicted), disposed radially therebetween. At least one spacer (not depicted) and/or at least one positioning element (not depicted) may be employed to militate against an axial movement of the needle bearing along the common shaft 223. It is understood that the positioning element can be any type of positioning element as desired such as a snap ring, for example. A thrust bearing (not depicted) may be disposed concentrically about the common shaft 223 and interposed between the annular hub of the second gear 236 and the annular hub of the clutch plate 227 or the output shaft 206. The thrust bearing is configured to militate against friction between the annular hubs. Various types of thrust bearings can be employed as desired.

The second clutch 214 also further includes a sleeve (not depicted). The sleeve is concentrically disposed about the annular hub of the clutch plate 227 or the output shaft 206 when the second clutch 214 is disengaged. It is understood, however, that the sleeve may be concentrically disposed about the annular hub of the second gear 236 when the second clutch 214 is disengaged, if desired. An inner peripheral surface of the sleeve includes a plurality of splines (not depicted) formed thereon. The splines are of such shape, size, and number so as to cooperate with the splines of the annular hub of both the second gear 236 and the clutch plate 227 or the output shaft 206. In certain embodiments, the sleeve has an axial length sufficient to enable a meshed engagement with both the annular hubs when the second clutch 214 is engaged. The sleeve is coupled to the annular hubs of the second gear 236 and the clutch plate 227 or the output shaft 206 to permit a linear actuation thereof to cause the second clutch 214 to be activated from a disengaged position to an engaged position. In certain embodiments, the linear actuation of the sleeve is caused by a controller (not shown) in electrical communication with an operating device (not shown). The operating device (not shown) may be any operating device as desired such as a high-speed low-torque brush less direct current motor, for example. The operating device (not shown) may include an actuator coupled therewith. The actuator may be operatively connected with the sleeve to move the sleeve from a first position when the second clutch 214 is in the disengaged position to a second position when the second clutch 214 is in the engaged position. It is understood that the linear actuation of the sleeve from the first position to the second position thereof may be caused by other methods as desired.

In certain embodiments, the electric motor 204 drives a first compound idler assembly 240 via the first gear 226 when the first clutch 210 is engaged, or via the second gear 236 when the second clutch 214 is engaged. As illustrated in FIG. 3, the first compound idler assembly 240 is disposed parallel with the output shaft 206 of the electric motor 204. The first compound idler assembly 240 comprises an idler shaft 242 rotatably supported in the housing via first and second bearings 244, 246. It is understood that each of the bearings 244, 246 can be any type of bearing as desired such as a roller bearing, a ball bearing, a tapered bearing, and the like, for example.

A third gear 250 and a fourth gear 252 are coupled for rotation with the idler shaft 242. The third gear 250 is disposed axially adjacent to the first bearing 244. The third gear 250 is in meshed engagement with the second gear 236 and receives torque therefrom when the second clutch 214 is engaged and the electric motor 204 drives the electric drive axle 200. The fourth gear 252 is disposed axially adjacent to the second bearing 246. The fourth gear 252 is in meshed engagement with the first gear 226 and receives torque therefrom when the first clutch 210 is engaged and the electric motor 204 drives the electric drive axle 200. A pair of positioning elements (not depicted) may be respectively disposed on ends of the idler shaft 242 to maintain a position of the bearings 244, 246 and the third and fourth gears 250, 252. It is understood that each of the positioning elements can be any type of positioning element as desired such as a snap ring, for example but could use a shim and press fit bearings if the application allows for it.

In certain embodiments, the first compound idler assembly 240 drives a second compound idler assembly 260 via the third gear 250. As illustrated in FIG. 3, the second compound idler assembly 260 is disposed parallel with both the output shaft 206 of the electric motor 204 and the idler shaft 242 of the first compound assembly 240. The second compound idler assembly 260 comprises an idler shaft 262 rotatably supported in the housing via first and second bearings 264, 266. It is understood that each of the bearings 264, 266 can be any type of bearing as desired such as a roller bearing, a ball bearing, a tapered bearing, and the like, for example.

A fifth gear 270 and a sixth gear 272 are coupled for rotation with the idler shaft 262. The fifth gear 270 is disposed axially adjacent to the first bearing 264. The fifth gear 270 is in meshed engagement with the third gear 250 and receives torque therefrom when one of the first and second clutches 210, 214 is engaged and the electric motor 204 drives the electric drive axle 200. The sixth gear 272 is disposed axially adjacent to the second bearing 266. A pair of positioning elements (not depicted) may be respectively disposed on ends of the idler shaft 262 to maintain a position of the bearings 264, 266 and the fifth and sixth gears 270, 272. It is understood that each of the positioning elements can be any type of positioning element as desired such as a snap ring, for example but could use a shim and press fit bearings if the application allows for it.

The sixth gear 272 receives torque from the fifth gear 270, when one of the first and second clutches 210, 214, respectively, is engaged and the electric motor 204 drives the electric drive axle 200. As illustrated, the sixth gear 272 is in meshed engagement with a seventh gear 274. The sixth gear 272 drives the seventh gear 274 when one of the first and second clutches 210,214 is engaged and the electric motor 204 drives the electric drive axle 200. The seventh gear 274 is coupled for rotation with a differential 280. The differential 280 is rotatably supported within the housing via a pair of bearings 282, 284. It is understood that each of the bearings 282, 284 can be any type of bearing as desired such as a roller bearing, a ball bearing, a tapered bearing, and the like, for example.

As illustrated in FIG. 3, the differential 280 includes two or more differential pinions 286 disposed within a differential case 288. The differential pinions 286 are coupled with the differential case 288 via a pinion shaft (not depicted). In an embodiment, the pinion shaft may comprise a cross member. The differential pinions 286 are in meshed engagement with first and second side gears 290, 292. The first and second side gears 290, 292 are coupled for rotation with the first and second half shafts 16, 18, respectively, shown in FIG. 1.

In operation, when a first gear ratio is desired, the actuator mechanism causes the first clutch 210 to engage, while the second clutch 214 remains disengaged. When the first clutch 210 is engaged, the output shaft 206 of the electric motor 204 causes the common shaft 223 and the first gear 226 coupled thereto, to rotate therewith. The second gear 236 may freely rotate with the third gear 250. A rotation of the first gear 226 drives the fourth gear 252 of the first compound idler assembly 240, and causes the idler shaft 242 and the third gear 250 coupled thereto, to rotate therewith. A rotation of the third gear 250 drives the fifth gear 270 of the second compound idler assembly 260, and causes the idler shaft 262 and the sixth gear 272 coupled thereto, to rotate therewith. A rotation of the sixth gear 272 drives the seventh gear 274 of the differential 280, and causes the differential case 288 to rotate therewith. A rotation of the differential case 288 further causes the first and second half shafts 16, 18 to rotate therewith. The rotation of the differential 280 transfers a desired first torque from the output shaft 206 to the first and second axle shafts 16, 18. When the electric drive axle 200 is in a power generation mode, the torque transfer described above is reversed.

When a second gear ratio, which is less than the first gear ratio, is desired, the actuator mechanism causes the second clutch 214 to engage, while the first clutch 210 remains disengaged. When the second clutch 214 is engaged, the output shaft 206 of the electric motor 204 causes the common shaft 223 and the second gear 236 coupled thereto, to rotate therewith. The first gear 226 may freely rotate with the fourth gear 252. A rotation of the second gear 236 drives the third gear 250 of the first compound idler assembly 240, and causes the idler shaft 242 and the third gear 250 to rotate therewith. A rotation of the third gear 250 drives the fifth gear 270 of the second compound idler assembly 260, and causes the idler shaft 262 and the sixth gear 272 coupled thereto, to rotate therewith. A rotation of the sixth gear 272 drives the seventh gear 274 of the differential 280, and causes the differential case 288 to rotate therewith. A rotation of the differential case 288 further causes the first and second half shafts 16, 18 to rotate therewith. The rotation of the differential 280 transfers a desired second torque from the output shaft 206, which is less than the first torque, to the first and second axle shafts 16, 18. When the electric drive axle 200 is in a power generation mode, the torque transfer described above is reversed.

Figure 4:
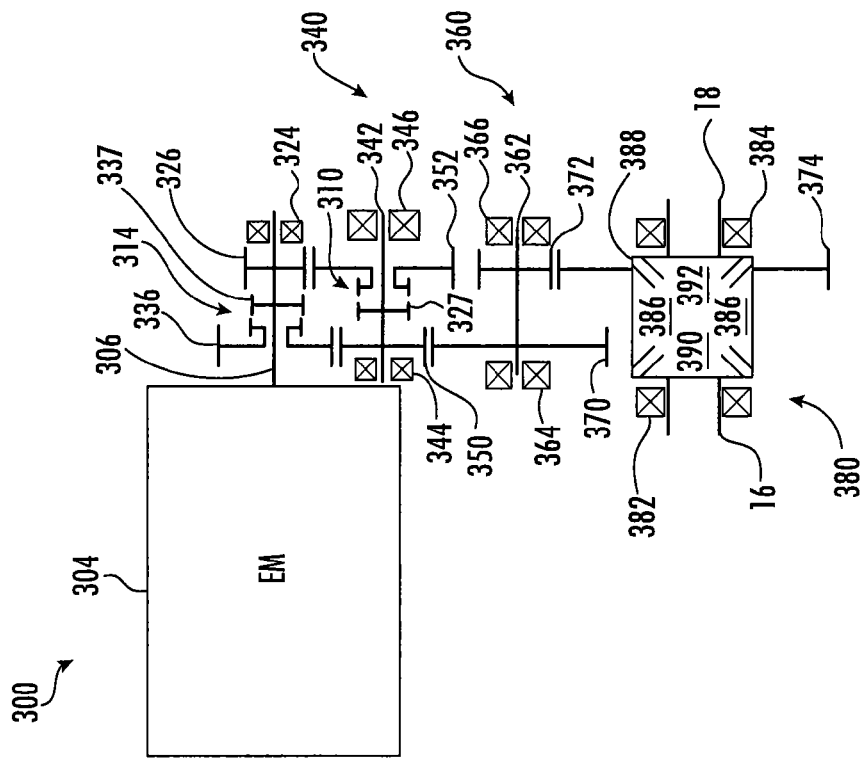
FIG. 4 is a schematic diagram of a portion of an electric drive axle of the vehicle driveline shown in FIG. 1 according to another embodiment, including an electric motor, a first compound idler assembly, a second compound idler assembly, and a differential.

Referring now to the embodiment shown in FIG. 4, the vehicle may include the electric drive axle 300. The electric drive axle 300 may comprise an integrated drive system. In an embodiment, the electric drive axle 300 includes an electric motor 304 (e.g., electromotor) coupled with a power source (not depicted). The electric motor 304 may be a permanent magnet synchronous machine comprising a stator disposed concentrically about a rotor. The electric drive axle 300 may additionally comprise an inverter (not depicted) for converting direct current to alternating current when the electric motor 304 is utilized to drive the vehicle, and for converting alternating current to direct current when the vehicle decelerates. The electric motor 304 may be referred to herein as a motor-generator. Further, the electric drive axle 300 may include cooling fluid (not depicted) such as, but not limited to, automatic transmission fluid or axle oil integrated with the electric drive axle 300 lubricant for cooling the electric motor 304 and the inverter. In another embodiment (not depicted), the cooling fluid for the electric motor 304 and the inverter may not be integrated with the axle oil. The electric drive axle 300 may have either a co-axial or off axis layout where the axle shaft connecting the wheel to the differential does not pass through the center or the motor but rather parallel to the motor axis.

A motor output shaft 306 is coupled with the rotor of the electric motor 304 for rotation therewith. The output shaft 306 is rotatably supported within a housing (not depicted) (e.g. an axle housing) by at least one bearing 324. It is understood that the at least one bearing 324 can be any type of bearing as desired such as a roller bearing, a ball bearing, a tapered bearing, and the like, for example. The output shaft 306 includes a first gear 326 rotatably coupled thereto. In certain embodiments, the first gear 326 is concentrically disposed about the output shaft 306 axially adjacent the at least one bearing 324. A second gear 336 is coupled to the output shaft 306. In certain embodiments, the second gear 336 is concentrically disposed about the output shaft 306 axially adjacent the first gear 326. The second gear 336 may rotate relative to the output shaft 306 via at least one bearing (not depicted) disposed radially therebetween. It is understood that the at least one bearing can be any type of bearing as desired such as a needle bearing, a roller bearing, a ball bearing, a tapered bearing, and the like, for example.

In certain embodiments, the electric motor 304 drives a first compound idler assembly 340 via the first gear 326 when a first clutch 310 (described in further detail hereinafter) is engaged, or via the second gear 336 when a second clutch 314 (described in further detail hereinafter) is engaged. As illustrated in FIG. 4, the first compound idler assembly 340 is disposed parallel with the output shaft 306 of the electric motor 304. The first compound idler assembly 340 comprises an idler shaft 342 rotatably supported in the housing via first and second bearings 344, 346. It is understood that each of the bearings 344, 346 can be any type of bearing as desired such as a roller bearing, a ball bearing, a tapered bearing, and the like, for example.

A third gear 350 and a fourth gear 352 are coupled to the idler shaft 342. The third gear 350 is concentrically disposed about the idler shaft 342 axially adjacent the first bearing 344. The third gear 350 is in meshed engagement with the second gear 336 and receives torque therefrom when the second clutch 314 is engaged and the electric motor 304 drives the electric drive axle 300. The fourth gear 352 is concentrically disposed about the idler shaft 342 axially adjacent to the second bearing 346. The fourth gear 352 may rotate relative to the idler shaft 342 via at least one bearing (not depicted) disposed radially therebetween. It is understood that the at least one bearing can be any type of bearing as desired such as a needle bearing, a roller bearing, a ball bearing, a tapered bearing, and the like, for example. The fourth gear 352 is in meshed engagement with the first gear 326 and receives torque therefrom when the first clutch 310 is engaged and the electric motor 304 drives the electric drive axle 300. A pair of positioning elements (not depicted) may be respectively disposed on ends of the idler shaft 342 to maintain a position of the bearings 344, 346 and the third and fourth gears 350, 352. It is understood that each of the positioning elements can be any type of positioning element as desired such as a snap ring, for example but could use a shim and press fit bearings if the application allows for it.

As illustrated, the fourth gear 352 is connected to the idler shaft 342 by the first clutch 310. The first clutch 310 is concentrically disposed about the idler shaft 342. An actuator mechanism (not depicted) can actuate the first clutch 310. The actuator mechanism can include an actuator, an additional gear set and a roller and ramp assembly. The actuator may be a reversible electric motor as it is compact and easily controllable. It is understood that any other appropriate type of actuator and actuator mechanism may be used such as hydraulic, mechanical, or pneumatic actuators, for example.

In the embodiment shown, the first clutch 310 is a dog clutch. The first clutch 310 includes a plurality of clutch teeth (not depicted) disposed on the fourth gear 352 and a plurality of clutch teeth (not depicted) disposed on a clutch plate 327 coupled to the idler shaft 342. It should be appreciated that the clutch teeth may be formed on a separate and distinct component or integrally formed with each of the fourth gear 352 and the clutch plate 327. In one embodiment, the clutch teeth of the fourth gear 352 extend outwardly therefrom in the first axial direction and the clutch teeth of the clutch plate 327 extend outwardly therefrom in the opposite second axial direction. The clutch teeth of the fourth gear 352 are configured to mesh with the clutch teeth of the clutch plate 327. At least one of the fourth gear 352 and the clutch plate 327 is operatively connected to the idler shaft 342 in such manner to allow movement thereof in both the first and second axial directions. The axial movement of at least one of the fourth gear 352 and the clutch plate 327 facilitates a meshed engagement and disengagement of the clutch teeth of both the fourth gear 352 and the clutch plate 327, and therefore engagement and disengagement of the first clutch 310. A biasing mechanism (not depicted) such as a spring element, for example, may be disposed within the housing, or interposed between the fourth gear 352 and the clutch plate 327, to urge at least one of the fourth gear 352 and the clutch plate 327 in opposite axial directions to cause the disengagement of the clutch teeth thereof. Accordingly, the electric motor 304 drives the fourth gear 352 when the first clutch 310 is engaged. It should be appreciated that any type of the first clutch 310 can be employed as desired such as a wet clutch assembly, a simple dog clutch assembly, a dog clutch assembly with a synchronizer, and the like, for example.

Figure 9A:
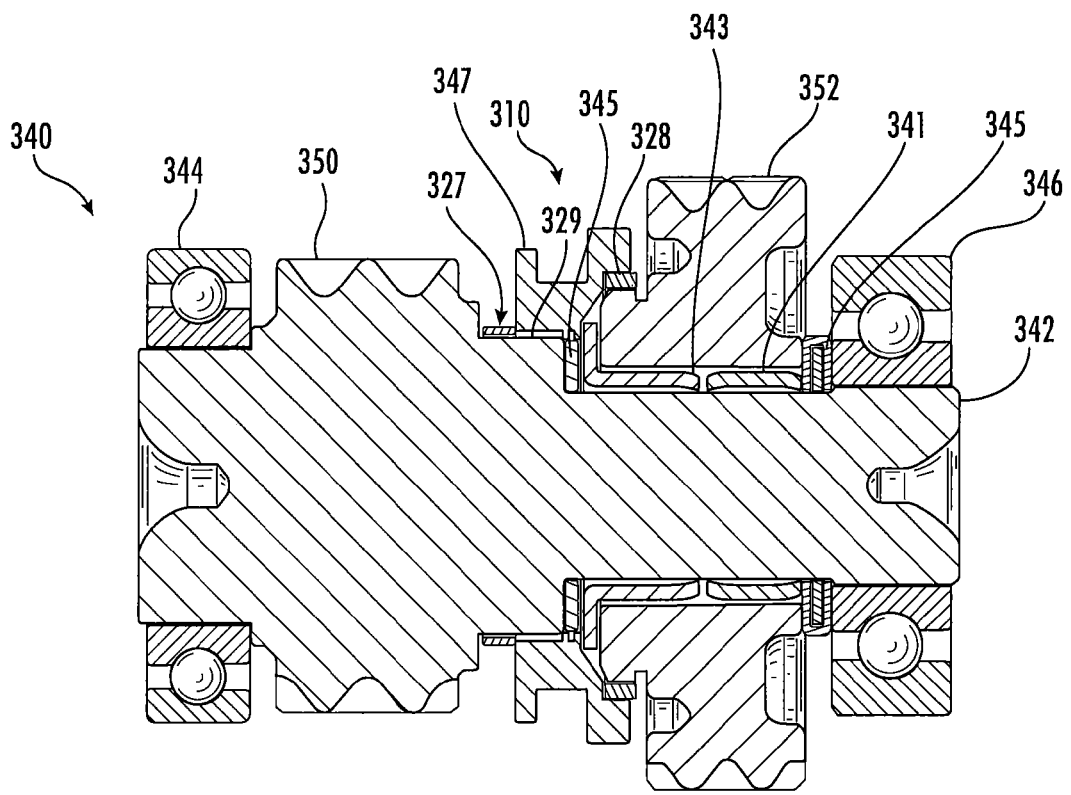
FIG. 9A is a sectional view of the first compound idler assembly of the electric drive axle shown in FIG. 4.
Figure 9B:
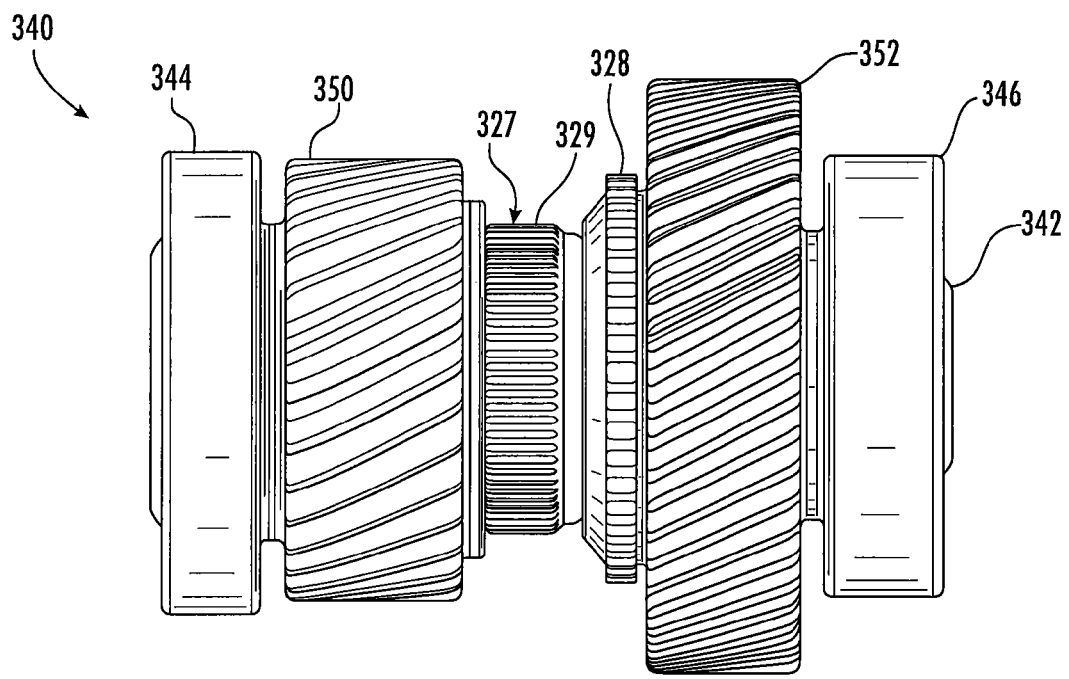
FIG. 9B is an elevational view of the first compound idler assembly shown in FIG. 9A.

In certain other embodiments, shown in FIGS. 9A-9B, the first clutch 310 is a shift collar clutch. In such embodiments, the first clutch 310 includes both the fourth gear 352 and the clutch plate 327 each having an annular hub 328, 329, respectively, extending axially outwardly from an outer surface. Each of the annular hubs 328, 329 includes a plurality of splines formed on an outer peripheral surface thereof. The annular hubs 328, 329 may be integrally formed on the respective fourth gear 352 and clutch plate 327 or coupled thereto as a separate and distinct components thereof, if desired. It should be appreciated that the annular hub of the clutch plate 327 may be integrally formed on the idler shaft 342, eliminating the clutch plate 327 as a separate component. Each of the annular hubs 328, 329 of the fourth gear 352 and the clutch plate 327; respectively, is disposed concentrically about the idler shaft 342 and the annular hub 328 of the fourth gear 352 may rotate relative thereto via at least one needle bearing 341, disposed radially therebetween. At least one spacer 343 and/or at least one positioning element (not depicted) may be employed to militate against an axial movement of the needle bearing 341 along the idler shaft 342. It is understood that the positioning element can be any type of positioning element as desired such as a snap ring, for example. A thrust bearing 345 may be disposed concentrically about the idler shaft 342 and interposed between the annular hub 328 of the fourth gear 352 and the annular hub 329 of the clutch plate 327. The thrust bearing 345 is configured to militate against friction between the annular hubs 328, 329. It should be appreciated that additional thrust bearings 345 may be employed to militate against friction between other components of the electric drive axle 300, if desired, such as between the fourth gear 352 and the second bearing 346, for example. Various types of thrust bearings can be employed as desired.

The first clutch 310 further includes a sleeve 347. The sleeve 347 is concentrically disposed about the annular hub 329 of the clutch plate 327 or the idler shaft 342 when the first clutch 310 is disengaged. It is understood, however, that the sleeve 347 may be concentrically disposed about the annular hub 328 of the fourth gear 352 when the first clutch 310 is disengaged, if desired. An inner peripheral surface of the sleeve 347 includes a plurality of splines (not depicted) formed thereon. The splines are of such shape, size, and number so as to cooperate with the splines of the annular hub 328 of the fourth gear 352 and the annular hub 329 of the clutch plate 327 or the idler shaft 342. In certain embodiments, the sleeve 347 has an axial length sufficient to enable a meshed engagement with both the annular hubs 328, 329 when the first clutch 310 is engaged. The sleeve 347 is coupled to the respective annular hubs 328, 329 of the fourth gear 352 and the clutch plate 327 or the idler shaft 342 to permit a linear actuation thereof to cause the first clutch 310 to be activated from a disengaged position to an engaged position. In certain embodiments, the linear actuation of the sleeve 347 is caused by a controller (not shown) in electrical communication with an operating device (not shown). The operating device (not shown) may be any operating device as desired such as a high-speed low-torque brush less direct current motor, for example. The operating device (not shown) may include an actuator coupled therewith. The actuator may be operatively connected with the sleeve 347 to move the sleeve 347 from a first position when the first clutch 310 is in the disengaged position to a second position when the first clutch 310 is in the engaged position. It is understood that the linear actuation of the sleeve 347 from the first position to the second position thereof may be caused by other methods as desired.

In certain embodiments, the second gear 336 is connected to the output shaft 306 via the second clutch 314. The second clutch 314 is concentrically disposed about the output shaft 306. An actuator mechanism (not depicted) can actuate the second clutch 314; The actuator mechanism can include an actuator, an additional gear set and a roller and ramp assembly. The actuator may be a reversible electric motor as it is compact and easily controllable. It is understood that any other appropriate type of actuator and actuator mechanism may be used such as hydraulic, mechanical, or pneumatic actuators, for example. It should be appreciated that the actuator mechanism for actuating, the first clutch 310 may be the same actuator mechanism for actuating the second clutch 314, if desired.

In the embodiment shown, the second clutch 314 is also a dog clutch. The second clutch 314 includes a plurality of clutch teeth (not depicted) disposed on the second gear 336 and a plurality of clutch teeth (not depicted) disposed on the clutch plate 337 coupled to the output shaft 306. It should appreciated that the clutch teeth may be formed on a separate and distinct component or integrally formed with each of the second gear 336 and the clutch plate 337. In one embodiment, the clutch teeth of the second gear 336 extend outwardly therefrom in the second axial direction and the clutch teeth of the clutch plate 337 extend outwardly therefrom in the first axial direction. The clutch teeth of the second gear 336 are configured to mesh with the clutch teeth of the clutch plate 337. At least one of the second gear 336 and the clutch plate 337 is operatively connected to the output shaft 306 in such manner to allow movement thereof in both the first and second axial directions. The axial movement of at least one of the second gear 336 and the clutch plate 337 facilitates a meshed engagement and disengagement of the clutch teeth of both the second gear 336 and the clutch plate 337, and therefore engagement and disengagement of the second clutch 314. A biasing mechanism (not depicted) such as a spring element, for example, may be disposed within the housing, or interposed between the second gear 336 and the clutch plate 337, to urge at least one of the second gear 336 and the clutch plate 337 in opposite axial directions to cause the disengagement of the clutch teeth thereof. Accordingly, the electric motor 304 drives the third gear 350 when the second clutch 314 is engaged. It should be appreciated that any type of the second clutch 314 can be employed as desired such as a wet clutch assembly, a simple dog clutch assembly, a dog clutch assembly with a synchronizer, and the like, for example.

In certain other embodiments, the second clutch 314 is a shift collar clutch. In such embodiments, the second clutch 314 includes both the second gear 336 and the clutch plate 337 each having an annular hub (not depicted), extending axially outwardly from an outer surface. Each of the annular hubs includes a plurality of splines formed on an outer peripheral surface thereof. The annular hubs may be integrally formed on the respective second gear 336 and clutch plate 337 or coupled thereto as a separate and distinct components thereof, if desired. It should be appreciated that the annular hub of the clutch plate 337 may be integrally formed on the output shaft 306, eliminating the clutch plate 337 as a separate component. Each of the annular hubs of the second gear 336 and the clutch plate 337 is disposed concentrically about the output shaft 306 and the annular hub of the second gear 336 may rotate relative thereto via at least one needle bearing (not depicted), disposed radially therebetween. At least one spacer (not depicted) and/or at least one positioning element (not depicted) may be employed to militate against 10 an axial movement of the needle bearing along the output shaft 306. It is understood that the positioning element can be any type of positioning element as desired such as a snap ring, for example. A thrust bearing (not depicted) may be disposed concentrically about the output shaft 306 and interposed between the annular hub of the second gear 336 and the annular hub of the clutch plate 337. The thrust bearing is configured to militate against friction between the annular hubs. It should be appreciated that additional thrust bearings may be employed to militate against friction between other components of the electric drive axle 300, if desired, such as between the first gear 326 and the bearing 324, for example. Various types of thrust bearings can be employed as desired.

The second clutch 314 further includes a sleeve (not depicted). The sleeve is concentrically disposed about the annular hub of the clutch plate 337 or the output shaft 306 when the second clutch 314 is disengaged. It is understood, however, that the sleeve may be concentrically disposed about the annular hub of the second gear 336 when the second clutch 314 is disengaged, if desired. An inner peripheral surface of the sleeve includes a plurality of splines (not depicted) formed thereon. The splines are of such shape, size, and number so as to cooperate with the splines of the annular hub of the second gear 336 and the annular hub of the clutch plate 337 or the output shaft 306. In certain embodiments, the sleeve has an axial length sufficient to enable a meshed engagement with both the annular hubs when the second clutch 314 is engaged. The sleeve is coupled to the respective annular hubs of the second gear 336 and the clutch plate 337 or the output shaft 306 to permit a linear actuation thereof to cause the second clutch 314 to be activated from a disengaged position to an engaged position. In certain embodiments, the linear actuation of the sleeve is caused by a controller (not shown) in electrical communication with an operating device (not shown). The operating device (not shown) may be any operating device as desired such as a high-speed low-torque brush less direct current motor, for example. The operating device (not shown) may include an actuator coupled therewith. The actuator may be operatively connected with the sleeve to move the sleeve from a first position when the second clutch 314 is in the disengaged position to a second position when the second clutch 314 is in the engaged position. It is understood that the linear actuation of the sleeve from the first position to the second position thereof may be caused by other methods as desired.

In certain embodiments, the first clutch 310 and the second clutch 314 may be substantially simultaneously actuated by a shift member (not depicted). The actuator is configured to cause the shift member to move or rotate in a first direction, and thereby engage the first clutch 310 and disengage the second clutch 314 substantially simultaneously. Additionally, the actuator is configured to cause the shift member to move or rotate in an opposite second direction, and thereby disengage the first clutch 310 and engage the second clutch 314 substantially simultaneously. An actuation of the shift member is typically used to shift the electric drive axle 300 between a first gear ratio and a second gear ratio. It is understood that the shift member may be a cam shaft, if desired.

In certain embodiments, the first compound idler assembly 340 drives a second compound idler assembly 360 via the third gear 350. As illustrated in FIG. 4, the second compound idler assembly 360 is disposed parallel with both the output shaft 306 of the electric motor 304 and the idler shaft 342 of the first compound assembly 340. The second compound idler assembly 360 comprises an idler shaft 362 rotatably supported in the housing via first and second bearings 364, 366. It is understood that each of the bearings 364, 366 can be any type of bearing as desired such as a roller bearing, a ball bearing, a tapered bearing, and the like, for example.

A fifth gear 370 and a sixth gear 372 are coupled for rotation with the idler shaft 362. The fifth gear 370 is disposed axially adjacent to the first bearing 364. The fifth gear 370 is in meshed engagement with the third gear 350 and receives torque therefrom when one of the first and second clutches 310, 314 is engaged and the electric motor 304 drives the electric drive axle 300. The sixth gear 372 is disposed axially adjacent to the second bearing 366. A pair of positioning elements (not depicted) may be respectively disposed on ends of the idler shaft 362 to maintain a position of the bearings 364, 366 and the fifth and sixth gears 370, 372. It is understood that each of the positioning elements can be any type of positioning element as desired such as a snap ring, for example but could use a shim and press fit bearings if the application allows for it.

The sixth gear 372 receives torque from the fifth gear 370 when one of the first and second clutches 310,314 is engaged and the electric motor 304 drives the electric drive axle 300. As illustrated, the sixth gear 372 is in meshed engagement with a seventh gear 374. The sixth gear 372 drives the seventh gear 374 when one of the first and second clutches 310, 314 is engaged and the electric motor 304 drives the electric drive axle 300. The seventh gear 374 is coupled for rotation with a differential 380. The differential 380 is rotatably supported within the housing via a pair of bearings 382, 384. It is understood that each of the bearings 382, 384 can be any type of bearing as desired such as a roller bearing, a ball bearing, a tapered bearing, and the like, for example.

As illustrated in FIG. 4, the differential 380 includes two or more differential pinions 386 disposed within a differential case 388. The differential pinions 386 are coupled with the differential case 388 via a pinion shaft (not depicted). In an embodiment, the pinion shaft may comprise a cross member. The differential pinions 386 are in meshed engagement with first and second side gears 390, 392. The first and second side gears 390, 392 are coupled for rotation with the first and second half shafts 16, 18, respectively, shown in FIG. 1.

In operation, when a first gear ratio is desired, the actuator mechanism causes the first clutch 310 to engage, while the second clutch 314 remains disengaged. When the first clutch 310 is engaged, the output shaft 306 of the electric motor 304 causes the output shaft 306 and the first gear 326 coupled thereto, to rotate therewith. The second gear 336 may freely rotate with the third gear 350. A rotation of the first gear 326 drives the fourth gear 352 of the first compound idler assembly 340, and causes the idler shaft 342 and the third gear 350 coupled thereto, to rotate therewith. A rotation of the third gear 350 drives the fifth gear 370 of the second compound idler assembly 360, and causes the idler shaft 362 and the sixth gear 372 coupled thereto, to rotate therewith. A rotation of the sixth gear 372 drives the seventh gear 374 of the differential 380, and causes the differential case 388 to rotate therewith. A rotation of the differential case 388 further causes the first and second half shafts 16, 18 to rotate therewith. The rotation of the differential 380 transfers a desired first torque from the output shaft 306 to the first and second axle shafts 16, 18. When the electric drive axle 300 is in a power generation mode, the torque transfer described above is reversed.

When a second gear ratio, which is less than the first gear ratio, is desired, the actuator mechanism causes the second clutch 314 to engage, while the first clutch 310 remains disengaged. When the second clutch 314 is engaged, the output shaft 306 of the electric motor 304 causes the second gear 336 to rotate therewith. The first gear 326 may freely rotate with the fourth gear 352. A rotation of the second gear 336 drives the third gear 350 of the first compound idler assembly 340, and causes the idler shaft 342 and the third gear 350 to rotate therewith. A rotation of the third gear 350 drives the fifth gear 370 of the second compound idler assembly 360, and causes the idler shaft 362 and the sixth gear 372 coupled thereto, to rotate therewith. A rotation of the sixth gear 372 drives the seventh gear 374 of the differential 380, and causes the differential case 388 to rotate therewith. A rotation of the differential case 388 further causes the first and second half shafts 16, 18 to rotate therewith. The rotation of the differential 380 transfers a desired second torque from the output shaft 306, which is less than the first torque, to the first and second axle shafts 16, 18. When the electric drive axle 300 is in a power generation mode, the torque transfer described above is reversed.

Figure 5:
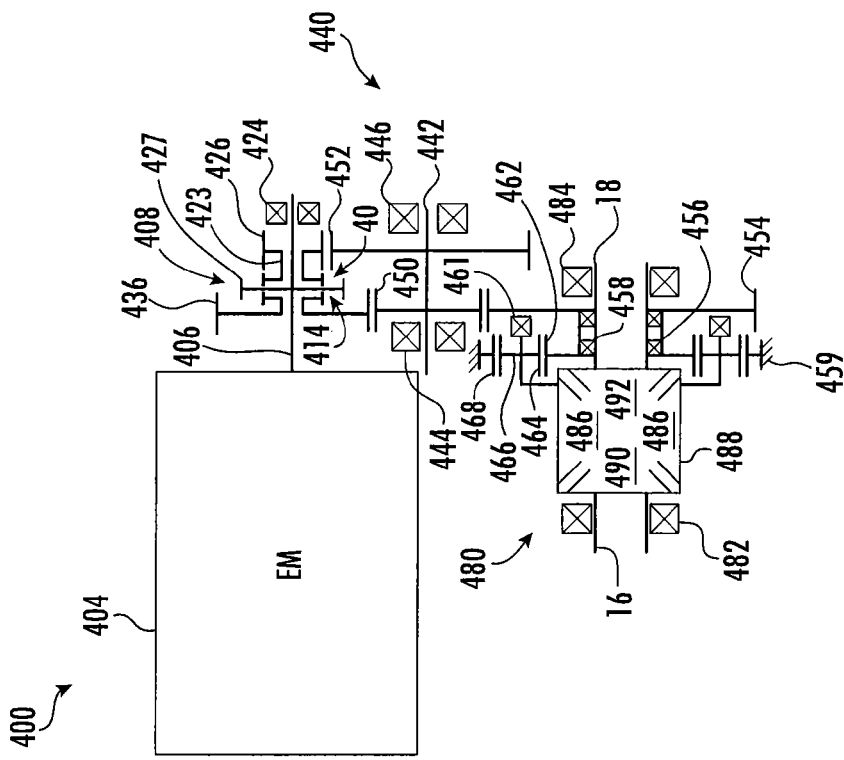
FIG. 5 is a schematic diagram of a portion of an electric drive axle of the vehicle driveline shown in FIG. 1 according to another embodiment, including an electric motor, a compound idler assembly, a planetary gear set, and a differential.

In a certain embodiment illustrated in FIG. 5, the vehicle may include the electric drive axle 400. The electric drive axle 400 may comprise an integrated drive system. In an embodiment, the electric drive axle 400 includes an electric motor 404 (e.g., electromotor) coupled with a power source (not depicted). The electric motor 404 may be a permanent magnet synchronous machine comprising a stator disposed concentrically about a rotor. The electric drive axle 400 may additionally comprise an inverter (not depicted) for converting direct current to alternating current when the electric motor 404 is utilized to drive the vehicle, and for converting alternating current to direct current when the vehicle decelerates. The electric motor 404 may be referred to herein as a motor-generator. Further, the electric drive axle 400 may include cooling fluid (not depicted) such as, but not limited to, automatic transmission fluid or axle oil integrated with the electric drive axle 400 lubricant for cooling the electric motor 404 and the inverter. In another embodiment (not depicted), the cooling fluid for the electric motor 404 and the inverter may not be integrated with the axle oil. The electric drive may have either a co-axial or off axis layout where the axle shaft connecting the wheel to the differential does not pass through the center or the motor but rather parallel to the motor axis.

A motor output shaft 406 is coupled with the rotor of the electric motor 404 for rotation therewith. The output shaft 406 is connected to a clutch assembly 408. It should be appreciated that any type of clutch assembly 408 can be employed as desired such as a wet clutch assembly, a simple dog clutch assembly, a dog clutch assembly with a synchronizer, and the like, for example.

In the embodiment shown, the clutch assembly 408 includes a first or axially outer clutch 410 concentrically disposed about the output shaft 406 and a second or axially inner clutch 414 concentrically disposed about the output shaft 406. The clutches 410, 414 are positioned axially adjacent to each other such that a single actuator mechanism (not depicted) can separate actuate each of the clutches 410, 414. Accordingly, only one of the clutches 410, 414 is engaged at any one time. The actuator mechanism can include an actuator (not depicted), an additional gear set (not depicted) and a roller and ramp assembly (not depicted). The actuator may be a reversible electric motor as it is compact and easily controllable. It is understood that any other appropriate type of actuator and actuator mechanism may be used such as hydraulic, mechanical, or pneumatic actuators, for example.

The clutches 410, 414 are connected to a common shaft 423. The common shaft 423 is disposed co-axially with the output shaft 406 and is rotatably supported in a housing 459 (e.g. an axle housing) by at least one bearing 424. It is understood that the at least one bearing 424 can be any type of bearing as desired such as a roller bearing, a ball bearing, a tapered bearing, and the like, for example. A first gear 426 is coupled for rotation with the common shaft 423. The first gear 426 may rotate relative to the output shaft 406 via at least one bearing (not depicted) disposed radially therebetween. It is understood that the at least one bearing can be any type of bearing as desired such as a needle bearing, a roller bearing, a ball bearing, a tapered bearing, and the like, for example. Accordingly, the electric motor 404 drives the first gear 426 when the first clutch 410 is engaged. In certain embodiments, the first gear 426 is disposed axially adjacent to the at least one bearing 424.

A second gear 436 is operably connected to the second clutch 414. In certain embodiments, the second gear 436 is coupled for rotation with the common shaft 423. The second gear 436 may rotate relative to the output shaft 406 via at least one bearing (not depicted) disposed radially therebetween. It is understood that the at least one bearing can be any type of bearing as desired such as a needle bearing, a roller bearing, a ball bearing, a tapered bearing, and the like, for example. Accordingly, the electric motor 404 drives the second gear 436 when the second clutch 414 is engaged. In certain embodiments, the second gear 436 is disposed axially adjacent to the electric motor 404.

In the embodiment shown, the first clutch 410 is a dog clutch. The first clutch 410 includes a plurality of clutch teeth (not depicted) disposed on the first gear 426 and a plurality of clutch teeth (not depicted) disposed on a clutch plate 427 coupled to the output shaft 406. It should be appreciated that the clutch teeth may be formed on a separate and distinct component or integrally formed with each of the first gear 426 and the clutch plate 427. In one embodiment, the clutch teeth of the first gear 426 extend outwardly therefrom in a first axial direction and the clutch teeth of the clutch plate 427 extend outwardly therefrom in an opposite second axial direction. The clutch teeth of the first gear 426 are configured to mesh with the clutch teeth of the clutch plate 427. At least one of the first gear 426 and the clutch plate 427 is operatively connected to at least one of the output shaft 406 and the common shaft 423 in such manner to allow movement thereof in both the first and second axial directions. The axial movement of at least one of the first gear 426 and the clutch plate 427 facilitates a meshed engagement and disengagement of the clutch teeth of both the first gear 426 and the clutch plate 427, and therefore engagement and disengagement of the first clutch 410. A biasing mechanism (not depicted) such as a spring element, for example, may be disposed within the housing, or interposed between the first gear 426 and the clutch plate 427, to urge at least one of the first gear 426 and the clutch plate 427 in opposite axial directions to cause the disengagement of the clutch teeth thereof.

In the embodiment shown, the second clutch 414 is also a dog clutch. The second clutch 414 includes a plurality of clutch teeth (not depicted) disposed on the second gear 436 and a plurality of clutch teeth (not depicted) disposed on the clutch plate 427 coupled to the output shaft 406. It should appreciated that the clutch teeth may be formed on a separate and distinct component or integrally formed with each of the second gear 436 and the clutch plate 427. In one embodiment, the clutch teeth of the second gear 436 extend outwardly therefrom in the second axial direction and the clutch teeth of the clutch plate 427 extend outwardly therefrom in the first axial direction. The clutch teeth of the second gear 436 are configured to mesh with the clutch teeth of the clutch plate 427. At least one of the second gear 436 and the clutch plate 427 is operatively connected to at least one of the output shaft 406 and the common shaft 423 in such manner to allow movement thereof in both the first and second axial directions. The axial movement of at least one of the second gear 436 and the clutch plate 427 facilitates a meshed engagement and disengagement of the clutch teeth of both the second gear 436 and the clutch plate 427, and therefore engagement and disengagement of the second clutch 414. A biasing mechanism (not depicted) such as a spring element, for example, may be disposed within the housing, or interposed between the second gear 436 and the clutch plate 427, to urge at least one of the second gear 436 and the clutch plate 427 in opposite axial directions to cause the disengagement of the clutch teeth thereof.

In certain other embodiments, at least one of the first and second clutches 410, 414 is a shift collar clutch. In such embodiments, the first clutch 410 includes both the first gear 426 and the clutch plate 427 each having an annular hub (not depicted) extending axially outwardly from an outer surface. Each of the annular hubs includes a plurality of splines (not depicted) formed on an outer peripheral surface thereof. The annular hubs may be integrally formed on the respective first gear 426 and clutch plate 427 or coupled thereto as a separate and distinct components thereof, if desired. It should be appreciated that the annular hub of the clutch plate 427 may be integrally formed on the output shaft 406, eliminating the clutch plate 427 as a separate component. The annular hub of the first gear 426 is disposed concentrically about the common shaft 423 and may rotate relative thereto via a needle bearing (not depicted), disposed radially therebetween. At least one spacer (not depicted) and/or at least one positioning element (not depicted) may be employed to militate against an axial movement of the needle bearing along the common shaft 423. It is understood that the positioning element can be any type of positioning element as desired such as a snap ring, for example. A thrust bearing (not depicted) may be disposed concentrically about the common shaft 423 and interposed between the annular hub of the first gear 426 and the annular hub of the clutch plate 427 or the output shaft 406. The thrust bearing is configured to militate against friction between the annular hubs. It should be appreciated that additional thrust bearings may be employed to militate against friction between other components of the electric drive axle 400, if desired, such as between the first gear 426 and the bearing 424, for example. Various types of thrust bearings can be employed as desired.

The first clutch 410 further includes a sleeve (not depicted). The sleeve is concentrically disposed about the annular hub of the clutch plate 427 or the output shaft 406 when the first clutch 410 is disengaged. It is understood, however, that the sleeve may be concentrically disposed about the annular hub of the first gear 426 when the first clutch 410 is disengaged, if desired. An inner peripheral surface of the sleeve includes a plurality of splines (not depicted) formed thereon. The splines are of such shape, size, and number so as to cooperate with the splines of the annular hub of both the first gear 426 and the clutch plate 427 or the output shaft 406. In certain embodiments, the sleeve has an axial length sufficient to enable a meshed engagement with both the annular hubs when the first clutch 410 is engaged. The sleeve is coupled to the annular hubs of the first gear 426 and the clutch plate 427 or the output shaft 406 to permit a linear actuation thereof to cause the first clutch 410 to be activated from a disengaged position to an engaged position. In certain embodiments, the linear actuation of the sleeve is caused by a controller (not shown) in electrical communication with an operating device (not shown). The operating device (not shown) may be any operating device as desired such as a high-speed low-torque brush less direct current motor, for example. The operating device (not shown) may include an actuator coupled therewith. The actuator may be, operatively connected with the sleeve to move the sleeve from a first position when the first clutch 410 is in the disengaged position to a second position when the first clutch 410 is in the engaged position. It is understood that the linear actuation of the sleeve from the first position to the second position thereof may be caused by other methods as desired.

The second clutch 414 includes both the second gear 436 and the clutch plate 427 each having an annular hub (not depicted) extending axially outwardly from an outer surface. Each of the annular hubs includes a plurality of splines (not depicted) formed on an outer peripheral surface thereof. The annular hubs may be integrally formed on the respective second gear 436 and clutch plate 427 or coupled thereto as a separate and distinct components thereof, if desired. It should be appreciated that the annular hub of the clutch plate 427 may be integrally formed on the output shaft 406, eliminating the clutch plate 427 as a separate component. The annular hub of the second gear 436 is disposed concentrically about the common shaft 423 and may rotate relative thereto via a needle bearing (not depicted), disposed radially therebetween. At least one spacer (not depicted) and/or at least one positioning element (not depicted) may be employed to militate against an axial movement of the needle bearing along the common shaft 423. It is understood that the positioning element can be any type of positioning element as desired such as a snap ring, for example. A thrust bearing (not depicted) may be disposed concentrically about the common shaft 423 and interposed between the annular hub of the second gear 436 and the annular hub of the clutch plate 427 or the output shaft 406. The thrust bearing is configured to militate against friction between the annular hubs. Various types of thrust bearings can be employed as desired.

The second clutch 414 also further includes a sleeve (not depicted). The sleeve is concentrically disposed about the annular hub of the clutch plate 427 or the output shaft 406 when the second clutch 414 is disengaged. It is understood, however, that the sleeve may be concentrically disposed about the annular hub of the second gear 436 when the second clutch 414 is disengaged, if desired. An inner peripheral surface of the sleeve includes a plurality of splines (not depicted) formed thereon. The splines are of such shape, size, and number so as to cooperate with the splines of the annular hub of both the second gear 436 and the clutch plate 427 or the output shaft 406. In certain embodiments, the sleeve has an axial length sufficient to enable a meshed engagement with both the annular hubs when the second clutch 414 is engaged. The sleeve is coupled to the annular hubs of the second gear 436 and the clutch plate 427 or the output shaft 406 to permit a linear actuation thereof to cause the second clutch 414 to be activated from a disengaged position to an engaged position. In certain embodiments, the linear actuation of the sleeve is caused by a controller (not shown) in electrical communication with an operating device (not shown). The operating device (not shown) may be any operating device as desired such as a high-speed low-torque brush less direct current motor, for example. The operating device (not shown) may include an actuator coupled therewith. The actuator may be operatively connected with the sleeve to move the sleeve from a first position when the second clutch 414 is in the disengaged position to a second position when the second clutch 414 is in the engaged position. It is understood that the linear actuation of the sleeve from the first position to the second position thereof may be caused by other methods as desired.

In certain embodiments, the electric motor 404 drives a first compound idler assembly 440 via the first gear 426 when the first clutch 410 is engaged, or via the second gear 436 when the second clutch 414 is engaged. As illustrated in FIG. 5, the first compound idler assembly 440 is disposed parallel with the output shaft 406 of the electric motor 404. The first compound idler assembly 440 comprises an idler shaft 442 rotatably supported in the housing via first and second bearings 444, 446. It is understood that each of the bearings 444, 446 can be any type of bearing as desired such as a roller bearing, a ball bearing, a tapered bearing, and the like, for example.

A third gear 450 and a fourth gear 452 concentrically disposed about and coupled for rotation with the idler shaft 442. The third gear 450 is disposed axially adjacent the first bearing 444. The third gear 450 is in meshed engagement with the second gear 436 and receives torque therefrom when the second clutch 414 is engaged and the electric motor 404 drives the electric drive axle 400. The fourth gear 452 is disposed axially adjacent the second bearing 446. The fourth gear 452 is in meshed engagement with the first gear 426 and receives torque therefrom when the first clutch 410 is engaged and the electric motor 404 drives the electric drive axle 400. A pair of positioning elements (not depicted) may be respectively disposed on ends of the idler shaft 442 to maintain a position of the bearings 444, 446 and the third and fourth gears 450,452. It is understood that each of the positioning elements can be any type of positioning element as desired such as a snap ring, for example but could use a shim and press fit bearings if the application allows for it. As illustrated, the third gear 450 is in meshed engagement with a fifth gear 454. The fifth gear 454 is concentrically disposed about one of the first and second half shafts 16, 18, respectively. As shown, the fifth gear 454 is disposed about the second half shaft 18. However, it is understood that the fifth gear 454 may be disposed about the first half shaft 16 if desired. In certain embodiments, the fifth gear 454 may rotate relative to the one of the first and second half shafts 16, 18 via at least one bearing 456 disposed radially therebetween. It is understood that the at least one bearing 456 can be any type of bearing as desired such as a needle bearing, a roller bearing, a ball bearing, a tapered bearing, and the like, for example. The third gear 450 drives the fifth gear 454 when one of the first and second clutches 410,414 is engaged and the electric motor 404 drives the electric drive axle 400.

A planetary gear set 460 is also concentrically disposed about one of the first and second half shafts 16, 18. As shown, the planetary gear set 460 is disposed about the second half shaft 18. However, it is understood that the planetary gear set 460 may be disposed about the first half shaft 16 if desired. In certain embodiments, the planetary gear set 460 may rotate relative to the one of the first and second half shafts 16, 18 via at least one bearing 458 disposed radially therebetween. It is understood that the at least one bearing 458 can be any type of bearing as desired such as a needle bearing, a roller bearing, a ball bearing, a tapered bearing, and the like, for example.

The planetary gear set 460 includes a sun gear 462, a plurality of planet gears 464 mounted on a carrier 466, and an annulus 468. The planetary gear set 460 is configured to produce a certain gear ratio between the fifth gear 454 and a differential 480. In certain embodiments, the planetary gear set 460 is configured to produce a reduction in the gear ratio between the fifth gear 454 and the differential 480. It is understood, however, that the reduction in the gear ratio between the fifth gear 454 and the differential 480 depends upon which one of the sun gear 462, the planet gears 464, and the annulus 468 is operatively connected to the fifth gear 454, which one of the sun gear 462, the planet gears 464, and the annulus 468 is stationary, and which one of the sun gear 462, the planet gears 464, and the annulus 468 is operatively connected to the differential 480.

It should be appreciated that the fifth gear 454 and the planetary gear set 460 may be operably connected and rotatably coupled to the differential 480 and the one of the first and second half shafts 16, 18 by various other methods as desired. It is also understood that the planetary gear set 460 can include any number and size of planet gears 464 as desired. One of ordinary skill in the art should further understand that the planet gears 464 may be mounted at various positions on the carrier 466. As illustrated, each of the planet gears 464 is in meshed engagement with the sun gear 462 and the annulus 468. Various methods of meshed engagement between each of the planet gears 464, the sun gear 462, and the annulus 468 can be employed as desired.

In the embodiment shown in FIG. 5, the sun gear 462 is operatively connected to the fifth gear 454, the planet gears 464 are operatively connected to a differential case 488 of the differential 480 via the carrier 466, and the annulus 468 stationary and fixedly mounted on the housing. For example, the annulus 468 may be fixedly mounted on the axle housing, if desired. It should be appreciated that the sun gear 462 may be operatively connected to the fifth gear 454 by any suitable method as desired. The planetary gear set 460 and the differential 480 are rotatably supported within the housing via a pair of bearings 482, 484, and at least one bearing 461, which is disposed the fifth gear 454. It is understood that each of the bearings 482, 484, 461 can be any type of bearing as desired such as a roller bearing, a ball bearing, a tapered bearing, and the like, for example.

The differential 480 includes two or more differential pinions 486 disposed within the differential case 488. The differential pinions 486 are coupled with the differential case 488 via a pinion shaft (not depicted). In an embodiment, the pinion shaft may comprise a cross member (not depicted). The differential pinions 486 are in meshed engagement with first and second side gears 490,492. The first and second side gears 490, 492 are coupled for rotation with the first and second half shafts 16, 18, respectively, shown in FIG. 1.

In operation, when a first gear ratio is desired, the actuator mechanism causes the first clutch 410 to engage, while the second clutch 414 remains disengaged. When the first clutch 410 is engaged, the output shaft 406 of the electric motor 404 causes the common shaft 423 and the first gear 426 coupled thereto, to rotate therewith. The second gear 436 may freely rotate with the third gear 450. A rotation of the first gear 426 drives the fourth gear 452, and causes the idler shaft 442 and the third gear 450 coupled thereto, to rotate therewith. A rotation of the third gear 450 drives the fifth gear 454, and causes the sun gear 462 of the planetary gear set 460 to rotate therewith. A rotation of the sun gear 462 drives the planet gears 464 of the planetary gear set 460, and causes the carrier 466 coupled thereto, to rotate therewith. A rotation of the carrier 466 of the planetary gear set 460 simultaneously causes the differential case 488 to rotate therewith. A rotation of the differential case 488 further causes the first and second half shafts 16, 18 to rotate therewith. The rotation of the differential 480 transfers a desired first torque from the output shaft 406 to the first and second axle shafts 16, 18. When the electric drive axle 400 is in a power generation mode, the torque transfer described above is reversed.

When a second gear ratio, which is less than the first gear ratio, is desired; the actuator mechanism causes the second clutch 414 to engage, while the first clutch 410 remains disengaged. When the second clutch 414 is engaged, the output shaft 406 of the electric motor 404 causes the second gear 436 to rotate therewith. The first gear 426 may freely rotate with the fourth gear 452. A rotation of the second gear 436 drives the third gear 450, and causes the idler shaft 442 and the third gear 450 to rotate therewith. A rotation of the third gear 450 drives the fifth gear 454, and causes the sun gear 462 of the planetary gear set 460 to rotate therewith. A rotation of the sun gear 462 drives the planet gears 464 of the planetary gear set 460, and causes the carrier 466 coupled thereto, to rotate therewith. A rotation of the carrier 466 of the planetary gear set 460 simultaneously causes the differential case 488 to rotate therewith. A rotation of the differential case 488 further causes the first and second half shafts 16, 18 to rotate therewith. The rotation of the differential 480 transfers a desired second torque from the output shaft 406, which is less than the first torque, to the first and second axle shafts 16, 18. When the electric drive axle 400 is in a power generation mode, the torque transfer described above is reversed.

Figure 6:
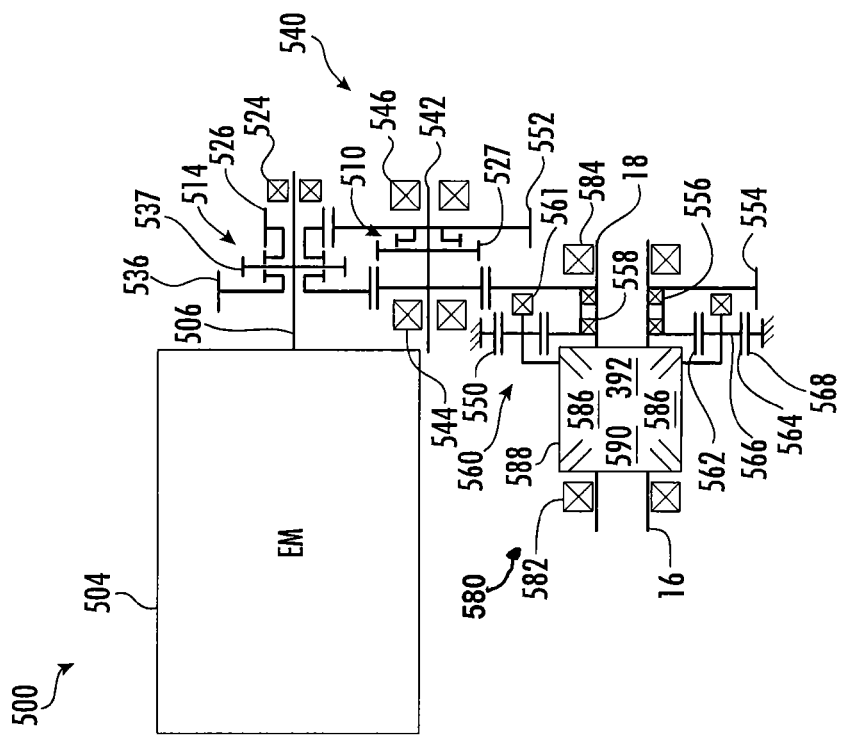
FIG. 6 is a schematic diagram of a portion of an electric drive axle of the vehicle driveline shown in FIG. 1 according to another embodiment, including an electric motor, a compound idler assembly, a planetary gear set, and a differential.

Referring now to the embodiment shown in FIG. 6, the vehicle may include the electric drive axle 500. The electric drive axle 500 may comprise an integrated drive system. In an embodiment, the electric drive axle 500 includes an electric motor 504 (e.g., electromotor) coupled with a power source (not depicted). The electric motor 504 may be a permanent magnet synchronous machine comprising a stator disposed concentrically about a rotor. The electric drive axle 500 may additionally comprise an inverter (not depicted) for converting direct current to alternating current when the electric motor 504 is utilized to drive the vehicle, and for converting alternating current to direct current when the vehicle decelerates. The electric motor 504 may be referred to herein as a motor-generator. Further, the electric drive axle 500 may include cooling fluid (not depicted) such as, but not limited to, automatic transmission fluid or axle oil integrated with the electric drive axle 500 lubricant for cooling the electric motor 504 and the inverter. In another embodiment (not depicted), the cooling fluid for the electric motor 504 and the inverter may not be integrated with the axle oil. The electric drive may have either a co-axial or off axis layout where the axle shaft connecting the wheel to the differential does not pass through the center or the motor but rather parallel to the motor axis.

A motor output shaft 506 is coupled with the rotor of the electric motor 504 for rotation therewith. The output shaft 506 is rotatably supported within a housing (not depicted) (e.g. an axle housing) by at least one bearing 524. It is understood that the at least one bearing 524 can be any type of bearing as desired such as a roller bearing, a ball bearing, a tapered bearing, and the like, for example. The output shaft 506 includes a first gear 526 rotatably coupled thereto. In certain embodiments, the first gear 526 is concentrically disposed about the output shaft 506 axially adjacent the at least one bearing 524. A second gear 536 is coupled to the output shaft 506. In certain embodiments, the second gear 536 is concentrically disposed about the output shaft 506 axially adjacent the first gear 526. The second gear 536 may rotate relative to the output shaft 506 via at least one bearing (not depicted) disposed radially therebetween. It is understood that the at least one bearing can be any type of bearing as desired such as a needle bearing, a roller bearing, a ball bearing, a tapered bearing, and the like, for example.

In certain embodiments, the electric motor 504 drives a first compound idler assembly 540 via the first gear 526 when a first clutch 510 (described in further detail hereinafter) is engaged, or via the second gear 536 when a second clutch 514 (described in further detail hereinafter) is engaged. As illustrated in FIG. 6, the first compound idler assembly 540 is disposed parallel with the output shaft 506 of the electric motor 504. The first compound idler assembly 540 comprises an idler shaft 542 rotatably supported in the housing via first and second bearings 544, 546. It is understood that each of the bearings 544, 546 can be any type of bearing as desired such as a roller bearing, a ball bearing, a tapered bearing, and the like, for example.

A third gear 550 and a fourth gear 552 are coupled to the idler shaft 542. The third gear 550 is concentrically disposed about the idler shaft 542 axially adjacent the first bearing 544. The third gear 550 is in meshed engagement with the second gear 536 and receives torque therefrom when the second clutch 514 is engaged and the electric motor 504 drives the electric drive axle 500. The fourth gear 552 is concentrically disposed about the idler shaft 542 axially adjacent to the second bearing 546. The fourth gear 552 may rotate relative to the idler shaft 542 via at least one bearing (not depicted) disposed radially therebetween. It is understood that the at least one bearing can be any type of bearing as desired such as a needle bearing, a roller bearing, a ball bearing, a tapered bearing, and the like, for example. The fourth gear 552 is in meshed engagement with the first gear 526 and receives torque therefrom when the first clutch 510 is engaged and the electric motor 504 drives the electric drive axle 500. A pair of positioning elements (not depicted) may be respectively disposed on ends of the idler shaft 542 to maintain a position of the bearings 544, 546 and the third and fourth gears 550, 552. It is understood that each of the positioning elements can be any type of positioning element as desired such as a snap ring, for example but could use a shim and press fit bearings if the application allows for it.

As illustrated, the fourth gear 552 is connected to the idler shaft 542 by the first clutch 510. The first clutch 510 is concentrically disposed about the idler shaft 542. An actuator mechanism (not depicted) can actuate the first clutch 510. The actuator mechanism can include an actuator, an additional gear set and a roller and ramp assembly. The actuator may be a reversible electric motor as it is compact and easily controllable. It is understood that any other appropriate type of actuator and actuator mechanism may be used such as hydraulic, mechanical, or pneumatic actuators, for example.

In the embodiment shown, the first clutch 510 is a dog clutch. The first clutch 510 includes a plurality of clutch teeth (not depicted) disposed on the fourth gear 552 and a plurality of clutch teeth (not depicted) disposed on a clutch plate 527 coupled to the idler shaft 542. It should be appreciated that the clutch teeth may be formed on a separate and distinct component or integrally formed with each of the fourth gear 552 and the clutch plate 527. In one embodiment, the clutch teeth of the 20 fourth gear 552 extend outwardly therefrom in the first axial direction and the clutch teeth of the clutch plate 527 extend outwardly therefrom in the opposite second axial direction. The clutch teeth of the fourth gear 552 are configured to mesh with the clutch teeth of the clutch plate 527. At least one of the fourth gear 552 and the clutch plate 527 is operatively connected to the idler shaft 542 in such manner to allow movement thereof in both the first and second axial directions. The axial movement of at least one of the fourth gear 552 and the clutch plate 527 facilitates a meshed engagement and disengagement of the clutch teeth of both the fourth gear 552 and the clutch plate 527, and therefore engagement and disengagement of the first clutch 510. A biasing mechanism (not depicted) such as a spring element, for example, may be disposed within the housing, or interposed between the fourth gear 552 and the clutch plate 527, to urge at least one of the fourth gear 552 and the clutch plate 527 in opposite axial directions to cause the disengagement of the clutch teeth thereof. Accordingly, the electric motor 504 drives the fourth gear 552 when the first clutch 510 is engaged. It should be appreciated that any type of the first clutch 510 can be employed as desired such as a wet clutch assembly, a simple dog clutch assembly, a dog clutch assembly with a synchronizer, and the like, for example.

Figure 10A:
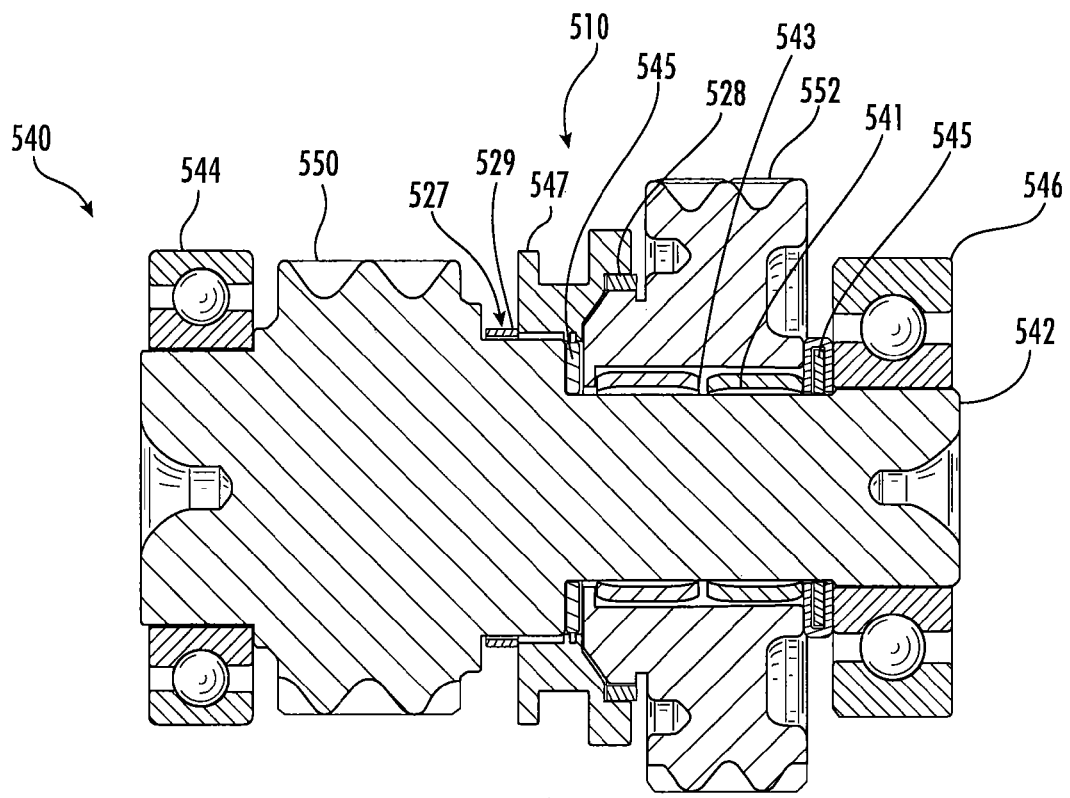
FIG. 10A is a sectional view of the compound idler assembly of the electric drive axle shown in FIG. 6.
Figure 10B:
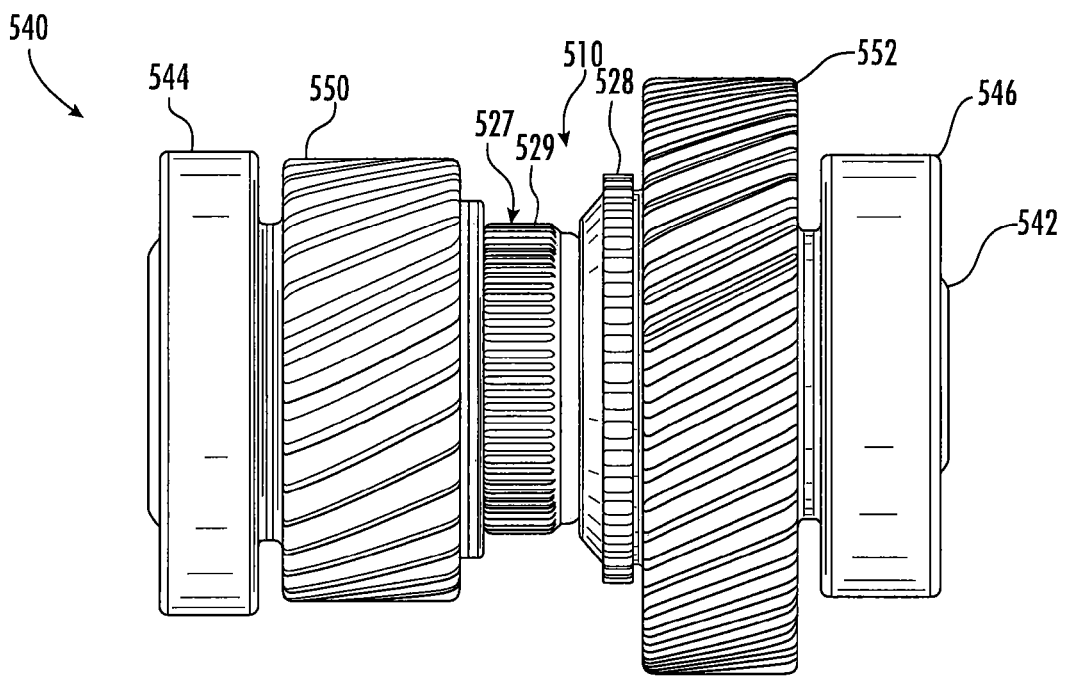
FIG. 10B is an elevational view of the compound idler assembly shown in FIG. 10A.

In certain other embodiments, shown in FIGS. 10A-108, the first clutch 510 is a shift collar clutch. In such embodiments, the first clutch 510 includes both the fourth gear 552 and the clutch plate 527 each having an annular hub 528, 529, respectively, extending axially outwardly from an outer surface. Each of the annular hubs 528, 529 includes a plurality of splines formed on an outer peripheral surface thereof. The annular hubs 528, 529 may be integrally formed on the respective fourth gear 552 and clutch plate 527 or coupled thereto as a separate and distinct components thereof, if desired. It should be appreciated that the annular hub of the clutch plate 527 may be integrally formed on the idler shaft 542, eliminating the clutch plate 527 as a separate component. Each of the annular hubs 528, 529 of the fourth gear 552 and the clutch plate 527, respectively, is disposed concentrically about the idler shaft 542 and the annular hub 528 of the fourth gear 552 may rotate relative thereto via at least one needle bearing 541, disposed radially therebetween. At least one spacer 543 and/or at least one positioning element (not depicted) may be employed to militate against an axial movement of the needle bearing 541 along the idler shaft 542. It is understood that the positioning element can be any type of positioning element as desired such as a snap ring, for example. A thrust bearing 545 may be disposed concentrically about the idler shaft 542 and interposed between the annular hub 528 of the fourth gear 552 and the annular hub 529 of the clutch plate 527. The thrust bearing 545 is configured to militate against friction between the annular hubs 528, 529. It should be appreciated that additional thrust bearings 545 may be employed to militate against friction between other components of the electric drive axle 500, if desired, such as between the fourth gear 552 and the second bearing 546, for example. Various types of thrust bearings can be employed as desired.

The first clutch 510 further includes a sleeve 547. The sleeve 547 is concentrically disposed about the annular hub 529 of the clutch plate 527 or the idler shaft 542 when the first clutch 510 is disengaged. It is understood, however, that the sleeve 547 may be concentrically disposed about the annular hub 528 of the fourth gear 552 when the first clutch 510 is disengaged, if desired. An inner peripheral surface of the sleeve 547 includes a plurality of splines (not depicted) formed thereon. The splines are of such shape, size, and number so as to cooperate with the splines of the annular hub 528 of the fourth gear 552 and the annular hub 529 of the clutch plate 527 or the idler shaft 542. In certain embodiments, the sleeve 547 has an axial length sufficient to enable a meshed engagement with both the annular hubs 528, 529 when the first clutch 510 is engaged. The sleeve 547 is coupled to the respective annular hubs 528, 529 of the fourth gear 552 and the clutch plate 527 or the idler shaft 542 to permit a linear actuation thereof to cause the first clutch 510 to be activated from a disengaged position to an engaged position. In certain embodiments, the linear actuation of the sleeve 547 is caused by a controller (not shown) in electrical communication with an operating device (not shown). The operating device (not shown) may be any operating device as desired such as a high-speed low-torque brush less direct current motor, for example. The operating device (not shown) may include an actuator coupled therewith. The actuator may be operatively connected with the sleeve 547 to move the sleeve 547 from a first position when the first clutch 510 is in the disengaged position to a second position when the first clutch 510 is in the engaged position. It is understood that the linear actuation of the sleeve 547 from the first position to the second position thereof may be caused by other methods as desired.

Referring now to FIG. 6, the second gear 536 is connected to the output shaft 506 via the second clutch 514. The second clutch 514 is concentrically disposed about the output shaft 506. An actuator mechanism (not depicted) can actuate the second clutch 514. The actuator mechanism can include an actuator, an additional gear set and a roller and ramp assembly. The actuator may be a reversible electric motor as it is compact and easily controllable. It is understood that any other appropriate type of actuator and actuator mechanism may be used such as hydraulic, mechanical, or pneumatic actuators, for example. It should be appreciated that the actuator mechanism for actuating the first clutch 510 may be the same actuator mechanism for actuating the second clutch 514, if desired.

In the embodiment shown, the second clutch 514 is also a dog clutch. The second clutch 514 includes a plurality of clutch teeth (not depicted) disposed on the second gear 536 and a plurality of clutch teeth (not depicted) disposed on the clutch plate 537 coupled to the output shaft 506. It should appreciated that the clutch teeth may be formed on a separate and distinct component or integrally formed with each of the second gear 536 and the clutch plate 537. In one embodiment, the clutch teeth of the second gear 536 extend outwardly therefrom in the second axial 10 direction and the clutch teeth of the clutch plate 537 extend outwardly therefrom in the first axial direction. The clutch teeth of the second gear 536 are configured to mesh with the clutch teeth of the clutch plate 537. At least one of the second gear 536 and the clutch plate 537 is operatively connected to the output shaft 506 in such manner to allow movement thereof in both the first and second axial 15 directions. The axial movement of at least one of the second gear 536 and the clutch plate 537 facilitates a meshed engagement and disengagement of the clutch teeth of both the second gear 536 and the clutch plate 537, and therefore engagement and disengagement of the second clutch 514. A biasing mechanism (not depicted) such as a spring element, for example, may be disposed within the housing, or interposed between the second gear 536 and the clutch plate 537, to urge at least one of the second gear 536 and the clutch plate 537 in opposite axial directions to cause the disengagement of the clutch teeth thereof. Accordingly, the electric motor 504 drives the third gear 550 when the second clutch 514 is engaged. It should be appreciated that any type of the second clutch 514 can be employed as desired such as a wet clutch assembly, a simple dog clutch assembly, a dog clutch assembly with a synchronizer, and the like, for example.

In certain other embodiments, the second clutch 514 is a shift collar clutch. In such embodiments, the second clutch 514 includes both the second gear 536 and the clutch plate 537 each having an annular hub (not depicted), extending axially outwardly from an outer surface. Each of the annular hubs includes a plurality of splines formed on an outer peripheral surface thereof. The annular hubs may be integrally formed on the respective second gear 536 and clutch plate 537 or coupled thereto as a separate and distinct components thereof, if desired. It should be appreciated that the annular hub of the clutch plate 537 may be integrally formed on the output shaft 506, eliminating the clutch plate 537 as a separate component. Each of the annular hubs of the second gear 536 and the clutch plate 537 is disposed concentrically about the output shaft 506 and the annular hub of the second gear 536 may rotate relative thereto via at least one needle bearing (not depicted), disposed radially therebetween. At least one spacer (not depicted) and/or at least one positioning element (not depicted) may be employed to militate against an axial movement of the needle bearing along the output shaft 506. It is understood that the positioning element can be any type of positioning element as desired such as a snap ring, for example. A thrust bearing (not depicted) may be disposed concentrically about the output shaft 506 and interposed between the annular hub of the second gear 536 and the annular hub of the clutch plate 537. The thrust bearing is configured to militate against friction between the annular hubs. It should be appreciated that additional thrust bearings may be employed to militate against friction between other components of the electric drive axle 500, if desired, such as between the first gear 526 and the bearing 524, for example. Various types of thrust bearings can be employed as desired.

The second clutch 514 further includes a sleeve (not depicted). The sleeve is concentrically disposed about the annular hub of the clutch plate 537 or the output shaft 506 when the second clutch 514 is disengaged. It is understood, however, that the sleeve may be concentrically disposed about the annular hub of the second gear 536 when the second clutch 514 is disengaged, if desired. An inner peripheral surface of the sleeve includes a plurality of splines (not depicted) formed thereon. The splines are of such shape, size, and number so as to cooperate with the splines of the annular hub of the second gear 536 and the annular hub of the clutch plate 537 or the output shaft 506. In certain embodiments, the sleeve has an axial length sufficient to enable a meshed engagement with both the annular hubs when the second clutch 514 is engaged. The sleeve is coupled to the respective annular hubs of the second gear 536 and the clutch plate 537 or the output shaft 506 to permit a linear actuation thereof to cause the second clutch 514 to be activated from a disengaged position to an engaged position. In certain embodiments, the linear actuation of the sleeve is caused by a controller (not shown) in electrical communication with an operating device (not shown). The operating device (not shown) may be any operating device as desired such as a high-speed low-torque brush less direct current motor, for example. The operating device (not shown) may include an actuator coupled therewith. The actuator may be operatively connected with the sleeve to move the sleeve from a first position when the second clutch 514 is in the disengaged position to a second position when the second clutch 514 is in the engaged position. It is understood that the linear actuation of the sleeve from the first position to the second position thereof may be caused by other methods as desired.

In certain embodiments, the first clutch 510 and the second clutch 514 may be substantially simultaneously actuated by a shift member (not depicted). The actuator is configured to cause the shift member to move or rotate in a first direction, and thereby engage the first clutch 510 and disengage the second clutch 514 substantially simultaneously. Additionally, the actuator is configured to cause the shift member to move or rotate in an opposite second direction, and thereby disengage the first clutch 510 and engage the second clutch 514 substantially simultaneously. An actuation of the shift member is typically used to shift the electric drive axle 500 between a first gear ratio and a second gear ratio. It is understood that the shift member may be a cam shaft, if desired.

As illustrated, the third gear 550 is in meshed engagement with a fifth gear 554. The fifth gear 554 is concentrically disposed about one of the first and second half shafts 16, 18, respectively. As shown, the fifth gear 554 is disposed about the second half shaft 18. However, it is understood that the fifth gear 554 may be disposed about the first half shaft 16 if desired. In certain embodiments, the fifth gear 554 may rotate relative to one of the first and second half shafts 16, 18 via at least one bearing 556 disposed radially therebetween. It is understood that the at least one bearing 556 can be any type of bearing as desired such as a needle bearing, a roller bearing, a ball bearing, a tapered bearing, and the like, for example. The third gear 550 drives the fifth gear 554 when one of the first and second clutches 510, 514 is engaged and the electric motor 504 drives the electric drive axle 500.

A planetary gear set 560 is also concentrically disposed about one of the first and second half shafts 16, 18. As shown, the planetary gear set 560 is disposed about the second half shaft 18. However, it is understood that the planetary gear set 560 may be disposed about the first half shaft 16 if desired. In certain embodiments, the planetary gear set 560 may rotate relative to one of the first and second half shafts 16, 18 via at least one bearing 558 disposed radially therebetween. It is understood that the at least one bearing 558 can be any type of bearing as desired such as a needle bearing, a roller bearing, a ball bearing, a tapered bearing, and the like, for example.

The planetary gear set 560 includes a sun gear 562, a plurality of planet gears 564 mounted on a carrier 566, and an annulus 568. The planetary gear set 560 is configured to produce a certain gear ratio between the fifth gear 554 and a differential 580. In certain embodiments, the planetary gear set 560 is configured to produce a reduction in the gear ratio between the fifth gear 554 and the differential 580. It is understood, however, that the reduction in the gear ratio between the fifth gear 554 and the differential 580 depends upon which one of the sun gear 562, the planet gears 564, and the annulus 568 is operatively connected to the fifth gear 554, which one of the sun gear 562, the planet gears 564, and the annulus 568 is stationary, and which one of the sun gear 562, the planet gears 564, and the annulus 568 is operatively connected to the differential 580.

It should be appreciated that the fifth gear 554 and the planetary gear set 560 may be operably connected and rotatably coupled to the differential 580 and the one of the first and second half shafts 16, 18 by various other methods as desired. It is also understood that the planetary gear set 560 can include any number and size of planet gears 564 as desired. One of ordinary skill in the art should further understand that the planet gears 564 may be mounted at various positions on the carrier 566. As illustrated, each of the planet gears 564 is in meshed engagement with the sun gear 562 and the annulus 568. Various methods of meshed engagement between each of the planet gears 564, the sun gear 562, and the annulus 568 can be employed as desired.

In the embodiment shown in FIG. 6, the sun gear 562 is operatively connected to the fifth gear 554, the planet gears 564 are operatively connected to a differential case 588 of the differential 580 via the carrier 566, and the annulus 568 stationary and fixedly mounted on the housing. For example, the annulus 568 may be fixedly mounted on the axle housing, if desired. It should be appreciated that the sun gear 562 may be operatively connected to the fifth gear 554 by any suitable method as desired. The planetary gear set 560 and the differential 580 are rotatably supported within the housing via a pair of bearings 582, 584, and at least one bearing 561 which is disposed in the fifth gear 554. It is understood that each of the bearings 582, 584, 561 can be any type of bearing as desired such as a roller bearing, a ball bearing, a tapered bearing, and the like, for example.

The differential 580 includes two or more differential pinions 586 disposed within the differential case 588. The differential pinions 586 are coupled with the differential case 588 via a pinion shaft (not depicted). In an embodiment, the pinion shaft may comprise a cross member (not depicted). The differential pinions 586 are in meshed engagement with first and second side gears 590, 592. The first and second side gears 590, 592 are coupled for rotation with the first and second half shafts 16, 18, respectively, shown in FIG. 1.

In operation, when a first gear ratio is desired, the actuator mechanism causes the first clutch 510 to engage, while the second clutch 514 remains disengaged. When the first clutch 510 is engaged, the output shaft 506 of the electric motor 504 causes the output shaft 506 and the first gear 526 coupled thereto, to rotate therewith. The second gear 536 may freely rotate with the third gear 550. A rotation of the first gear 526 drives the fourth gear 552 of the first compound idler assembly 540, and causes the idler shaft 542 and the third gear 550 coupled thereto, to rotate therewith. A rotation of the third gear 550 drives the fifth gear 570, and causes the sun gear 562 of the planetary gear set 560 to rotate therewith. A rotation of the sun gear 562 drives the planet gears 564 of the planetary gear set 560, and causes the carrier 566 coupled thereto, to rotate therewith. A rotation of the carrier 566 of the planetary gear set 560 simultaneously causes the differential case 588 to rotate therewith. A rotation of the differential case 588 further causes the first and second half shafts 16, 18 to rotate therewith. The rotation of the differential 580 transfers a desired first torque from the output shaft 506 to the first and second axle shafts 16, 18. When the electric drive axle 500 is in a power generation mode, the torque transfer described above is reversed.

When a second gear ratio, which is less than the first gear ratio, is desired, the actuator mechanism causes the second clutch 514 to engage, while the first clutch 510 remains disengaged. When the second clutch 514 is engaged, the output shaft 506 of the electric motor 504 causes the second gear 536 to rotate therewith. The first gear 526 may freely rotate with the fourth gear 552. A rotation of the second gear 536 drives the third gear 550 of the first compound idler assembly 540, and causes the idler shaft 542 and the third gear 550 to rotate therewith. A rotation of the third gear 550 drives the fifth gear 570, and causes one of the first and second half shafts 16, 18 to rotate therewith. A rotation of the one of the first and second half shafts 16, 18 causes the planetary gear set 560 to rotate therewith. A rotation of the planetary gear set 560 simultaneously causes the differential case 588 to rotate therewith. A rotation of the differential case 588 further causes the remaining one of first and second half shafts 16, 18 to rotate therewith. The rotation of the differential 580 transfers a desired second torque from the output shaft 506, which is less than the first torque, to the first and second axle shafts 16, 18. When the electric drive axle 500 is in a power generation mode, the torque transfer described above is reversed.

Figure 7:
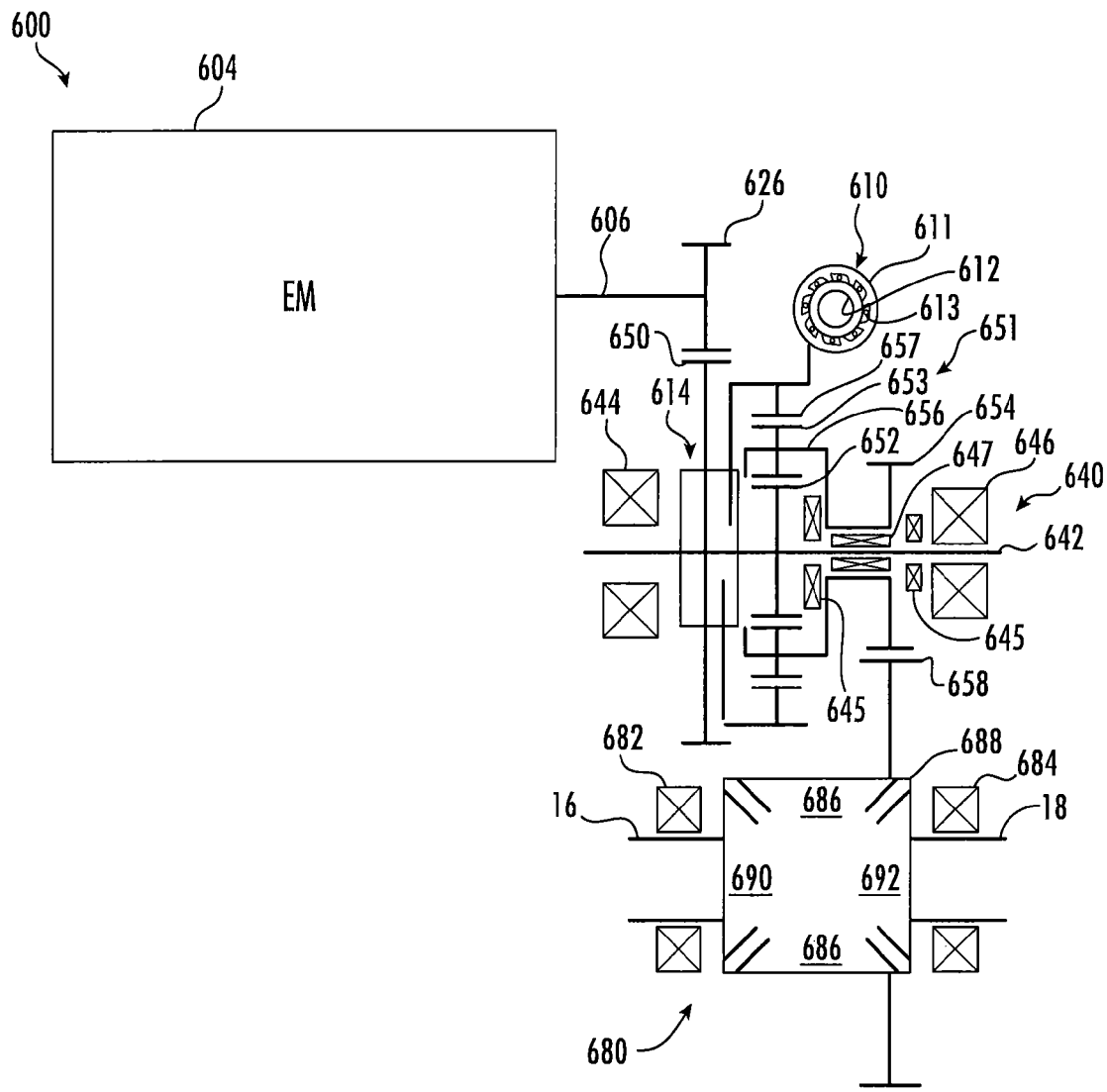
FIG. 7 is a schematic diagram of a portion of an electric drive axle of the vehicle driveline shown in FIG. 1 according to another embodiment, including an electric motor, a compound idler assembly having a planetary gear set, and a differential.

Referring now to the embodiment shown in FIG. 7, the vehicle may include the electric drive axle 600. The electric drive axle 600 may comprise an integrated drive system. In an embodiment, the electric drive axle 600 includes an electric motor 604 (e.g., electromotor) coupled with a power source (not depicted). The electric motor 604 may be a permanent magnet synchronous machine comprising a stator disposed concentrically about a rotor. The electric drive axle 600 may additionally comprise an inverter (not depicted) for converting direct current to alternating current when the electric motor 604 is utilized to drive the vehicle, and for converting alternating current to direct current when the vehicle decelerates. The electric motor 604 may be referred to herein as a motor-generator. Further, the electric drive axle 600 may include cooling fluid (not depicted) such as, but not limited to, automatic transmission fluid or axle oil integrated with the electric drive axle 600 lubricant for cooling the electric motor 604 and the inverter. In another embodiment (not depicted), the cooling fluid for the electric motor 604 and the inverter may not be integrated with the axle oil. The electric drive axle 600 may have either a co-axial or off axis layout where the axle shaft connecting the wheel to the differential does not pass through the center or the motor but rather parallel to the motor axis.

A motor output shaft 606 is coupled with the rotor of the electric motor 604, for rotation therewith. The output shaft 606 may be rotatably supported in a housing (not depicted) (e.g. an axle housing) by at least one bearing (not depicted).

It is understood that any number of bearings may be employed as desired. It is further understood that the at least one bearing can be any type of bearing as desired such as a roller bearing, a ball bearing, a tapered bearing, and the like, for example. A first gear 626 is coupled for rotation with the output shaft 606. Accordingly, the electric motor 604 drives the first gear 626 when the electric motor 604 is in operation. In certain embodiments, the first gear 626 is disposed axially adjacent to the at least one bearing.

The electric motor 604 is in selective driving engagement with a compound idler assembly 640. As illustrated in FIG. 7, the compound idler assembly 640 is disposed parallel with the output shaft 606 of the electric motor 604. The compound idler assembly 640 comprises an idler shaft 642 rotatably supported in the housing via first and second bearings 644, 646. It is understood that each of the bearings 644, 646 can be any type of bearing as desired such as a roller bearing, a ball bearing, a tapered bearing, and the like, for example.

The compound idler assembly 640 shown includes a second gear 650 selectively connected to~planetary gear set 651. The second gear is coupled for rotation with the idler shaft 642. The second gear 650 is concentrically disposed about the idler shaft 642 between the first and second bearings 644, 646, and more particularly between the first bearing 644 and the planetary gear set 651. The planetary gear set 651 includes a sun or third gear 652, a plurality of planet gears 653 mounted in a carrier 656, and an annulus 657. The planetary gear set 651 is configured to produce a certain gear ratio between the electric motor 604 and a differential 680. In certain embodiments, the planetary gear set 651 is configured to produce a reduction in the gear ratio between the electric motor 604 and the differential 680. It is understood, however, that the reduction in the gear ratio between the electric motor 604 and the differential 680 depends upon which one of the sun gear 652, the planet gears 653, and the annulus 657 is operatively connected to the first gear 626 via the second gear 650, which one of the sun gear 652, the planet gears 653, and the annulus 657 is stationary, and which one of the sun gear 652, the planet gears 653, and the annulus 657 is operatively connected to the differential 680. It is also understood that the planetary gear set 651 can include any number and size of planet gears 653 as desired. One of ordinary skill in the art should further understand that the planet gears 653 may be mounted at various positions on the carrier 656. As illustrated, each of the planet gears 653 is in meshed engagement with the sun gear 652 and the annulus 657. Various methods of meshed engagement between each of the planet gears 653, the sun gear 652, and the annulus 657 can be employed as desired.

In the embodiment shown in FIG. 7, the sun gear 652 is concentrically disposed about and fixedly coupled to the idler shaft 642 for rotation therewith, the planet gears 653 are selectively connected to the second gear 650 and operatively coupled to a fourth gear 654 via the carrier 656, and the annulus 657 is selectively connected to the second gear 650. It should be appreciated that the annulus 657 may be selectively connected to the second gear 650 by any suitable method as desired.

In certain embodiments, the electric motor 604 drives the sun gear 652 of the planetary gear set 651 via the first and second gears 626, 650 when a first clutch 610 (described in further detail hereinafter) is engaged, or drives the annulus 657 of the planetary gear set 651 via the first and second gears 626, 650 when a second clutch 614 (described in further detail hereinafter) is engaged. It should be appreciated that any type of clutch or clutch assembly can be employed as desired for each of the first clutch 610 and the second clutch 614 such as a brake, a one-way brake, a friction brake, a wet clutch or assembly, a simple dog clutch or assembly, a dog clutch or assembly with a synchronizer, and the like, for example. 30 In certain embodiments, only one of the clutches 610, 614 is engaged at any one time. An actuator mechanism (not depicted) for each of the clutches 610, 614 may include an actuator (not depicted), an additional gear set (not depicted) and a roller and ramp assembly (not depicted). The actuator may be a reversible electric motor as it is compact and easily controllable. It is understood that any other appropriate type of actuator and actuator mechanism for each of the clutches 610,614 may be used such as hydraulic, mechanical, or pneumatic actuators, for example.

In the embodiment shown, the first clutch 610 is a one-way clutch (e.g. a sprag clutch). The first clutch 610 is radially disposed about the planetary gear set 651. The first clutch 610 includes an outer first ring 611, an inner second ring 612, and a plurality of movable elements or sprags 613 interposed between the first and second rings 611, 612 at specific angles to create torque. The second ring 612 and the movable elements 613 are configured to maintain a stationary position within the first ring 611 when rotated in a first rotational direction. On the contrary, the second ring 612 and movable element 613 are configured to freely rotate within the first ring 611 when rotated in an opposite second rotational direction. In certain embodiments, the first ring 611 is fixedly coupled to the housing and an outer peripheral surface of the annulus 657 abuts an inner peripheral surface of the second ring 612. The first clutch 610 is configured to maintain a stationary position of the annulus 657 when engaged by a rotation of the annulus 657 of the planetary gear set 651 in the first rotational direction. In contrast, the second ring 612 of the first clutch 612, and therefore the annulus 657 of the planetary gear set 651, are configured to freely rotate when the first clutch 610 is disengaged by a rotation of the annulus 657 of the planetary gear set 651 in the opposite second rotational direction. It should be appreciated that various other types of one-way clutches may be employed for the first clutch 610.

In certain embodiments, the second clutch 614 is a dog clutch. The second clutch 614 includes a plurality of clutch teeth (not depicted) disposed on the second gear 650 and a plurality of clutch teeth (not depicted) disposed on the annulus 657 of the planetary gear set 651. It should appreciated that the clutch teeth may be formed on a separate and distinct component or integrally formed with each of the second gear 650 and the annulus 657. In one embodiment, the clutch teeth of the second gear 650 extend outwardly therefrom in a first axial direction and the clutch teeth of the annulus 657 extend outwardly therefrom in an opposite second axial direction. The clutch teeth of the second gear 650 are configured to mesh with the clutch teeth of the annulus 657. At least one of the second gear 650 and the annulus 657 is operatively connected to at least one of the idler shaft 642, the sun gear 652, the planet gears 653, and the carrier 656 in such manner to allow movement thereof in both the first and second axial directions. The axial movement of at least one of the second gear 650 and the annulus 657 facilitates a meshed engagement and disengagement of the clutch teeth of both the second gear 650 and the annulus 657, and therefore engagement and disengagement of the second clutch 614. A biasing mechanism (not depicted) such as a spring element, for example, may be disposed within the housing 659, or interposed between the second gear 650 and the annulus 657, to urge at least one of the second gear 650 and the annulus 657 in opposite axial directions to cause the disengagement of the clutch teeth thereof.

In certain other embodiments, the second clutch 614 is a shift collar clutch. The second clutch 614 includes both the second gear 650 and the annulus 657 each having an annular hub (not depicted) extending axially outwardly from an outer surface. Each of the annular hubs includes a plurality of splines (not depicted) formed on an outer peripheral surface thereof. The annular hubs may be integrally formed on the respective second gear 650 and annulus 657 or coupled thereto as a separate and distinct components thereof, if desired. Each of the annular hubs of the second gear 650 and the annulus 657, respectively, is disposed concentrically about the idler shaft 642 and the annular hub of the annulus 657 may rotate relative thereto via a needle bearing (not depicted), disposed radially therebetween. At least one spacer (not depicted) and/or at least one positioning element (not depicted) may be employed to militate against an axial movement of the needle bearing along the idler shaft 642. It is understood that the positioning element can be any type of positioning element as desired such as a snap ring, for example. A thrust bearing (not depicted) may be disposed concentrically about the idler shaft 642 and interposed between the annular hub of the second gear 650 and the annular hub of the annulus 657. The thrust bearing is configured to militate against friction between the annular hubs. The planetary gear system 651 may further include a thrust bearing (not depicted) disposed concentrically about the idler shaft 642 and interposed between the carrier 656 and the sun gear 652 to militate against friction therebetween. It should be appreciated that additional thrust bearings may be employed to militate against friction between other components of the electric drive axle 600, if desired. Various types of thrust bearings can be employed as desired.

The second clutch 614 further includes a sleeve (not depicted). The sleeve is concentrically disposed about the annular hub of the annulus 657 when the second clutch 614 is disengaged. It is understood, however, that the sleeve may be concentrically disposed about the annular hub of the second gear 650 when the second clutch 614 is disengaged, if desired. An inner peripheral surface of the sleeve includes a plurality of splines (not depicted) formed thereon. The splines are of such shape, size, and number so as to cooperate with the splines of the annular hub of both the second gear 650 and the annulus 657. In certain embodiments, the sleeve has an axial length sufficient to enable a meshed engagement with both the annular hubs when the second clutch 614 is engaged. The sleeve is coupled to the annular hubs of the second gear 650 and the annulus 657 to permit a linear actuation thereof to cause the second clutch 614 to be activated from a disengaged position to an engaged position. In certain embodiments, the linear actuation of the sleeve is caused by a controller (not shown) in electrical communication with an operating device (not shown). The operating device (not shown) may be any operating device as desired such as a high-speed low-torque brush less direct current motor, for example. The operating device (not shown) may include an actuator coupled therewith. The actuator may be operatively connected with the sleeve to move the sleeve from a first position when the second clutch 614 is in the disengaged position to a second position when the second clutch 614 is in the engaged position. It is understood that the linear actuation of the sleeve from the first position to the second position thereof may be caused by other methods as desired.

As illustrated, the fourth gear 654 is directly coupled to the carrier 656. In certain embodiments, the fourth gear 654 is concentrically disposed about the idler shaft 642 between the first and second bearings 644, 646, and more particularly between the planetary gear set 651 and the second bearing 646. The fourth gear 654 may rotate relative to the idler shaft 642 via at least one bearing 647 disposed radially therebetween. It is understood that the at least one bearing 647 can be any type of bearing 647 as desired such as a needle bearing, a roller bearing, a ball bearing, a tapered bearing, and the like, for example. It should be appreciated that thrust bearings 645 may be employed to militate against friction between other components of the electric drive axle 600, if desired, such as between the fourth gear 654 and the bearing 644 and between the sun gear 652 and the carrier 653, for example. Various types of thrust bearings, can be employed as desired.

The fourth gear 654 receives torque from the second gear 650 and the planetary gear set 651 when the first clutch 610 is engaged and the electric motor 604 drives the electric drive axle 600. Contrarily, the fourth gear 654 receives torque only from the second gear 650 through the carrier 656 of the planetary gear set 651 when the second clutch 614 is engaged and the electric motor 604 drives the electric drive axle 600. A pair of positioning elements (not depicted) may be respectively disposed on ends of the idler shaft 642 to maintain a position of the bearings 644, 646 and the second gear 650, the planetary gear set 651, and the fourth gear 654. It is understood that each of the positioning elements can be any type of positioning element as desired such as a snap ring, for example but could use a shim and press fit bearings if the application allows for it.

As illustrated, the fourth gear 654 is in meshed engagement with a fifth gear 658. The fourth gear 654 drives the fifth gear 658, when one of the first and second clutches 610,614, respectively, is engaged and the electric motor 604 drives the electric drive axle 600. The fifth gear 658 is coupled for rotation with a differential 680. The differential 680 is rotatably supported within the housing 659 via a pair of bearings 682, 684. It is understood that each of the bearings 682, 684 can be any type of bearing as desired such as a roller bearing, a ball bearing, a tapered bearing, and the like, for example. The differential 680 shown includes two or more differential pinions 686 disposed within a differential case 688. The differential pinions 686 are coupled with the differential case 688 via a pinion shaft (not depicted). In an embodiment, the pinion shaft may comprise a cross member. The differential pinions 686 are in meshed engagement with first and second side gears 690, 692. The first and second side gears 690, 692 are coupled for rotation with the first and second half shafts 16, 18, respectively, shown in FIG. 1.

In operation, when a first gear ratio is desired (e.g. 20:1 gear ratio reduction), the output shaft 606 of the electric motor 604 causes the first gear 626 coupled thereto, to rotate therewith. A rotation of the first gear 626 drives the second gear 650, and causes the second gear 650 to rotate therewith. A rotation of the second gear 650 causes the sun gear 652 to rotate therewith. A rotation of the sun gear 652 causes a rotation of the annulus 657 of the planetary gear set 651 in the first rotational direction, and therefore, the first clutch 610 to engage and hold the annulus 657 in a stationary position. As such, a rotation of the second gear 650 drives the sun gear 652 of the planetary gear set 651, and causes torque to transfer thereto. Since the annulus 657 of the planetary gear set 651 is maintained in the stationary position, the rotation of the sun gear 652 drives the planet gears 653, and causes torque to transfer through the planet gears 653 to the carrier 656. The carrier 656 rotates with the planet gears 653. A rotation of the carrier 656 drives the fourth gear 654 coupled thereto, and causes the fourth gear 654 to rotate therewith. Accordingly, the torque is transferred from the carrier 656 to the fourth gear 654. A rotation of the fourth gear 654 drives the fifth gear 658, and causes the differential case 688 to rotate therewith. The torque is transferred from the fourth gear 654 to the differential case 688. A rotation of the differential case 688 further causes the first and second half shafts 16, 18 to rotate therewith. The rotation of the differential 680 transfers a desired first torque from the output shaft 606 to the first and second axle shafts 16, 18. When the electric drive axle 600 is in a power generation mode, the torque transfer described above is reversed.

When a second gear ratio (e.g. 13:1 gear ratio reduction, 9:1 gear ratio reduction), which is less than the first gear ratio, is desired, the actuator mechanism causes the second clutch 614 to engage, while the first clutch 610 remains disengaged. The output shaft 606 of the electric motor 604 causes the first gear 626 coupled thereto, to rotate therewith. A rotation of the first gear 626 drives the second gear 650, and causes the second gear 650 to rotate therewith. When the second clutch 614 is engaged, the sun gear 652 and the idler shaft 642 rotate with the second gear 650, and the second gear 650 is coupled to the annulus 657 of the planetary gear set 651. As such, a rotation of the second gear 650 and the sun gear 652 causes a rotation of the annulus 657 of the planetary gear set 651 in the second rotational direction, and therefore, the first clutch 610 to disengage and the annulus 657 to freely rotate therewith. Since the annulus 657 freely rotates, the planetary gear set 651 is essentially bypassed. Accordingly, a free rotation of the annulus 657 and the carrier 656 causes torque to transfer from the second gear 650 through the planet gears 653 and the carrier 656 without a further reduction in gear ratio. A rotation of the second gear 650, thereby drives the fourth gear 654 coupled to the carrier 656, and causes the fourth gear 654 to rotate therewith. The torque is transferred from the second gear 650 to the fourth gear 654. A rotation of the fourth gear 654 drives the fifth gear 658, and causes the differential case 688 to rotate therewith. The torque is transferred from the fourth gear 654 to the differential case 688. A rotation of the differential case 688 further causes the first and second half shafts 16, 18 to rotate therewith. The rotation of the differential 680 transfers a desired second torque from the output shaft 606 to the first and second axle shafts 16, 18. When the electric drive axle 600 is in a power generation mode, the torque transfer described above is reversed.

Figure 8:
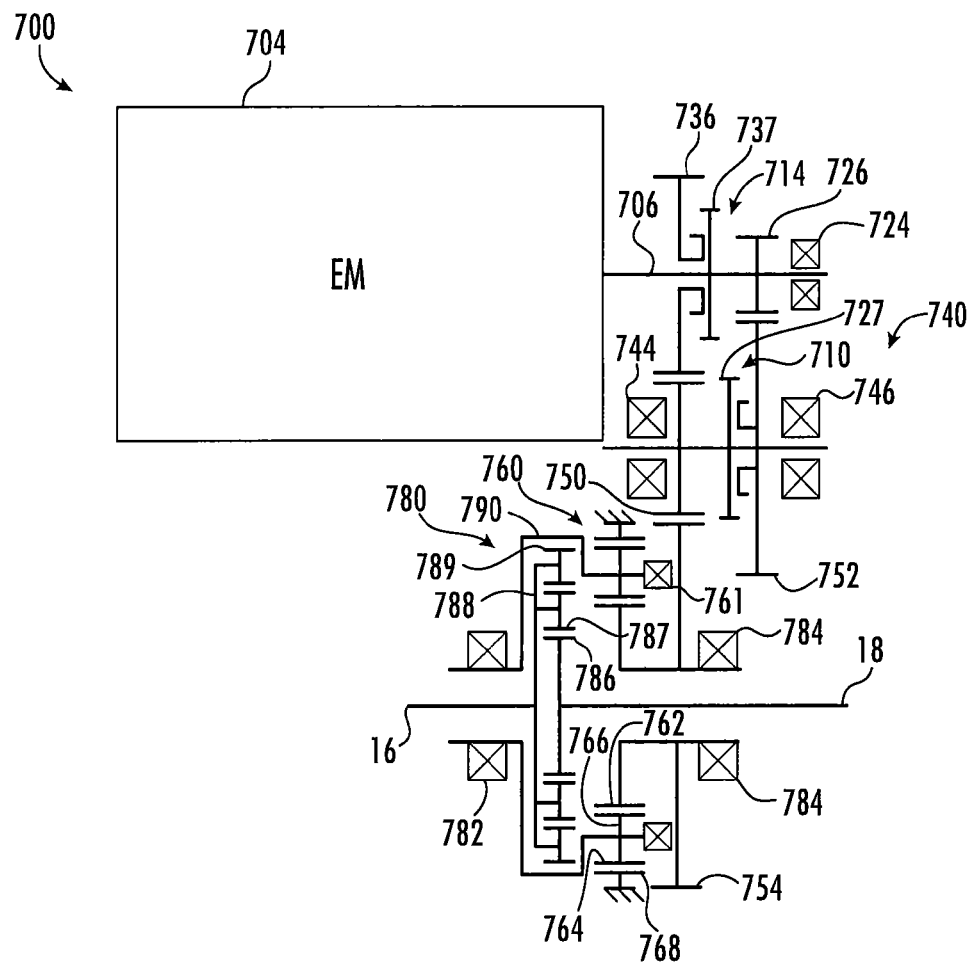
FIG. 8 is a schematic diagram of a portion of an electric drive axle of the vehicle driveline shown in FIG. 1 according to another embodiment, including an electric motor, a compound idler assembly, a first planetary gear set, and a second planetary gear set.

Referring now to the embodiment shown in FIG. 8, the vehicle may include the electric drive axle 700. The electric drive axle 700 may comprise an integrated drive system. In an embodiment, the electric drive axle 700 includes an electric motor 704 (e.g., electromotor) coupled with a power source (not depicted). The electric motor 704 may be a permanent magnet synchronous machine comprising a stator disposed concentrically about a rotor. The electric drive axle 700 may additionally comprise an inverter (not depicted) for converting direct current to alternating current when the electric motor 704 is utilized to drive the vehicle, and for converting alternating current to direct current when the vehicle decelerates. The electric motor 704 may be referred to herein as a motor-generator. Further, the electric drive axle 700 may include cooling fluid (not depicted) such as, but not limited to, automatic transmission fluid or axle oil integrated with the electric drive axle 700 lubricant for cooling the electric motor 704 and the inverter. In another embodiment (not depicted), the cooling fluid for the electric motor 704 and the inverter may not be integrated with the axle oil. The electric drive may have either a co-axial or off axis layout where the axle shaft connecting the wheel to the differential does not pass through the center or the motor but rather parallel to the motor axis.

A motor output shaft 706 is coupled with the rotor of the electric motor 704 for rotation therewith. The output shaft 706 is rotatably supported within a housing (not depicted) (e.g. an axle housing) by at least one bearing 724. It is understood that the at least one bearing 724 can be any type of bearing as desired such as a roller bearing, a ball bearing, a tapered bearing, and the like, for example. The output shaft 706 includes a first gear 726 rotatably coupled thereto. In certain embodiments, the first gear 726 is concentrically disposed about the output shaft 706 axially adjacent the at least one bearing 724. A second gear 736 is coupled to the output shaft 706. In certain embodiments, the second gear 736 is concentrically disposed about the output shaft 706 axially adjacent the first gear 726. The second gear 736 may rotate relative to the output shaft 706 via at least one bearing (not depicted) disposed radially therebetween. It is understood that the at least one bearing can be any type of bearing as desired such as a needle bearing, a roller bearing, a ball bearing, a tapered bearing, and the like, for example.

In certain embodiments, the electric motor 704 drives a first compound idler assembly 740 via the first gear 726 when a first clutch 710 (described in further detail hereinafter) is engaged, or via the second gear 736 when a second clutch 714 (described in further detail hereinafter) is engaged. As illustrated in FIG. 8, the first compound idler assembly 740 is disposed parallel with the output shaft 706 of the electric motor 704. The first compound idler assembly 740 comprises an idler shaft 742 rotatably supported in the housing via first and second bearings 744, 746. It is understood that each of the bearings 744,746 can be any type of bearing as desired such as a roller bearing, a ball bearing, a tapered bearing, and the like, for example.

A third gear 750 and a fourth gear 752 are coupled to the idler shaft 742. The third gear 750 is concentrically disposed about the idler shaft 742 axially adjacent the first bearing 744. The third gear 750 is in meshed engagement with the second gear 736 and receives torque therefrom when the second clutch 714 is engaged and the electric motor 704 drives the electric drive axle 700. The fourth gear 752 is concentrically disposed about the idler shaft 742 axially adjacent to the second bearing 746. The fourth gear 752 may rotate relative to the idler shaft 742 via at least one bearing (not depicted) disposed radially therebetween. It is understood that the at least one bearing can be any type of bearing as desired such as a needle bearing, a roller bearing, a ball bearing, a tapered bearing, and the like, for example. The fourth gear 752 is in meshed engagement with the first gear 726 and receives torque therefrom when the first clutch 710 is engaged and the electric motor 704 drives the electric drive axle 700. A pair of positioning elements (not depicted) may be respectively disposed on ends of the idler shaft 742 to maintain a position of the bearings 744,746 and the third and fourth gears 750,752. It is understood that each of the positioning elements can be any type of positioning element as desired such as a snap ring, for example but could use a shim and 10 press fit bearings if the application allows for it.

As illustrated, the fourth gear 752 is connected to the idler shaft 742 by the first clutch 710. The first clutch 710 is concentrically disposed about the idler shaft 742. An actuator mechanism (not depicted) can actuate the first clutch 710. The actuator mechanism can include an actuator, an additional gear set and a roller and ramp assembly. The actuator may be a reversible electric motor as it is compact and easily controllable. It is understood that any other appropriate type of actuator and actuator mechanism may be used such as hydraulic, mechanical, or pneumatic actuators, for example.

In the embodiment shown, the first clutch 710 is a dog clutch. The first clutch 710 includes a plurality of clutch teeth (not depicted) disposed on the fourth gear 752 and a plurality of clutch teeth (not depicted) disposed on a clutch plate 727 coupled to the idler shaft 742. It should be appreciated that the clutch teeth may be formed on a separate and distinct component or integrally formed with each of the fourth gear 752 and the clutch plate 727. In one embodiment, the clutch teeth of the fourth gear 752 extend outwardly therefrom in the first axial direction and the clutch teeth of the clutch plate 727 extend outwardly therefrom in the opposite second axial direction. The clutch teeth of the fourth gear 752 are configured to mesh with the clutch teeth of the clutch plate 727. At least one of the fourth gear 752 and the clutch plate 727 is operatively connected to the idler shaft 742 in such manner to allow movement thereof in both the first and second axial directions. The axial movement of at least one of the fourth gear 752 and the clutch plate 727 facilitates a meshed engagement and disengagement of the clutch teeth of both the fourth gear 752 and the clutch plate 727, and therefore engagement and disengagement of the first clutch 710. A biasing mechanism (not depicted) such as a spring element, for example, may be disposed within the housing, or interposed between the fourth gear 752 and the clutch plate 727, to urge at least one of the fourth gear 752 and the clutch plate 727 in opposite axial directions to cause the disengagement of the clutch teeth thereof. Accordingly, the electric motor 704 drives the fourth gear 752 when the first clutch 710 is engaged. It should be appreciated that any type of the first clutch 710 can be employed as desired such as a wet clutch assembly, a simple dog clutch assembly, a dog clutch assembly with a synchronizer, and the like, for example.

Figure 11A:
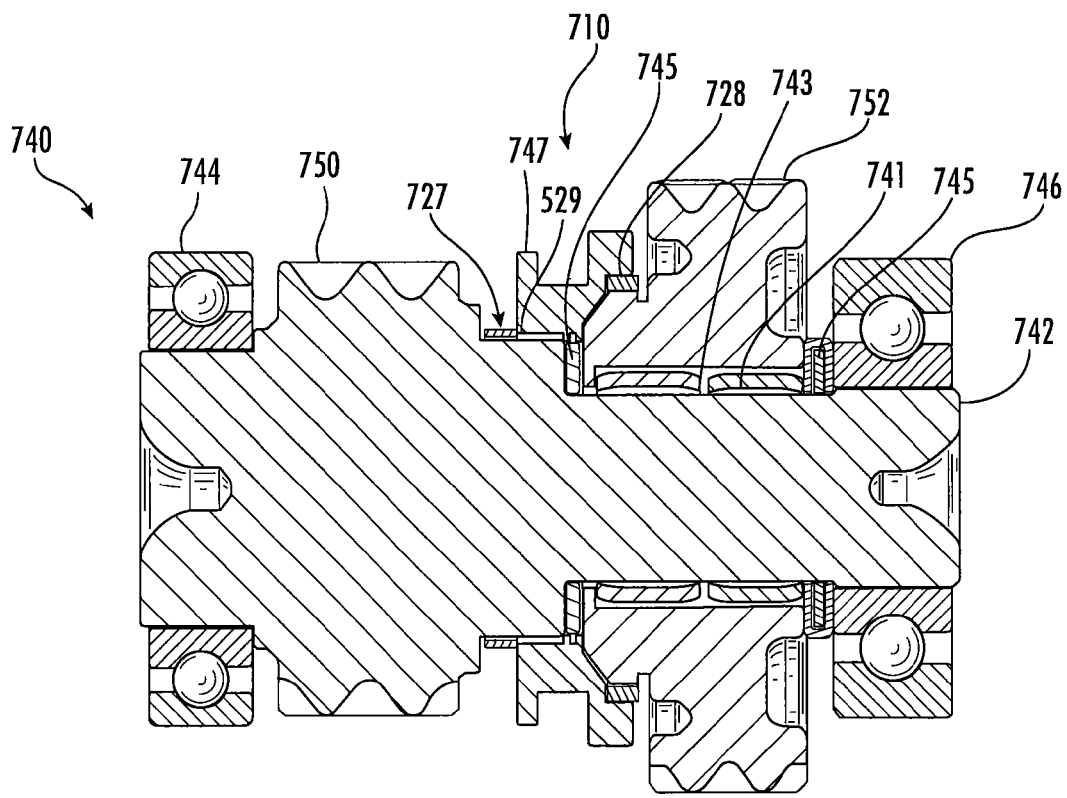
FIG. 11A is a sectional view of the compound idler assembly of the electric drive axle shown in FIG. 8.
Figure 11B:
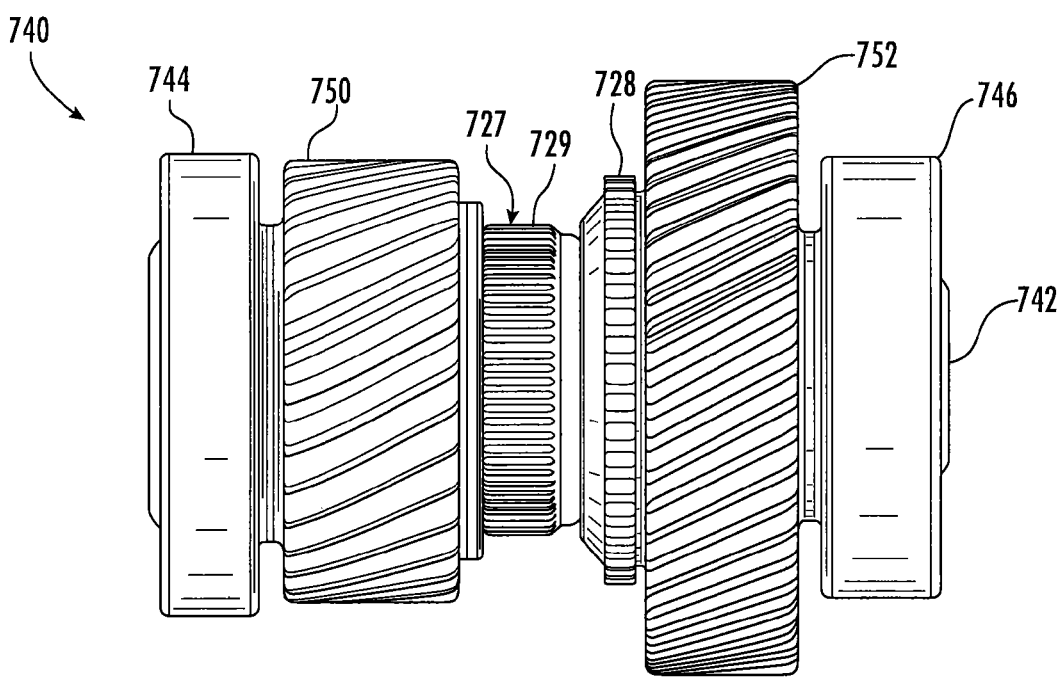
FIG. 11 B is an elevational view of the compound idler assembly shown in FIG. 11A.

In certain other embodiments, shown in FIGS. 11A and 11B, the first clutch 710 is a shift collar clutch. In such embodiments, the first clutch 710 includes both the fourth gear 752 and the clutch plate 727 each having an annular hub 728, 729, respectively, extending axially outwardly from an outer surface. Each of the annular hubs 728, 729 includes a plurality of splines formed on an outer peripheral surface thereof. The annular hubs 728, 729 may be integrally formed on the respective fourth gear 752 and clutch plate 727 or coupled thereto as a separate and distinct components thereof, if desired. It should be appreciated that the annular hub of the clutch plate 727 may be integrally formed on the idler shaft 742, eliminating the clutch plate 727 as a separate component. Each of the annular hubs 728, 729 of the fourth gear 752 and the clutch plate 727, respectively, is disposed concentrically about the idler shaft 742 and the annular hub 728 of the fourth gear 752 may rotate relative thereto via at least one needle bearing 741, disposed radially therebetween. At least one spacer 743 and/or at least one positioning element (not depicted) may be employed to militate against an axial movement of the needle bearing 741 along the idler shaft 742. It is understood that the positioning element can be any type of positioning element as desired such as a snap ring, for example. A thrust bearing 745 may be disposed concentrically about the idler shaft 742 and interposed between the annular hub 728 of the fourth gear 752 and the annular hub 729 of the clutch plate 727. The thrust bearing 745 is configured to militate against friction between the annular hubs 728, 729. It should be appreciated that additional thrust bearings 745 may be employed to militate against friction between other components of the electric drive axle 700, if desired, such as between the fourth gear 752 and the second bearing 746, for example. Various types of thrust bearings can be employed as desired.

The first clutch 710 further includes a sleeve 747. The sleeve 747 is concentrically disposed about the annular hub 729 of the clutch plate 727 or the idler shaft 742 when the first clutch 710 is disengaged. It is understood, however, that the sleeve 747 may be. concentrically disposed about the annular hub 728 of the fourth gear 752 when the first clutch 710 is disengaged, if desired. An inner peripheral surface of the sleeve 747 includes a plurality of splines (not depicted) formed thereon. The splines are of such shape, size, and number so as to cooperate with the splines of the annular hub 728 of the fourth gear 752 and the annular hub 729 of the clutch plate 727 or the idler shaft 742. In certain embodiments, the sleeve 747 has an axial length sufficient to enable a meshed engagement with both the annular hubs 728, 729 when the first clutch 710 is engaged. The sleeve 747 is coupled to the respective annular hubs 728,729 of the fourth gear 752 and the clutch plate 727 or the idler shaft 742 to permit a linear actuation thereof to cause the first clutch 710 to be activated from a disengaged position to an engaged position. In certain embodiments, the linear actuation of the sleeve 747 is caused by a controller (not shown) in electrical communication with an operating device (not shown). The operating device (not shown) may be any operating device as desired such as a high-speed low-torque brush less direct current motor, for example. The operating device (not shown) may include an actuator coupled therewith. The actuator may be operatively connected with the sleeve 747 to move the sleeve 747 from a first position when the first clutch 710 is in the disengaged position to a second position when the first clutch 710 is in the engaged position. It is understood that the linear actuation of the sleeve 747 from the first position to the second position thereof may be caused by other methods as desired.

Referring now to FIG. 8, the second gear 736 is connected to the output shaft 706 via the second clutch 714. The second clutch 714 is concentrically disposed about the output shaft 706. An actuator mechanism (not depicted) can actuate the second clutch 714. The actuator mechanism can include an actuator, an additional gear set and a roller and ramp assembly. The actuator may be a reversible electric motor as it is compact and easily controllable. It is understood that any other appropriate type of actuator and actuator mechanism may be used such as hydraulic, mechanical, or pneumatic actuators, for example. It should be appreciated that the actuator mechanism for actuating the first clutch 710 may be the same actuator mechanism for actuating the second clutch 714, if desired.

In the embodiment shown, the second clutch 714 is also a dog clutch. The second clutch 714 includes a plurality of clutch teeth (not depicted) disposed on the second gear 736 and a plurality of clutch teeth (not depicted) disposed on the clutch plate 737 coupled to the output shaft 706. It should appreciated that the clutch teeth may be formed on a separate and distinct component or integrally formed with each of the second gear 736 and the clutch plate 737. In one embodiment, the clutch teeth of the second gear 736 extend outwardly therefrom in the second axial direction and the clutch teeth of the clutch plate 737 extend outwardly therefrom in the first axial direction. The clutch teeth of the second gear 736 are configured to mesh with the clutch teeth of the clutch plate 737. At least one of the second gear 736 and the clutch plate 737 is operatively connected to the output shaft 706 in such manner to allow movement thereof in both the first and second axial directions. The axial movement of at least one of the second gear 736 and the clutch plate 737 facilitates a meshed engagement and disengagement of the clutch teeth of both the second gear 736 and the clutch plate 737, and therefore engagement and disengagement of the second clutch 714. A biasing mechanism (not depicted) such as a spring element, for example, may be disposed, within the housing, or interposed between the second gear 736 and the clutch plate 737, to urge at least one of the second gear 736 and the clutch plate 737 in opposite axial directions to cause the disengagement of the clutch teeth thereof. Accordingly, the electric motor 704 drives the third gear 750 when the second clutch 714 is engaged. It should be appreciated that any type of the second clutch 714 can be employed as desired such as a wet clutch assembly, a simple dog clutch assembly, a dog clutch assembly with a synchronizer, and the like, for example.

In certain other embodiments, the second clutch 714 is a shift collar clutch. In such embodiments, the second clutch 714 includes both the second gear 736 and the clutch plate 737 each having an annular hub (not depicted), extending axially outwardly from an outer surface. Each of the annular hubs includes a plurality of splines formed on an outer peripheral surface thereof. The annular hubs may be integrally formed on the respective second gear 736 and clutch plate 737 or coupled thereto as a separate and distinct components thereof, if desired. It should be appreciated that the annular hub of the clutch plate 737 may be integrally formed on the output shaft 706, eliminating the clutch plate 737 as a separate component. Each of the annular hubs of the second gear 736 and the clutch plate 737 is disposed concentrically about the output shaft 706 and the annular hub of the second gear 736 may rotate relative thereto via at least one needle bearing (not depicted), disposed radially therebetween. At least one spacer (not depicted) and/or at least one positioning element (not depicted) may be employed to militate against an axial movement of the needle bearing along the output shaft 706. It is understood that the positioning element can be any type of positioning element as desired such as a snap ring, for example. A thrust bearing (not depicted) may be disposed concentrically about the output shaft 706 and interposed between the annular hub of the second gear 736 and the annular hub of the clutch plate 737. The thrust bearing is configured to militate against friction between the annular hubs. It should be appreciated that additional thrust bearings may be employed to militate against friction between other components of the electric drive axle 700, if desired, such as between the first gear 726 and the bearing 724, for example. Various types of thrust bearings can be employed as desired.

The second clutch 714 further includes a sleeve (not depicted). The sleeve is concentrically disposed about the annular hub of the clutch plate 737 or the output shaft 706 when the second clutch 714 is disengaged. It is understood, however, that the sleeve may be concentrically disposed about the annular hub of the second gear 736 when the second clutch 714 is disengaged, if desired. An inner peripheral surface of the sleeve includes a plurality of splines (not depicted) formed thereon. The splines are of such shape, size, and number so as to cooperate with the splines of the annular hub of the second gear 736 and the annular hub of the clutch plate 737 or the output shaft 706. In certain embodiments, the sleeve has an axial length sufficient to enable a meshed engagement with both the annular hubs when the second clutch 714 is engaged. The sleeve is coupled to the respective annular hubs of the second gear 736 and the clutch plate 737 or the output shaft 706 to permit a linear actuation thereof to cause the second clutch 714 to be activated from a disengaged position to an engaged position. In certain embodiments, the linear actuation of the sleeve is caused by a controller (not shown) in electrical communication with an operating device (not shown). The operating device (not shown) may be any operating device as desired such as a high-speed low-torque brush less direct current motor, for example. The operating device (not shown) may include an actuator coupled therewith. The actuator may be operatively connected with the sleeve to move the sleeve from a first position when the second clutch 714 is in the disengaged position to a second position when the second clutch 714 is in the engaged position. It is understood that the linear actuation of the sleeve from the first position to the second position thereof may be caused by other methods as desired.

In certain embodiments, the first clutch 710 and the second clutch 714 may be substantially simultaneously actuated by a shift member (not depicted). The actuator is configured to cause the shift member to move or rotate in a first direction, and thereby engage the first clutch 710 and disengage the second clutch 714 substantially simultaneously. Additionally, the actuator is configured to cause the shift member to move or rotate in an opposite second direction, and thereby disengage the first clutch 710 and engage the second clutch 714 substantially simultaneously. An actuation of the shift member is typically used to shift the electric drive axle 700 between a first gear ratio and a second gear ratio. It is understood that the shift member may be a cam shaft, if desired.

As illustrated, the third gear 750 is in meshed engagement with a fifth gear 754. The fifth gear 754 is concentrically disposed about one of the first and second half shafts 16, 18, respectively. As shown, the fifth gear 754 is disposed about the second half shaft 18. However, it is understood that the fifth gear 754 may be disposed about the first half shaft 16 if desired. In certain embodiments, the fifth gear 754 may rotate relative to one of the first and second half shafts 16, 18 via at least one bearing 756 disposed radially therebetween. It is understood that the at least one bearing 756 can be any type of bearing as desired such as a needle bearing, a roller bearing, a ball bearing, a tapered bearing, and the like, for example. The third gear 750 drives the fifth gear 754 when one of the first and second clutches 710, 714 is engaged and the electric motor 704 drives the electric drive axle 700.

A first planetary gear set 760 is also concentrically disposed about one of the first and second half shafts 16, 18. As shown, the first planetary gear set 760 is disposed about the second half shaft 18. However, it is understood that the first planetary gear set 760 may be disposed about the first half shaft 16 if desired. In certain embodiments, the first planetary gear set 760 may rotate relative to one of the first and second half shafts 16, 18 via at least one bearing 758 disposed radially therebetween. It is understood that the at least one bearing 758 can be any type of bearing as desired such as a needle bearing, a roller bearing, a ball bearing, a tapered bearing, and the like, for example.

The first planetary gear set 760 includes a sun gear 762, a plurality of planet gears 764 mounted on a carrier 766, and an annulus 768. The first planetary gear set 760 is configured to produce a certain gear ratio between the fifth gear 754 and a differential or second planetary gear set 780. In certain embodiments, the first planetary gear set 760 is configured to produce a reduction in the gear ratio between the fifth gear 754 and the second planetary gear set 780. It is understood, however, that the reduction in the gear ratio between the fifth gear 754 and the second planetary gear set 780 depends upon which one of the sun gear 762, the planet gears 764, and the annulus 768 is operatively connected to the fifth gear 754, which one of the sun gear 762, the planet gears 764, and the annulus 768 is stationary, and which one of the sun gear 762, the planet gears 764, and the annulus 768 is operatively connected to the second planetary gear set 780.

It should be appreciated that the fifth gear 754 and the first planetary gear set 760 may be operably connected and rotatably coupled to the second planetary gear set 780 and the one of the first and second half shafts 16, 18 by various other methods as desired. It is also understood that the first planetary gear set 760 can include any number and size of planet gears 764 as desired. One of ordinary skill in the art should further understand that the planet gears 764 may be mounted at various positions on the carrier 766. As illustrated, each of the planet gears 764 is in meshed engagement with the sun gear 762 and the annulus 768. Various methods of meshed engagement between each of the planet gears 764, the sun gear 762, and the annulus 768 can be employed as desired.

In the embodiment shown in FIG. 8, the sun gear 762 is operatively connected to the fifth gear 754, the planet gears 764 are operatively connected to the second planetary gear set 780 via the carrier 766, and the annulus 768 stationary and fixedly mounted on the housing. For example, the annulus 768 may be fixedly mounted on the axle housing, if desired. It should be appreciated that the sun gear 762 may be operatively connected to the fifth gear 754 by any suitable method as desired. The first planetary gear set 760 and the second planetary gear set 780 are rotatably supported within the housing via a pair of bearings 782, 784, and at least one bearing 761 which is disposed in the fifth gear 754. It is understood that each of the bearings 782, 784, 761 can be any type of bearing as desired such as a roller bearing, a ball bearing, a tapered bearing, and the like, for example.

The second planetary gear set 780 is also concentrically disposed about the first and second half shafts 16, 18, shown in FIG. 1. The second planetary gear set 780 includes a sun gear 786, a plurality of first planet gears 787 mounted on a carrier 788, a plurality of second planet gears 789 mounted on the carrier 788, and an annulus 790. The second planetary gear set 780 is configured to produce a certain gear ratio between the first planetary gear set 760 and the first and second half shafts 16, 18. In certain embodiment, the second planetary gear set 780 is essentially bypassed. Accordingly, a rotation of the annulus 790, the planet gears 787, 789, the carrier 788, and the sun gear 786 causes torque to transfer from the first planetary gear set 760 through the second planetary gear set 780 without a further reduction in gear ratio. In other certain embodiments, the second planetary gear set 780 is configured to produce a reduction in the gear ratio between the first planetary gear set 760 and the first and second half shafts 16, 18. It is understood, however, that the reduction in the gear ratio between the first planetary gear set 760 and the first and second half shafts 16, 18 depends upon which one of the sun gear 786, the first planet gears 787, the second planet gears 789, the carrier 788, and the annulus 790 is operatively connected to the first planetary gear set 760, which one of the sun gear 786, the first planet gears 787, the second planet gears 789, the carrier 788, and the annulus 790 is stationary, and which one of the sun gear 786, the first planet gears 787, the second planet gears 789, the carrier 788, and the annulus 790 is operatively connected to the first and second half shafts 16, 18.

It should be appreciated that the second planetary gear set 780 may be operably connected and rotatably coupled to the first planetary gear set 760 and the one of the first and second half shafts 16, 18 by various other methods as desired. It is also understood that the second planetary gear set 780 can include any number and size of planet gears 787, 789 as desired. One of ordinary skill in the art should further understand that the planet gears 787, 789 may be mounted at various positions on the carrier 788. As illustrated, each of the first planet gears 787 is in meshed engagement with the sun gear 786 and the second planet gears 789. Various methods of meshed engagement between each of the first planet gears 787, the sun gear 786, and the second planet gears 789 can be employed as desired. Each of the second planet gears 789 is in meshed engagement with the first planet gears 787 and the annulus 790. Various methods of meshed engagement between each of the second planet gears 789, the first planet gears 787, and the annulus 790 can be employed as desired.

In the embodiment shown in FIG. 8, the sun gear 786 is operatively connected to the second half shaft 18, the planet gears 787, 789 are operatively connected to the first half shaft 16 via the carrier 788, and the annulus 790 operatively connected to the carrier 766 of the first planetary gear set 760. It should be appreciated that the annulus 790 may be operatively connected to the first planetary gear set 760 by any suitable method as desired.

In operation, when a first gear ratio is desired, the actuator mechanism causes the first clutch 710 to engage, while the second clutch 714 remains disengaged. When the first clutch 710 is engaged, the output shaft 706 of the electric motor 704 causes the output shaft 706 and the first gear 726 coupled thereto, to rotate therewith. The second gear 736 may freely rotate with the third gear 750. A rotation of the first gear 726 drives the fourth gear 752 of the first 30 compound idler assembly 740, and causes the idler shaft 742 and the third gear 750 coupled thereto, to rotate therewith. A rotation of the third gear 750 drives the fifth gear 770, and causes the sun gear 762 of the first planetary gear set 760 to rotate therewith. A rotation of the sun gear 762 drives the planet gears 764 of the planetary gear set 760, and causes the carrier 766 coupled thereto, to rotate therewith. A rotation of the carrier 766 of the first planetary gear set 760 simultaneously causes the annulus 790 of the second planetary gear set 780 to rotate therewith. A rotation of the annulus 790 of the second planetary gear set 780 further causes the planet gears 787, 789 and the sun gear 786 to rotate therewith. A rotation of the planet gears 787, 789 via the carrier 788 causes the first half shaft 16 to rotate therewith. Likewise, a rotation of the sun gear 786 causes the second half shaft 18 to rotate therewith. The rotation of the planet gears 787, 789 and the sun gear 786 of the second planetary gear set 780 transfers a desired first torque from the output shaft 706 to the first and second axle shafts 16, 18. When the electric drive axle 700 is in a power generation mode, the torque transfer described above is reversed.

When a second gear ratio, which is less than the first gear ratio, is desired, the actuator mechanism causes the second clutch 714 to engage, while the first clutch 710 remains disengaged. When the second clutch 714 is engaged, the output shaft 706 of the electric motor 704 causes the second gear 736 to rotate therewith. The first gear 726 may freely rotate with the fourth gear 752. A rotation of the second gear 736 drives the third gear 750 of the first compound idler assembly 740, and causes the idler shaft 742 and the third gear 750 to rotate therewith. A rotation of the third gear 750 drives the fifth gear 770, and causes the sun gear 762 of the first planetary gear set 760 to rotate therewith. A rotation of the sun gear 762 drives the planet gears 764 of the planetary gear set 760, and causes the carrier 766 coupled thereto, to rotate therewith. A rotation of the carrier 766 of the first planetary gear set 760 simultaneously causes the annulus 790 of the second planetary gear set 780 to rotate therewith. A rotation of the annulus 790 of the second planetary gear set 780 further causes the planet gears 787, 789 and the sun gear 786 to rotate therewith. A rotation of the planet gears 787, 789 via the carrier 788 causes the first half shaft 16 to rotate therewith. Likewise, a rotation of the sun gear 786 causes the second half shaft 18 to rotate therewith. The rotation of the planet gears 787, 789 and the sun gear 786 of the second planetary gear set 780 transfers a desired first torque from the output shaft 706 to the first and second axle shafts 16, 18. When the electric drive axle 700 is in a power generation mode, the torque transfer described above is reversed.

Figure 12:
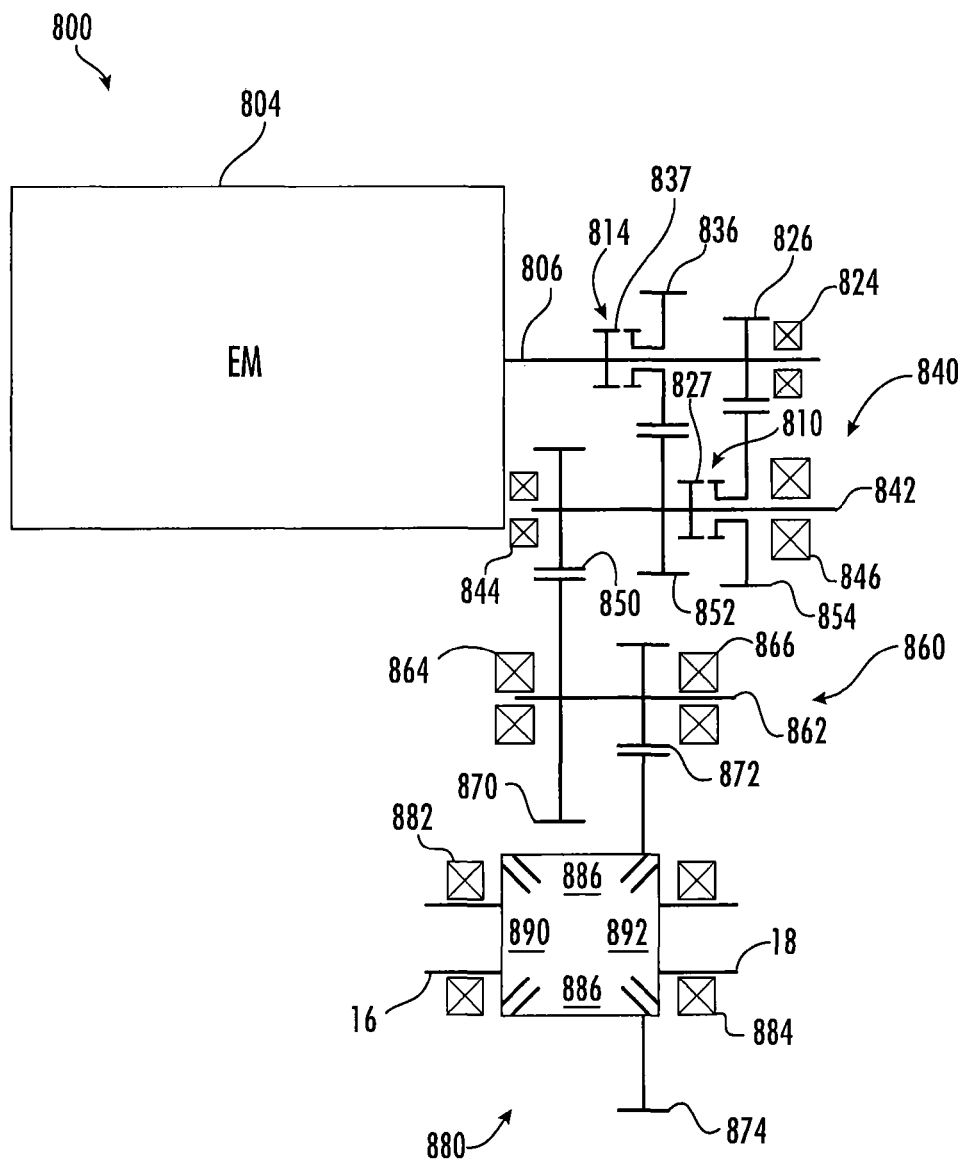
FIG. 12 is a schematic diagram of a portion of an electric drive axle of the vehicle driveline shown in FIG. 1 according to yet another embodiment, including an electric motor, a first compound idler assembly, a second compound idler assembly, and a differential.

Referring now to the embodiment shown in FIG. 12, the vehicle 10 may include the electric drive axle 800. The electric drive axle 800 may comprise an integrated drive system. In an embodiment, the electric drive axle 800 includes an electric motor 804 (e.g., electromotor) coupled with a power source (not depicted). The electric motor 804 may be a permanent magnet synchronous machine comprising a stator disposed concentrically about a rotor. The electric drive axle 800 may additionally comprise an inverter (not depicted) for converting direct current to alternating current when the electric motor 804 is utilized to drive the vehicle, and for converting alternating current to direct current when the vehicle decelerates. The electric motor 804 may be referred to herein as a motor-generator. Further, the electric drive axle 800 may include cooling fluid (not depicted) such as, but not limited to, automatic transmission fluid or axle oil integrated with the electric drive axle 800 lubricant for cooling the electric motor 804 and the inverter. In another embodiment (not depicted), the cooling fluid for the electric motor 804 and the inverter may not be integrated with the axle oil. The electric drive axle 800 may have either a co-axial or off axis layout where the axle shaft connecting the wheel to the differential does not pass through the center or the motor but rather parallel to the motor axis.

A motor output shaft 806 is coupled with the rotor of the electric motor 804 for rotation therewith. The output shaft 806 is rotatably supported within a housing (not depicted) (e.g. an axle housing) by at least one bearing 824. It is understood that the at least one bearing 824 can be any type of bearing as desired such as a roller bearing, a ball bearing, a tapered bearing, and the like, for example. The output shaft 806 includes a first gear 826 rotatably coupled thereto. In certain embodiments, the first gear 826 is concentrically disposed about the output shaft 806 axially adjacent the at least one bearing 824. A second gear 836 is coupled to the output shaft 806. In certain embodiments, the second gear 836 is concentrically disposed about the output shaft 806 axially adjacent the first gear 826. The second gear 836 may rotate relative to the output shaft 806 via at least one bearing (not depicted) disposed radially therebetween. It is understood that the at least one bearing can be any type of bearing as desired such as a needle bearing, a roller bearing, a ball bearing, a tapered bearing, and the like, for example.

In certain embodiments, the electric motor 804 drives a first compound idler assembly 840 via the first gear 826 when a first clutch 810 (described in further detail hereinafter) is engaged, or via the second gear 836 when a second clutch 814 (described in further detail hereinafter) is engaged. As illustrated in FIG. 12, the first compound idler assembly 840 is disposed parallel with the output shaft 806 of the electric motor 804. The first compound idler assembly 840 comprises an idler shaft 842 rotatably supported in the housing via first and second bearings 844, 846. It is understood that each of the bearings 844, 846 can be any type of bearing as desired such as a roller bearing, a ball bearing, a tapered bearing, and the like, for example.

A third gear 850, a fourth gear 852, and a fifth gear 854 are coupled to the idler shaft 842. The third gear 850 is concentrically disposed about the idler shaft 842 axially adjacent the first bearing 844. The fourth gear 852 is in meshed engagement with the second gear 836 and receives torque therefrom when the second clutch 814 is engaged and the electric motor 804 drives the electric drive axle 800. The fifth gear 854 is concentrically disposed about the idler shaft 842 axially adjacent to the second bearing 846. The fifth gear 854 may rotate relative to the idler shaft 842 via at least one bearing (not depicted) disposed radially therebetween. It is understood that the at least one bearing can be any type of bearing as desired such as a needle bearing, a roller bearing, a ball bearing, a tapered bearing, and the like, for example. The fifth gear 854 is in meshed engagement with the first gear 826 and receives torque therefrom when the first clutch 810 is engaged and the electric motor 804 drives the electric drive axle 800. A pair of positioning elements (not depicted) may be respectively disposed on ends of the idler shaft 842 to maintain a position of the bearings 844, 846 and the third, fourth, and fifth gears 850, 852, 854, respectively. It is understood that each of the positioning elements can be any type of positioning element as desired such as a snap ring, for example but could use a shim and press fit bearings if the application allows for it.

As illustrated, the fifth gear 854 is connected to the idler shaft 842 by the first clutch 810. The first clutch 810 is concentrically disposed about the idler shaft 842. An actuator mechanism (not depicted) can actuate the first clutch 810. The actuator mechanism can include an actuator, an additional gear set and a roller and ramp assembly. The actuator may be a reversible electric motor as it is compact and easily controllable. It is understood that any other appropriate type of actuator and actuator mechanism may be used such as hydraulic, mechanical, or pneumatic actuators, for example.

In the embodiment shown, the first clutch 810 is a dog clutch. The first clutch 810 includes a plurality of clutch teeth (not depicted) disposed on the fifth gear 854 and a plurality of clutch teeth (not depicted) disposed on a clutch plate 827 coupled to the idler shaft 842. It should be appreciated that the clutch teeth may be formed on a separate and distinct component or integrally formed with each of the fifth gear 854 and the clutch plate 827. In one embodiment, the clutch teeth of the fifth gear 854 extend outwardly therefrom in the first axial direction and the clutch teeth of the clutch plate 827 extend outwardly therefrom in the opposite second axial direction. The clutch teeth of the fifth gear 854 are configured to mesh with the clutch teeth of the clutch plate 827. At least one of the fifth gear 854 and the clutch plate 827 is operatively connected to the idler shaft 842 in such manner to allow movement thereof in both the first and second axial directions. The axial movement of at least one of the fifth gear 854 and the clutch plate 827 facilitates a meshed engagement and disengagement of the clutch teeth of both the fifth gear 854 and the clutch plate 827, and therefore engagement and disengagement of the first clutch 810. A biasing mechanism (not depicted) such as a spring element, for example, may be disposed within the housing, or interposed between the fifth gear 854 and the clutch plate 827, to urge at least one of the fifth gear 854 and the clutch plate 827 in opposite axial directions to cause the disengagement of the clutch teeth thereof. Accordingly, the electric motor 804 drives the fifth gear 854 when the first clutch 810 is engaged. It should be appreciated that any type of the first clutch 810 can be employed as desired such as a wet clutch assembly, a simple dog clutch assembly, a dog clutch assembly with a synchronizer, and the like, for example.

In certain other embodiments, the first clutch 810 is a shift collar clutch. In such embodiments, the first clutch 810 includes both the fifth gear 852 and the clutch plate 827 each having an annular hub extending axially outwardly from an outer surface. Each of the annular hubs includes a plurality of splines formed on an outer peripheral surface thereof. The annular hubs may be integrally formed on the respective fifth gear 854 and clutch plate 827 or coupled thereto as a separate and distinct components thereof, if desired. It should be appreciated that the annular hub of the clutch plate 827 may be integrally formed on the idler shaft 842, eliminating the clutch plate 827 as a separate component. Each of the annular hubs of the fifth gear 854 and the clutch plate 827, respectively, is disposed concentrically about the idler shaft 842 and the annular hub of the fifth gear 854 may rotate relative thereto via at least one needle bearing (not depicted), disposed radially therebetween. At least one spacer (not depicted) and/or at least one positioning element (not depicted) may be employed to militate against an axial movement of the needle bearing along the idler shaft 842. It is understood that the positioning element can be any type of positioning element as desired such as a snap ring, for example. A thrust bearing (not depicted) may be disposed concentrically about the idler shaft 842 and interposed between the annular hub of the fifth gear 854 and the annular hub of the clutch plate 827. The thrust bearing is configured to militate against friction between the annular hubs. It should be appreciated that additional thrust bearings may be employed to militate against friction between other components of the electric drive axle 800, if desired, such as between the fifth gear 854 and the second bearing 846, for example. Various types of thrust bearings can be employed as desired.

The first clutch 810 further includes a sleeve 847. The sleeve 847 is concentrically disposed about the annular hub of the clutch plate 827 or the idler shaft 842 when the first clutch 810 is disengaged. It is understood, however, that the sleeve 847 may be concentrically disposed about the annular hub of the fifth gear 854 when the first clutch 810 is disengaged, if desired. An inner peripheral surface of the sleeve 847 includes a plurality of splines (not depicted) formed thereon. The splines are of such shape, size, and number so as to cooperate with the splines of the annular hub of the fifth gear 854 and the annular hub of the clutch plate 827 or the idler shaft 842. In certain embodiments, the sleeve 847 has an axial length sufficient to enable a meshed engagement with both the annular hubs when the first clutch 810 is engaged. The sleeve 847 is coupled to the respective annular hubs of the fifth gear 854 and the clutch plate 827 or the idler shaft 842 to permit a linear actuation thereof to cause the first clutch 810 to be activated from a disengaged position to an engaged position. In certain embodiments, the linear actuation of the sleeve 847 is caused by a controller (not shown) in electrical communication with an operating device (not shown). The operating device (not shown) may be any operating device as desired such as a high-speed low-torque brushless direct current motor, for example. The operating device (not shown) may include an actuator coupled therewith. The actuator may be operatively connected with the sleeve 847 to move the sleeve 847 from a first position when the first clutch 810 is in the disengaged position to a second position when the first clutch 810 is in the engaged position. It is understood that the linear actuation of the sleeve 847 from the first position to the second position thereof may be caused by other methods as desired.

In certain embodiments, the second gear 836 is connected to the output shaft 806 via the second clutch 814. The second clutch 814 is concentrically disposed about the output shaft 806. An actuator mechanism (not depicted) can actuate the second clutch 814. The actuator mechanism can include an actuator, an additional gear set and a roller and ramp assembly. The actuator may be a reversible electric motor as it is compact and easily controllable. It is understood that any other appropriate type of actuator and actuator mechanism may be used such as hydraulic, mechanical, or pneumatic actuators, for example. It should be appreciated that the actuator mechanism for actuating the first clutch 810 may be the same actuator mechanism for actuating the second clutch 814, if desired.

In the embodiment shown, the second clutch 814 is also a dog clutch. The second clutch 814 includes a plurality of clutch teeth (not depicted) disposed on the second gear 836 and a plurality of clutch teeth (not depicted) disposed on the clutch plate 837 coupled to the output shaft 806. It should appreciated that the clutch teeth may be formed on a separate and distinct component or integrally formed with each of the second gear 836 and the clutch plate 837. In one embodiment, the clutch teeth of the second gear 836 extend outwardly therefrom in the first axial direction and the clutch teeth of the clutch plate 837 extend outwardly therefrom in the second axial direction. The clutch teeth of the second gear 836 are configured to mesh with the clutch teeth of the clutch plate 837. At least one of the second gear 836 and the clutch plate 837 is operatively connected to the output shaft 806 in such manner to allow movement thereof in both the first and second axial directions. The axial movement of at least one of the second gear 836 and the clutch plate 837 facilitates a meshed engagement and disengagement of the clutch teeth of both the second gear 836 and the clutch plate 837, and therefore engagement and disengagement of the second clutch 814. A biasing mechanism (not depicted) such as a spring element, for example, may be disposed within the housing, or interposed between the second gear 836 and the clutch plate 837, to urge at least one of the second gear 836 and the clutch plate 837 in opposite axial directions to cause the disengagement of the clutch teeth thereof. Accordingly, the electric motor 804 drives the fourth gear 852 when the second clutch 814 is engaged. It should be appreciated that any type of the second clutch 814 can be employed as desired such as a wet clutch assembly, a simple dog clutch assembly, a dog clutch assembly with a synchronizer, and the like, for example.

In certain other embodiments, the second clutch 814 is a shift collar clutch. In such embodiments, the second clutch 814 includes both the second gear 836 and the clutch plate 837 each having an annular hub (not depicted), extending axially outwardly from an outer surface. Each of the annular hubs includes a plurality of splines formed on an outer peripheral surface thereof. The annular hubs may be integrally formed on the respective second gear 836 and clutch plate 837 or coupled thereto as a separate and distinct components thereof, if desired. It should be appreciated that the annular hub of the clutch plate 837 may be integrally formed on the output shaft 806, eliminating the clutch plate 837 as a separate component. Each of the annular hubs of the second gear 836 and the clutch plate 837 is disposed concentrically about the output shaft 806 and the annular hub of the second gear 836 may rotate relative thereto via at least one needle bearing (not depicted), disposed radially therebetween. At least one spacer (not depicted) and/or at least one positioning element (not depicted) may be employed to militate against an axial movement of the needle bearing along the output shaft 806. It is understood that the positioning element can be any type of positioning element as desired such as a snap ring, for example. A thrust bearing (not depicted) may be disposed concentrically about the output shaft 806 and interposed between the annular hub of the second gear 836 and the annular hub of the clutch plate 837. The thrust bearing is configured to militate against friction between the annular hubs. It should be appreciated that additional thrust bearings may be employed to militate against friction between other components of the electric drive axle 800, if desired, such as between the first gear 826 and the bearing 824, for example. Various types of thrust bearings can be employed as desired.

The second clutch 814 further includes a sleeve (not depicted). The sleeve is concentrically disposed about the annular hub of the clutch plate 837 or the output shaft 806 when the second clutch 814 is disengaged. It is understood, however, that the sleeve may be concentrically disposed about the annular hub of the second gear 836 when the second clutch 814 is disengaged, if desired. An inner peripheral surface of the sleeve includes a plurality of splines (not depicted) formed thereon. The splines are of such shape, size, and number so as to cooperate with the splines of the annular hub of the second gear 836 and the annular hub of the clutch plate 837 or the output shaft 806. In certain embodiments, the sleeve has an axial length sufficient to enable a meshed engagement with both the annular hubs when the second clutch 814 is engaged. The sleeve is coupled to the respective annular hubs of the second gear 836 and the clutch plate 837 or the output shaft 806 to permit a linear actuation thereof to cause the second clutch 814 to be activated from a disengaged position to an engaged position. In certain embodiments, the linear actuation of the sleeve is caused by a controller (not shown) in electrical communication with an operating device (not shown). The operating device (not shown) may be any operating device as desired such as a high-speed low-torque brushless direct current motor, for example. The operating device (not shown) may include an actuator coupled therewith. The actuator may be operatively connected with the sleeve to move the sleeve from a first position when the second clutch 814 is in the disengaged position to a second position when the second clutch 814 is in the engaged position. It is understood that the linear actuation of the sleeve from the first position to the second position thereof may be caused by other methods as desired.

In certain embodiments, the first clutch 810 and the second clutch 814 may be substantially simultaneously actuated by a shift member (not depicted). The actuator is configured to cause the shift member to move or rotate in a first direction, and thereby engage the first clutch 810 and disengage the second clutch 814 substantially simultaneously. Additionally, the actuator is configured to cause the shift member to move or rotate in an opposite second direction, and thereby disengage the first clutch 810 and engage the second clutch 814 substantially simultaneously. An actuation of the shift member is typically used to shift the electric drive axle 800 between a first gear ratio and a second gear ratio. It is understood that the shift member may be a cam shaft, if desired.

In certain embodiments, the first compound idler assembly 840 drives a second compound idler assembly 860 via the third gear 850. As illustrated in FIG. 12, the second compound idler assembly 860 is disposed parallel with both the output shaft 806 of the electric motor 804 and the idler shaft 842 of the first compound assembly 840. The second compound idler assembly 860 comprises an idler shaft 862 rotatably supported in the housing via first and second bearings 864, 866. It is understood that each of the bearings 864, 866 can be any type of bearing as desired such as a roller bearing, a ball bearing, a tapered bearing, and the like, for example.

A sixth gear 870 and a seventh gear 872 are coupled for rotation with the idler shaft 862. The sixth gear 870 is disposed axially adjacent to the first bearing 864. The sixth gear 870 is in meshed engagement with the third gear 850 and receives torque therefrom when one of the first and second clutches 810, 814 is engaged and the electric motor 804 drives the electric drive axle 800. The seventh gear 872 is disposed axially adjacent to the second bearing 866. A pair of positioning elements (not depicted) may be respectively disposed on ends of the idler shaft 862 to maintain a position of the bearings 864, 866 and the sixth and seventh gears 870, 872. It is understood that each of the positioning elements can be any type of positioning element as desired such as a snap ring, for example but could use a shim and press fit bearings if the application allows for it.

The seventh gear 872 receives torque from the sixth gear 870 when one of the first and second clutches 810,814 is engaged and the electric motor 804 drives the electric drive axle 800. As illustrated, the seventh gear 872 is in meshed engagement with an eighth gear 874. The seventh gear 872 drives the eighth gear 874 when one of the first and second clutches 810,814 is engaged and the electric motor 804 drives the electric drive axle 800. The eighth gear 874 is coupled for rotation with a differential 880. The differential 880 is rotatably supported within the housing via a pair of bearings 882, 884. It is understood that each of the bearings 882, 884 can be any type of bearing as desired such as a roller bearing, a ball bearing, a tapered bearing, and the like, for example.

As illustrated in FIG. 12, the differential 880 includes two or more differential pinions 886 disposed within a differential case 888. The differential pinions 886 are coupled with the differential case 888 via a pinion shaft (not depicted). In an embodiment, the pinion shaft may comprise a cross member. The differential pinions 886 are in meshed engagement with first and second side gears 890, 892. The first and second side gears 890, 892 are coupled for rotation with the first and second half shafts 16, 18, respectively, shown in FIG. 1.

In operation, when a first gear ratio is desired, the actuator mechanism causes the first clutch 810 to engage, while the second clutch 814 remains disengaged. When the first clutch 810 is engaged, the output shaft 806 of the electric motor 804 causes the output shaft 806 and the first gear 826 coupled thereto, to rotate therewith. The second gear 836 may freely rotate with the fourth gear 852. A rotation of the first gear 826 drives the fifth gear 854 of the first compound idler assembly 840, and causes the idler shaft 842 and the third gear 850 coupled thereto, to rotate therewith. A rotation of the third gear 850 drives the sixth gear 870 of the second compound idler assembly 860, and causes the idler shaft 862 and the seventh gear 872 coupled thereto, to rotate therewith. A rotation of the seventh gear 872 drives the eighth gear 874 of the differential 880, and causes the differential case 888 to rotate therewith. A rotation of the differential case 888 further causes the first and second half shafts 16, 18 to rotate therewith. The rotation of the differential 880 transfers a desired first torque from the output shaft 806 to the first and second axle shafts 16, 18. When the electric drive axle 800 is in a power generation mode, the torque transfer described above is reversed.

When a second gear ratio, which is less than the first gear ratio, is desired, the actuator mechanism causes the second clutch 814 to engage, while the first clutch 810 remains disengaged. When the second clutch 814 is engaged, the output shaft 806 of the electric motor 804 causes the second gear 836 to rotate therewith. The first gear 826 may freely rotate with the fifth gear 854. A rotation of the second gear 836 drives the fourth gear 852 of the first compound idler assembly 840, and causes the idler shaft 842 and the third gear 850 coupled thereto, to rotate therewith. A rotation of the third gear 850 drives the sixth gear 870 of the second compound idler assembly 860, and causes the idler shaft 862 and the seventh gear 872 coupled thereto, to rotate therewith. A rotation of the seventh gear 872 drives the eighth gear 874 of the differential 880, and causes the differential case 888 to rotate therewith. A rotation of the differential case 888 further causes the first and second half shafts 16, 18 to rotate therewith. The rotation of the differential 880 transfers a desired second torque from the output shaft 806, which is less than the first torque, to the first and second axle shafts 16, 18. When the electric drive axle 800 is in a power generation mode, the torque transfer described above is reversed.

Figure 13:
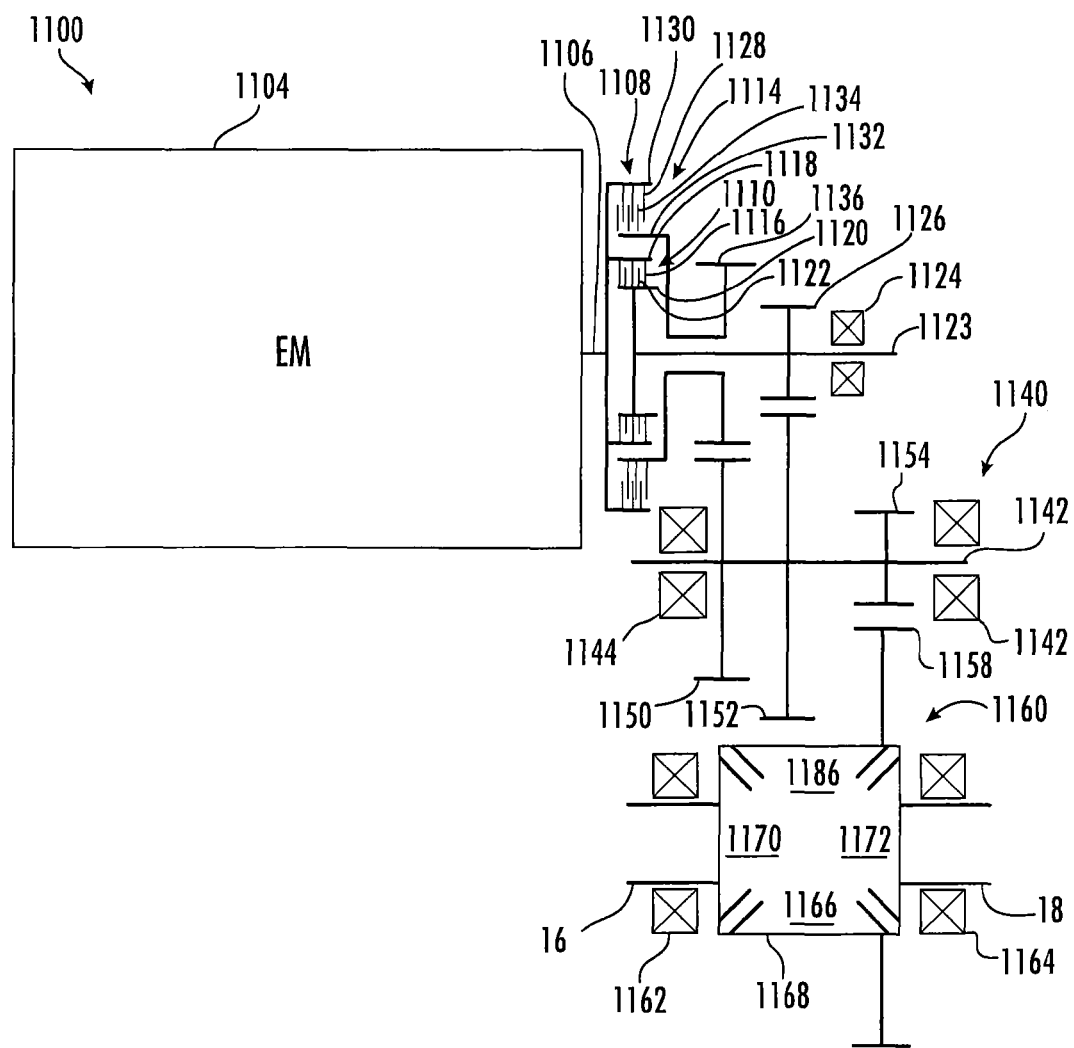
FIG. 13 is a schematic diagram of a portion of an electric drive axle of the vehicle driveline shown in FIG. 1 according to an embodiment, including an electric motor, a compound idler assembly, and a differential.

Embodiments of an electric drive axle 1100 are described below. In certain embodiments, the electric drive axle 1100 is utilized with a pure electric vehicle (not depicted) where the electric drive axle 1100 is the only driving axle. In other embodiments, as illustrated in FIG. 13, the electric drive axle 1100 is utilized with a hybrid four-wheel-drive vehicle 110 where the front axle is driven by an internal combustion engine 112, and the rear axle is the electric drive axle 11 00 (or vice versa). In still other embodiments, the electric drive axle 1100 is utilized in a hybrid commercial vehicle (not depicted) comprising a tandem axle in which the front tandem axle is driven by an internal combustion engine, and the rear tandem axle is the electric drive axle 1100 (or vice versa). The electric drive axle 1100 may have applications in commercial vehicles, both light duty and heavy duty vehicles, and for passenger, off-highway, and sport utility vehicles. Additionally, the electric drive axle 1100 described herein may be adapted for use in front and/or rear driving axles, and in steerable and non-steerable axles. It would be understood by one of ordinary skill in the art that the electric drive axle 1100 also has industrial, locomotive, military, agricultural, and aerospace applications.

In certain embodiment illustrated in FIG. 13, the electric drive axle 1100 may comprise an integrated drive system. In an embodiment, the electric drive axle 1100 includes an electric motor 1104 (e.g., electromotor) coupled with a power source (not depicted). The electric motor 1104 may be a permanent magnet synchronous machine comprising a stator disposed concentrically about a rotor. The electric drive axle 1100 may additionally comprise an inverter (not depicted) for converting direct current to alternating current when the electric motor 1104 is utilized to drive the vehicle, and for converting alternating current to direct current when the vehicle decelerates. The electric motor 1104 may be referred to herein as a motor-generator. Further, the electric drive axle 1100 may include cooling fluid (not depicted) such as, but not limited to, automatic transmission fluid or axle oil integrated with the electric drive axle 1100 lubricant for cooling the electric motor 1104 and the inverter. In another embodiment (not depicted), the cooling fluid for the electric motor 1104 and the inverter may not be integrated with the axle oil. The electric drive may have either a co-axial or off axis layout where the axle shaft connecting the wheel to the differential does not pass through the center or the motor but rather parallel to the motor axis.

A motor output shaft 1106 is coupled with the rotor of the electric motor 1104 for rotation therewith. The output shaft 1106 is connected to a clutch assembly 1108. It should be appreciated that any type of clutch assembly 1108 can be employed as desired such as a wet clutch assembly, a simple dog clutch assembly, a dog clutch assembly with a synchronizer, and the like, for example.

In the embodiment shown, the clutch assembly 1108 includes a first or inner clutch 1110 concentrically disposed about the output shaft 1106 and a second or outer clutch 1114 concentrically disposed about the output shaft 1106 and the first clutch 1110. The clutches 1110, 1114 are positioned radially adjacent to each other such that a single actuator mechanism (not depicted) can separately actuate each of the clutches 1110, 1114. Accordingly, only one of the clutches 1110, 1114 is engaged at any one time. The actuator mechanism can include an actuator, an additional gear set and a roller and ramp assembly. The actuator may be a reversible electric motor as it is compact and easily controllable. It is understood that any other appropriate type of actuator and actuator mechanism may be used such as hydraulic, mechanical, or pneumatic actuators, for example.

In the embodiment shown, the first clutch 1110 includes a set of clutch plates 1116 extending radially inward from a first clutch hub 1118. The clutch plates 1116 are mounted for axial movement with the first clutch hub 1118. The first clutch 1110 further includes a second clutch hub 1120. The second clutch hub 1120 has a set of clutch plates 1122 extending radially outward from the second clutch hub 1120. The clutch plates 1122 interleave with the clutch plates 1116. It should be appreciated 10 that the first clutch 1110 may include any number of clutch plates 1116, 1122 as desired. The second clutch hub 1120 is connected to a common shaft 1123. The common shaft 1123 is disposed co-axially with the output shaft 1106 and is rotatably supported in an axle housing (not depicted) by at least one bearing 1124. It is understood that the at least one bearing 1124 can be any type of bearing as desired such as a roller bearing, a ball bearing, a tapered bearing, and the like, for example. A first gear 1126 is coupled for rotation with the common shaft 1123. Accordingly, the electric motor 1104 drives the first gear 1126 when the first clutch 1110 is engaged. In certain embodiments, the first gear 1126 is disposed axially adjacent to the at least one bearing 1124.

As illustrated, the second clutch 1114 includes a set of clutch plates 1128 extending radially inward from a first clutch hub 1130. The clutch plates 1128 are mounted for axial movement with the first clutch hub 1130. The second clutch 1114 further includes a second clutch hub 1132 having a set of clutch plates 1134 extending radially outward from the second clutch hub 1132. The clutch plates 1134 interleave with the clutch plates 1128. It should also be appreciated that the second clutch 1114 may include any number of clutch plates 1128, 1134 as desired. A second gear 1136 is operably connected to the second clutch 1114. In certain embodiments, the second gear 1136 is concentrically disposed about the common shaft 1123 between the first gear 1126 and the clutch assembly 1108. The second gear 1136 may rotate relative to the common shaft 1123 via at least one bearing (not depicted) disposed radially therebetween. It is understood that the at least one bearing can be any type of bearing as desired such as a needle bearing, a roller bearing, a ball bearing, a tapered bearing, and the like, for example.

Accordingly, the electric motor 1104 drives the second gear 1136 when the second clutch 1114 is engaged.

In certain embodiments, the electric motor 1104 drives a first compound idler assembly 1140 via the first gear 1126 when the first clutch 1110 is engaged, or via the second gear 1136 when the second clutch 1114 is engaged. As illustrated in FIG. 13, the first compound idler assembly 1140 is disposed parallel with the output shaft 1106 of the electric motor 1104. The first compound idler assembly 1140 comprises an idler shaft 1142 rotatably supported in the axle housing via first and second bearings 1144, 1146. It is understood that each of the bearings 1144, 1146 can be any type of bearing as desired such as a roller bearing, a ball bearing, a tapered bearing, and the like, for example.

A third, fourth, and fifth gears 1150,1152,1154, respectively, are coupled for rotation with the idler shaft 1142. The third gear 1150 is disposed axially adjacent to the second bearing 1146. The third gear 1150 is disposed axially adjacent the first bearing 1144. The third gear 1150 is in meshed engagement with the second gear 1136 and receives torque therefrom when the second clutch 1114 is engaged and the electric motor 1104 drives the electric drive axle 1100. The fourth gear 1152 is disposed between the third and fifth gears 1150, 1154. The fourth gear 1152 is in meshed engagement with the first gear 1126 and receives torque therefrom when the first clutch 1110 is engaged and the electric motor 1104 drives the electric drive axle 1100. The fifth gear 1154 is disposed axially adjacent the second bearing 1146. A pair of positioning elements (not depicted) may be respectively disposed on ends of the idler shaft 1142 to maintain a position of the bearings 1144, 1146 and the third, fourth, and fifth gears 1150, 1152, 1154. It is understood that each of the positioning elements can be any type of positioning element as desired such as a snap ring, for example but could use a shim and press fit bearings if the application allows for it.

The fifth gear 1158 receives torque from one of the first and second gears 1126, 1136, when one of the first and second clutches 1110, 1114, respectively, is engaged and the electric motor 1104 drives the electric drive axle 1100. As illustrated, the fifth gear 1154 is in meshed engagement with a sixth gear 1158. The fifth gear 1154 drives the sixth gear 1158, when one of the first and second clutches 1110, 1114, respectively, is engaged and the electric motor 1104 drives the electric drive axle 1100. The sixth gear 1158 is coupled for rotation with a differential 1160. The differential 1160 is rotatably supported within the axle housing via a pair of bearings 1162, 1164. It is understood that each of the bearings 1162, 1164 can be any type of bearing as desired such as a roller bearing, a ball bearing, a tapered bearing, and the like, for example.

As illustrated in FIG. 13, the differential 1160 includes two or more differential pinions 1166 disposed within a differential case 1168. The differential pinions 1166 are coupled with the differential case 1168 via a pinion shaft (not depicted). In an embodiment, the pinion shaft may comprise a cross member. The differential pinions 1166 are in meshed engagement with first and second side gears 1170, 1172. The first and second side gears 1170, 1172 are coupled for rotation with the first and second half shafts 16, 18, respectively, shown in FIG. 1.

In operation, when a first gear ratio is desired, the actuator mechanism causes the first clutch 1110 to engage, while the second clutch 1114 remains disengaged. When the first clutch 1110 is engaged, the output shaft 1106 of the electric motor 1104 causes the common shaft 1123 and the first gear 1126 coupled thereto, to rotate therewith. A rotation of the first gear 1126 drives the fourth gear 1152, and causes the idler shaft 1142 and the fifth gear 1154 coupled thereto, to rotate therewith. A rotation of the fifth gear 1154 drives the sixth gear 1158, and causes the differential case 1168 to rotate therewith. A rotation of the differential case 1168 further causes the first and second half shafts 16, 18 to rotate therewith. The rotation of the differential 1160 transfers a desired first torque from the output shaft 1106 to the first and second axle shafts 16, 18. When the electric drive axle 1100 is in a power generation mode, the torque transfer described above is reversed.

When a second gear ratio, which is less than the first gear ratio, is desired, the actuator mechanism causes the second clutch 1114 to engage, while the first clutch 1110 remains disengaged. When the second clutch 1114 is engaged, the output shaft 1106 of the electric motor 1104 causes the second gear 1136 to rotate therewith. A rotation of the second gear 1136 drives the third gear 1150, and causes the idler shaft 1142 and the fifth gear 1154 coupled thereto, to rotate therewith. A rotation of the fifth gear 1154 drives the sixth gear 1158, and causes the differential case 1168 to rotate therewith. A rotation of the differential case 1168 further causes the first and second half shafts 16, 18 to rotate therewith. The rotation of the differential 1160 transfers a desired second torque from the output shaft 1106, which is less than the first torque, to the first and second axle shafts 16, 18. When the electric drive axle 1100 is in a power generation mode, the torque transfer described above is reversed.

Figure 14:
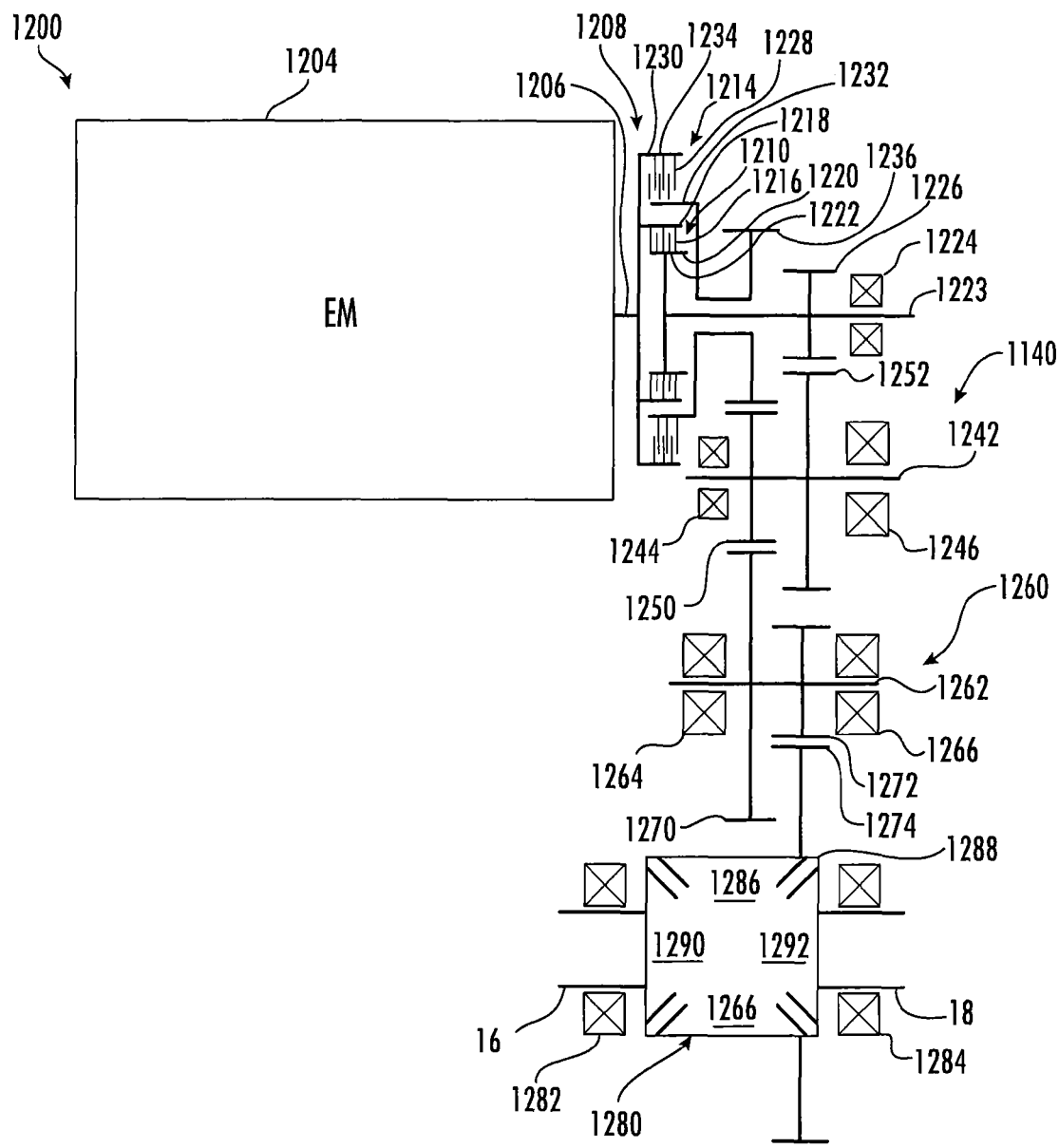
FIG. 14 is a schematic diagram of a portion of an electric drive axle of the vehicle driveline shown in FIG. 1 according to an embodiment, including an electric motor, a first compound idler assembly, a second compound idler assembly, and a differential.

In certain embodiments illustrated in FIG. 14, the vehicle 10 may include an 10 electric drive axle 1200. The electric drive axle 1200 may comprise an integrated drive system. In an embodiment, the electric drive axle 1200 includes an electric motor 1204 (e.g., electromotor) coupled with a power source (not depicted). The electric motor 1204 may be a permanent magnet synchronous machine comprising a stator disposed concentrically about a rotor. The electric drive axle 1200 may 15 additionally comprise an inverter (not depicted) for converting direct current to alternating current when the electric motor 1204 is utilized to drive the vehicle, and for converting alternating current to direct current when the vehicle decelerates. The electric motor 1204 may be referred to herein as a motor-generator. Further, the electric drive axle 1200 may include cooling fluid (not depicted) such as, but not limited to, automatic transmission fluid or axle oil integrated with the electric drive axle 1200 lubricant for cooling the electric motor 1204 and the inverter. In another embodiment (not depicted), the cooling fluid for the electric motor 1204 and the inverter may not be integrated with the axle oil. The electric drive may have either a co-axial or off axis layout where the axle shaft connecting the wheel to the differential does not pass through the center or the motor but rather parallel to the motor axis.

A motor output shaft 1206 is coupled with the rotor of the electric motor 1204 for rotation therewith. The output shaft 1206 is connected to a clutch assembly 1208. It should be appreciated that any type of clutch assembly 1208 can be employed as desired such as a wet clutch assembly, a simple dog clutch assembly, a dog clutch assembly with a synchronizer, and the like, for example.

In the embodiment shown, the clutch assembly 1208 includes a first or inner clutch 1210 concentrically disposed about the output shaft 1206 and a second or outer clutch 1214 concentrically disposed about the output shaft 1206 and the first clutch 1210. The clutches 1210, 1214 are positioned radially adjacent to each other such that a single actuator mechanism (not depicted) can separate actuate each of the clutches 1210,1214. Accordingly, only one of the clutches 1210,1214 is engaged at any one time. The actuator mechanism can include an actuator, an additional gear set and a roller and ramp assembly. The actuator may be a reversible electric motor as it is compact and easily controllable. It is understood that any other appropriate type of actuator and actuator mechanism may be used such as hydraulic, mechanical, or pneumatic actuators, for example.

In the embodiment shown, the first clutch 1210 includes a set of clutch plates 1216 extending radially inward from a first clutch hub 1218. The clutch plates 1216 are mounted for axial movement with the first clutch hub 1218. The first clutch 1210 further includes a second clutch hub 1220. The second clutch hub 1220 has a set of clutch plates 1222 extending radially outward from the second clutch hub 1220. The clutch plates 1222 interleave with the clutch plates 1216. It should be appreciated that the first clutch 1210 may include any number of clutch plates 1216, 1222 as desired. The second clutch hub 1220 is connected to a common shaft 1223. The common shaft 1223 is disposed co-axially with the output shaft 1206 and is rotatably supported in an axle housing (not depicted) by at least one bearing 1224. It is understood that the at least one bearing 1224 can be any type of bearing as desired such as a roller bearing, a ball bearing, a tapered bearing, and the like, for example. A first gear 1226 is coupled for rotation with the common shaft 1223. Accordingly, the electric motor 1204 drives the first gear 1226 when the first clutch 1210 is engaged. In certain embodiments, the first gear 1226 is disposed axially adjacent to the at least one bearing 1224.

As illustrated, the second clutch 1214 includes a set of clutch plates 1228 extending radially inward from a first clutch hub 1230. The clutch plates 1228 are mounted for axial movement with the first clutch hub 1230. The second clutch 1214 further includes a second clutch hub 1232 having a set of clutch plates 1234 extending radially outward from the second clutch hub 1232. The clutch plates 1234 interleave with the clutch plates 1228. It should also be appreciated that the second clutch 1214 may include any number of clutch plates 1228, 1234 as desired. A second gear 1236 is operably connected to the second clutch 1214. In certain embodiments, the second gear 1236 is concentrically disposed about the common shaft 1223 between the first gear 1226 and the clutch assembly 1208. The second gear 1236 may rotate relative to the common shaft 1223 via at least one bearing (not depicted) disposed radially therebetween. It is understood that the at least one bearing can be any type of bearing as desired such as a needle bearing, a roller bearing, a ball bearing, a tapered bearing, and the like, for example. Accordingly, the electric motor 1204 drives the second gear 1236 when the second clutch 1214 is engaged.

In certain embodiments, the electric motor 1204 drives a first compound idler assembly 1240 via the first gear 1226 when the first clutch 1210 is engaged, or via the second gear 1236 when the second clutch 1214 is engaged. As illustrated in FIG. 14, the first compound idler assembly 1240 is disposed parallel with the output shaft 1206 of the electric motor 1204. The first compound idler assembly 1240 comprises an idler shaft 1242 rotatably supported in the axle housing via first and second bearings 1244, 1246. It is understood that each of the bearings 1244, 1246 can be any type of bearing as desired such as a roller bearing, a ball bearing, a tapered bearing, and the like, for example.

A third gear 1250 and a fourth gear 1252 are coupled for rotation with the idler shaft 1242. The third gear 1250 is disposed axially adjacent to the first bearing 1244. The third gear 1250 is in meshed engagement with the second gear 1236 and receives torque therefrom when the second clutch 1214 is engaged and the electric motor 1204 drives the electric drive axle 1200. The fourth gear 1252 is disposed axially adjacent to the second bearing 1246. The fourth gear 1252 is in meshed engagement with the first gear 1226 and receives torque therefrom when the first clutch 1210 is engaged and the electric motor 1204 drives the electric drive axle 1200. A pair of positioning elements (not depicted) may be respectively disposed on ends of the idler shaft 1242 to maintain a position of the bearings 1244, 1246 and the third and fourth gears 1250, 1252. It is understood that each of the positioning elements can be any type of positioning element as desired such as a snap ring, for example but could use a shim and press fit bearings if the application allows for it.

In certain embodiments, the first compound idler assembly 1240 drives a second compound idler assembly 1260 via the third gear 1250. As illustrated in FIG. 14, the second compound idler assembly 1260 is disposed parallel with both the output shaft 1206 of the electric motor 1204 and the idler shaft 1242 of the first compound assembly 1240. The second compound idler assembly 1260 comprises an idler shaft 1262 rotatably supported in the axle housing via first and second bearings 1264, 1266. It is understood that each of the bearings 1264, 1266 can be any type of bearing as desired such as a roller bearing, a ball bearing, a tapered bearing, and the like, for example.

A fifth gear 1270 and a sixth gear 1272 are coupled for rotation with the idler shaft 1262. The fifth gear 1270 is disposed axially adjacent to the first bearing 1264. The fifth gear 1270 is in meshed engagement with the third gear 1250 and receives torque therefrom when one of the first and second clutches 1210, 1214 is engaged and the electric motor 1204 drives the electric drive axle 1200. The sixth gear 1272 is disposed axially adjacent to the second bearing 1266. A pair of positioning elements (not depicted) may be respectively disposed on ends of the idler shaft 1262 to maintain a position of the bearings 1264, 1266 and the fifth and sixth gears 1270, 1272. It is understood that each of the positioning elements can be any type of positioning element as desired such as a snap ring, for example but could use a shim and press fit bearings if the application allows for it.

The sixth gear 1272 receives torque from the fifth gear 1270, when one of the first and second clutches 1210, 1214, respectively, is engaged and the electric motor 1204 drives the electric drive axle 1200. As illustrated, the sixth gear 1272 is in meshed engagement with a seventh gear 1274. The sixth gear 1272 drives the seventh gear 1274 when one of the first and second clutches 1210, 1214 is engaged and the electric motor 1204 drives the electric drive axle 1200. The seventh gear 1274 is coupled for rotation with a differential 1280. The differential 1280 is rotatably supported within the axle housing via a pair of bearings 1282, 1284. It is understood that each of the bearings 1282, 1284 can be any type of bearing as desired such as a roller bearing, a ball bearing, a tapered bearing, and the like, for example.

As illustrated in FIG. 14, the differential 1280 includes two or more differential pinions 1286 disposed within a differential case 1288. The differential pinions 1286 are coupled with the differential case 1288 via a pinion shaft (not depicted). In an embodiment, the pinion shaft may comprise a cross member. The differential pinions 1286 are in meshed engagement with first and second side gears 1290, 1292. The first and second side gears 1290, 1292 are coupled for rotation with the first and second half shafts 16, 18, respectively, shown in FIG. 1.

In operation, when a first gear ratio is desired, the actuator mechanism causes the first clutch 1210 to engage, while the second clutch 1214 remains disengaged. When the first clutch 1210 is engaged, the output shaft 1206 of the electric motor 1204 causes the common shaft 1223 and the first gear 1226 coupled thereto, to rotate therewith. A rotation of the first gear 1226 drives the fourth gear 1252 of the first compound idler assembly 1240, and causes the idler shaft 1242 and the third gear 1250 coupled thereto, to rotate therewith. A rotation of the third gear 1250 drives the fifth gear 1270 of the second compound idler assembly 1260, and causes the idler shaft 1262 and the sixth gear 1272 coupled thereto, to rotate therewith. A rotation of the sixth gear 1272 drives the seventh gear 1274 of the differential 1280, and causes the differential case 1288 to rotate therewith. A rotation of the differential case 1288 further causes the first and second half shafts 16, 18 to rotate therewith. The rotation of the differential 1280 transfers a desired first torque from the output shaft 1206 to the first and second axle shafts 16, 18. When the electric drive axle 1200 is in a power generation mode, the torque transfer described above is reversed.

When a second gear ratio, which is less than the first gear ratio, is desired, the actuator mechanism causes the second clutch 1214 to engage, while the first clutch 1210 remains disengaged. When the second clutch 1214 is engaged, the output shaft 1206 of the electric motor 1204 causes the second gear 1236 to rotate therewith. A rotation of the second gear 1236 drives the third gear 1250 of the first compound idler assembly 1240, and causes the idler shaft 1242 and the third gear 1250 to rotate therewith. A rotation of the third gear 1250 drives the fifth gear 1270 of the second compound idler assembly 1260, and causes the idler shaft 1262 and the sixth gear 1272 coupled thereto, to rotate therewith. A rotation of the sixth gear 1272 drives the seventh gear 1274 of the differential 1280, and causes the differential case 1288 to rotate therewith. A rotation of the differential case 1288 further causes the first and second half shafts 16, 18 to rotate therewith. The rotation of the differential 1280 transfers a desired second torque from the output shaft 1206, which is less than the first torque, to the first and second axle shafts 16, 18. When the electric drive axle 1200 is in a power generation mode, the torque transfer described above is reversed.

Figure 15:
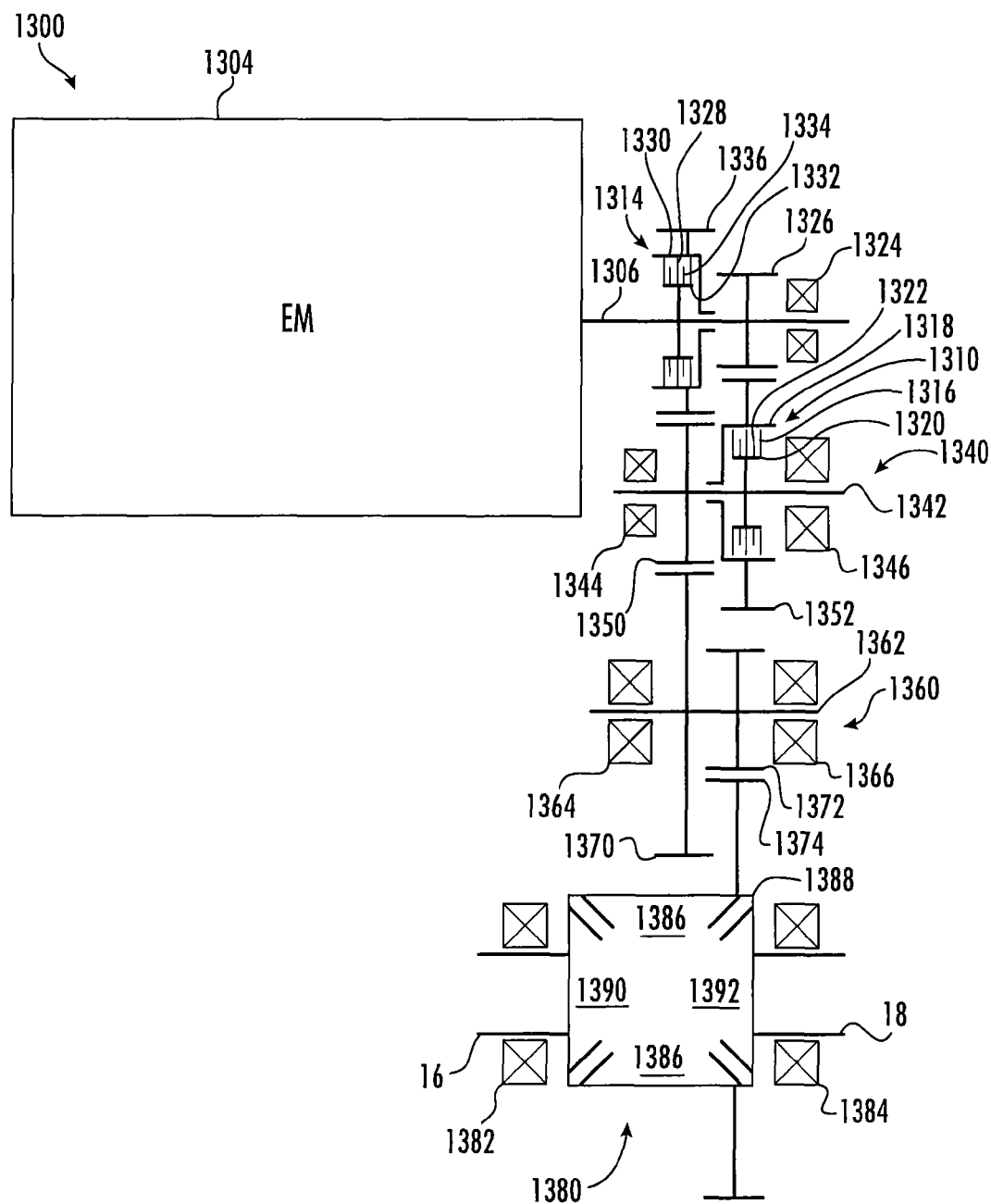
FIG. 15 is a schematic diagram of a portion of the electric drive axle shown in FIG. 1 according to another embodiment, including an electric motor, a first compound idler assembly, a second compound idler assembly, and a differential.

Referring now to the embodiment shown in FIG. 15, the vehicle 10 may include an electric drive axle 1300. The electric drive axle 1300 may comprise an integrated drive system. In an embodiment, the electric drive axle 1300 includes an electric motor 1304 (e.g., electromotor) coupled with a power source (not depicted). The electric motor 1304 may be a permanent magnet synchronous machine comprising a stator disposed concentrically about a rotor. The electric drive axle 1300 may additionally comprise an inverter (not depicted) for converting direct current to alternating current when the electric motor 1304 is utilized to drive the vehicle, and for converting alternating current to direct current when the vehicle decelerates. The electric motor 1304 may be referred to herein as a motor-generator. Further, the electric drive axle 1300 may include cooling fluid (not depicted) such as, but not limited to, automatic transmission fluid or axle oil integrated with the electric drive axle 1300 lubricant for cooling the electric motor 1304 and the inverter. In another embodiment (not depicted), the cooling fluid for the electric motor 1304 and the inverter may not be integrated with the axle oil. The electric drive may have either a co-axial or off axis layout where the axle shaft connecting the wheel to the differential does not pass through the center or the motor but rather parallel to the motor axis.

A motor output shaft 1306 is coupled with the rotor of the electric motor 1304 for rotation therewith. The output shaft 1306 is rotatably supported within an axle housing (not depicted) by at least one bearing 1324. It is understood that the at least one bearing 1324 can be any type of bearing as desired such as a roller bearing, a ball bearing, a tapered bearing, and the like, for example. The output shaft 1306 includes a first gear 1326 rotatably coupled thereto. In certain embodiments, the first gear 1326 is concentrically disposed about the output shaft 1306 axially adjacent the at least one bearing 1324. A second gear 1336 is coupled to the output shaft 1306. In certain embodiments, the second gear 1336 is concentrically disposed about the output shaft 1306 axially adjacent the first gear 1326. The second gear 1336 may rotate relative to the output shaft 1306 via at least one bearing (not depicted) disposed radially therebetween. It is understood that the at least one bearing can be any type of bearing as desired such as a needle bearing, a roller bearing, a ball bearing, a tapered bearing, and the like, for example.

In certain embodiments, the electric motor 1304 drives a first compound idler assembly 1340 via the first gear 1326 when a first clutch 1310 (described in further detail hereinafter) is engaged, or via the second gear 1336 when a second clutch 1314 (described in further detail hereinafter) is engaged. As illustrated in FIG. 15, the first compound idler assembly 1340 is disposed parallel with the output shaft 1306 of the electric motor 1304. The first compound idler assembly 1340 comprises an idler shaft 1342 rotatably supported in the axle housing via first and second bearings 1344, 1346. It is understood that each of the bearings 1344, 1346 can be any type of bearing as desired such as a roller bearing, a ball bearing, a tapered bearing, and the like, for example.

A third gear 1350 and a fourth gear 1352 are coupled to the idler shaft 1342. The third gear 1350 is concentrically disposed about the idler shaft 1342 axially adjacent the first bearing 1344. The third gear 1350 is in meshed engagement with the second gear 1336 and receives torque therefrom when the second clutch 1314 25 is engaged and the electric motor 1304 drives the electric drive axle 1300. The fourth gear 1352 is concentrically disposed about the idler shaft 1342 axially adjacent to the second bearing 1346. The fourth gear 1352 may rotate relative to the idler shaft 1342 via at least one bearing (not depicted) disposed radially therebetween. It is understood that the at least one bearing can be any type of bearing as desired such as a needle bearing, a roller bearing, a ball bearing, a tapered bearing, and the like, for example. The fourth gear 1352 is in meshed engagement with the first gear 1326 and receives torque therefrom when the first clutch 1310 is engaged and the electric motor 1304 drives the electric drive axle 1300. A pair of positioning elements (not depicted) may be respectively disposed on ends of the idler shaft 1342 to maintain a position of the bearings 1344, 1346 and the third and fourth gears 1350, 1352. It is understood that each of the positioning elements can be any type of positioning element as desired such as a snap ring, for example but could use a shim and press fit bearings if the application allows for it.

As illustrated, the fourth gear 1352 is connected to the idler shaft 1342 by the first clutch 1310. At least one support member (not depicted) may be disposed adjacent the fourth gear 1352 and the first clutch 1310 to maintain a position thereof. For example, the at least one support member may be a plate disposed on at least one side of the fourth gear 1352 and the first clutch 1310 to maintain a position thereof. Further, the support member may be rotatably coupled to the idler shaft 1342 by at least one bearing (not depicted). It is understood that the at least one bearing can be any type of bearing as desired such as a needle bearing, a roller bearing, a ball bearing, a tapered bearing, and the like, for example. The first clutch 1310 is concentrically disposed about the idler shaft 1342. An actuator mechanism (not depicted) can actuate the first clutch 1310. The actuator mechanism can include an actuator, an additional gear set and a roller and ramp assembly. The actuator may be a reversible electric motor as it is compact and easily controllable. It is understood that any other appropriate type of actuator and actuator mechanism may be used such as hydraulic, mechanical, or pneumatic actuators, for example.

In the embodiment shown, the first clutch 1310 includes a set of clutch plates 1316 extending radially inward from a first clutch hub 1318. The clutch plates 1316 are mounted for axial movement with the first clutch hub 1318. The first clutch 1310 further includes a second clutch hub 1320. The second clutch hub 1320 has a set of clutch plates 1322 extending radially outward from the second clutch hub 1320. The clutch plates 1322 interleave with the clutch plates 1316. It should be appreciated that the first clutch 1310 may include any number of clutch plates 1316, 1322 as desired. The first clutch hub 1318 is operably connected to the fourth gear 1352 and the second clutch hub 1320 is connected to the idler shaft 1342. Accordingly, the electric motor 1304 drives the fourth gear 1352 when the first clutch 1310 is engaged. It should be appreciated that any type of the first clutch 1310 can be employed as desired such as a wet clutch assembly, a simple dog clutch assembly, a dog clutch assembly with a synchronizer, and the like, for example.

In certain embodiments, the second gear 1336 is connected to the output shaft 1306 via the second clutch 1314. At least one support member (not depicted) may be disposed adjacent the second gear 1336 and the second clutch 1314 to maintain a position thereof. For example, the at least one support member may be a plate disposed on at least one side of the second gear 1336 and the second clutch 1314 to maintain a position thereof. Further, the support member may be rotatably coupled to the output shaft 1306 by at least one bearing (not depicted). It is understood that the at least one bearing can be any type of bearing as desired such as a needle bearing, a roller bearing, a ball bearing, a tapered bearing, and the like, for example. The second clutch 1314 is concentrically disposed about the output shaft 1306. An actuator mechanism (not depicted) can actuate the second clutch 1314. The actuator mechanism can include an actuator, an additional gear set and a roller and ramp assembly. The actuator may be a reversible electric motor as it is compact and easily controllable. It is understood that any other appropriate type of actuator and actuator mechanism may be used such as hydraulic, mechanical, or pneumatic actuators, for example. It should be appreciated that the actuator mechanism for actuating the first clutch 1310 may be the same actuator mechanism for actuating the second clutch 1314, if desired.

As shown, the second clutch 1314 includes a set of clutch plates 1328 extending radially inward from a first clutch hub 1330. The clutch plates 1328 are mounted for axial movement with the first clutch hub 1330. The second clutch 1314 further includes a second clutch hub 1332 having a set of clutch plates 1334 extending radially outward from the second clutch hub 1332. The clutch plates 1334 interleave with the clutch plates 1328. It should also be appreciated that the second clutch 1314 may include any number of clutch plates 1328, 1334 as desired. The first clutch hub 1330 is operably connected to the second gear 1336 and the second clutch hub 1332 is connected to the output shaft 1306.

Accordingly, the electric motor 1304 drives the second gear 1336 when the second clutch 1314 is engaged. It should be appreciated that any type of the second clutch 1314 can be employed as desired such as a wet clutch assembly, a simple dog clutch assembly, a dog clutch assembly with a synchronizer, and the like, for example.

In certain embodiments, the first compound idler assembly 1340 drives a second compound idler assembly 1360 via the third gear 1350. As illustrated in FIG. 15, the second compound idler assembly 1360 is disposed parallel with both the output shaft 1306 of the electric motor 1304 and the idler shaft 1342 of the first compound assembly 1340. The second compound idler assembly 1360 comprises an idler shaft 1362 rotatably supported in the axle housing via first and second bearings 1364, 1366. It is understood that each of the bearings 1364, 1366 can be any type of bearing as desired such as a roller bearing, a ball bearing, a tapered bearing, and the like, for example.

A fifth gear 1370 and a sixth gear 1372 are coupled for rotation with the idler shaft 1362. The fifth gear 1370 is disposed axially adjacent to the first bearing 1364. The fifth gear 1370 is in meshed engagement with the third gear 1350 and receives torque therefrom when one of the first and second clutches 1310, 1314 is engaged and the electric motor 1304 drives the electric drive axle 1300. The sixth gear 1372 is disposed axially adjacent to the second bearing 1366. A pair of positioning elements (not depicted) may be respectively disposed on ends of the idler shaft 1362 to maintain a position of the bearings 1364, 1366 and the fifth and sixth gears 1370, 1372. It is understood that each of the positioning elements can be any type of positioning element as desired such as a snap ring, for example but could use a shim and press fit bearings if the application allows for it.

The sixth gear 1372 receives torque from the fifth gear 1370 when one of the first and second clutches 1310,1314 is engaged and the electric motor 1304 drives the electric drive axle 1300. As illustrated, the sixth gear 1372 is in meshed engagement with a seventh gear 1374. The sixth gear 1372 drives the seventh gear 1374 when one of the first and second clutches 1310, 1314 is engaged and the electric motor 1304 drives the electric drive axle 1300. The seventh gear 1374 is coupled for rotation with a differential 1380. The differential 1380 is rotatably supported within the axle housing via a pair of bearings 1382, 1384. It is understood that each of the bearings 1382, 1384 can be any type of bearing as desired such as a roller bearing, a ball bearing, a tapered bearing, and the like, for example.

As illustrated in FIG. 15, the differential 1380 includes two or more differential pinions 1386 disposed within a differential case 1388. The differential pinions 1386 are coupled with the differential case 1388 via a pinion shaft (not depicted). In an embodiment, the pinion shaft may comprise a cross member. The differential pinions 1386 are in meshed engagement with first and second side gears 1390, 1392. The first and second side gears 1390, 1392 are coupled for rotation with the first and second half shafts 16, 18, respectively, shown in FIG. 1.

In operation, when a first gear ratio is desired, the actuator mechanism causes the first clutch 1310 to engage, while the second clutch 1314 remains disengaged. When the first clutch 1310 is engaged, the output shaft 1306 of the electric motor 1304 causes the output shaft 1306 and the first gear 1326 coupled thereto, to rotate therewith. A rotation of the first gear 1326 drives the fourth gear 1352 of the first compound idler assembly 1340, and causes the idler shaft 1342 and the third gear 1350 coupled thereto, to rotate therewith. A rotation of the third gear 1350 drives the fifth gear 1370 of the second compound idler assembly 1360, and causes the idler shaft 1362 and the sixth gear 1372 coupled thereto, to rotate therewith. A rotation of the sixth gear 1372 drives the seventh gear 1374 of the differential 1380, and causes the differential case 1388 to rotate therewith. A rotation of the differential case 1388 further causes the first and second half shafts 16, 18 to rotate therewith. The rotation of the differential 1380 transfers a desired first torque from the output shaft 1306 to the first and second axle shafts 16, 18. When the electric drive axle 1300 is in a power generation mode, the torque transfer described above is reversed.

When a second gear ratio, which is less than the first gear ratio, is desired, the actuator mechanism causes the second clutch 1314 to engage, while the first clutch 1310 remains disengaged. When the second clutch 1314 is engaged, the output shaft 1306 of the electric motor 1304 causes the second gear 1336 to rotate therewith. A rotation of the second gear 1336 drives the third gear 1350 of the first compound idler assembly 1340, and causes the idler shaft 1342 and the third gear 1350 to rotate therewith. A rotation of the third gear 1350 drives the fifth gear 1370 of the second compound idler assembly 1360, and causes the idler shaft 1362 and the sixth gear 1372 coupled thereto, to rotate therewith. A rotation of the sixth gear 1372 drives the seventh gear 1374 of the differential 1380, and causes the differential case 1388 to rotate therewith. A rotation of the differential case 1388 further causes the first and second half shafts 16, 18 to rotate therewith. The rotation of the differential 1380 transfers a desired second torque from the output shaft 1306, which is less than the first torque, to the first and second axle shafts 16, 18. When the electric drive axle 1300 is in a power generation mode, the torque transfer described above is reversed.

Figure 16:
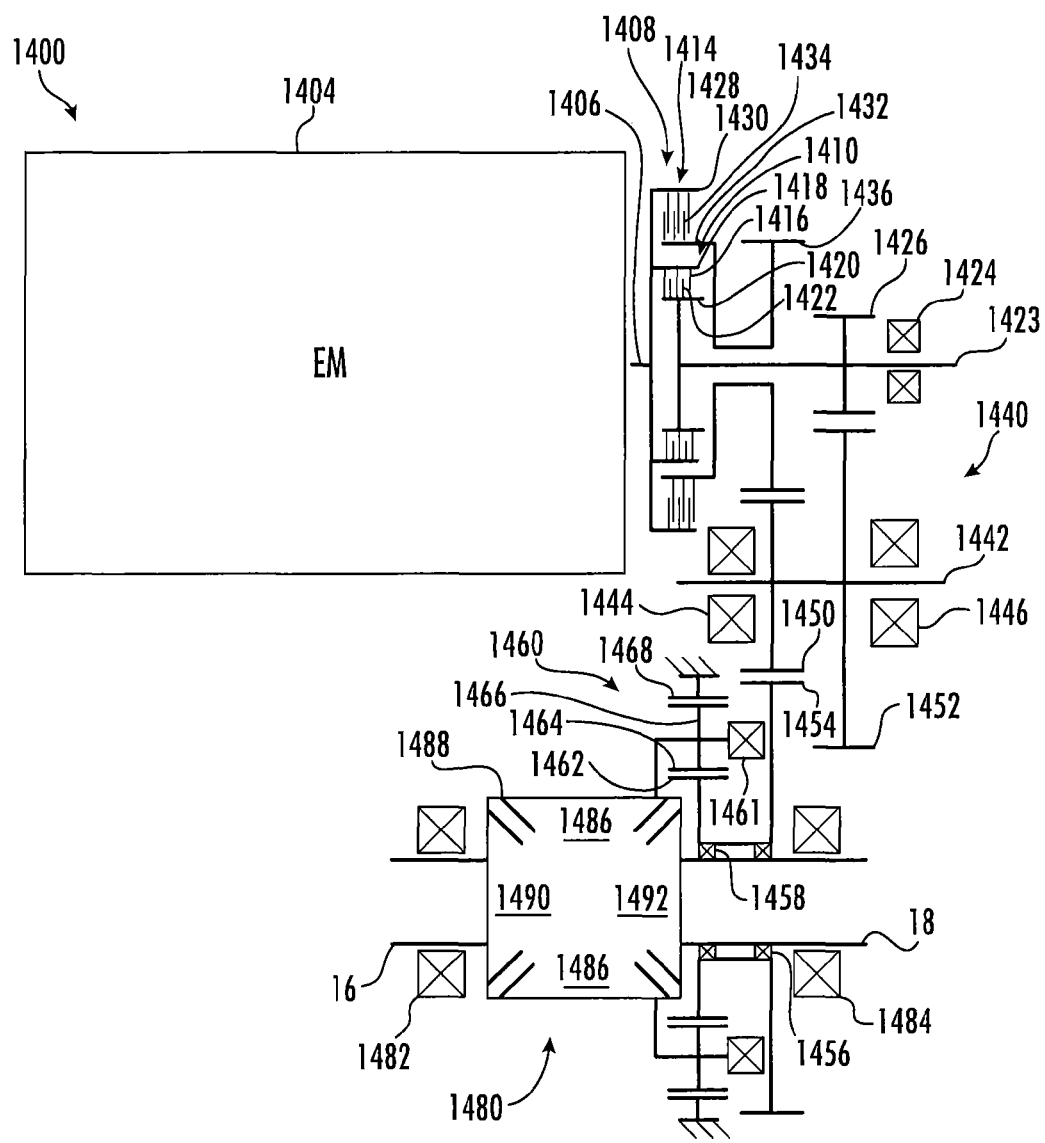
FIG. 16 is a schematic diagram of a portion of the electric drive axle shown in FIG. 1 according to another embodiment, including an electric motor, a compound idler assembly, a planetary gear set, and a differential.

In certain embodiment illustrated in FIG. 16, the vehicle 10 may include an electric drive axle 1400. The electric drive axle 1400 may comprise an integrated drive system. In an embodiment, the electric drive axle 1400 includes an electric motor 1404 (e.g., electromotor) coupled with a power source (not depicted). The electric motor 1404 may be a permanent magnet synchronous machine comprising a stator disposed concentrically about a rotor. The electric drive axle 1400 may additionally comprise an inverter (not depicted) for converting direct current to alternating current when the electric motor 1404 is utilized to drive the vehicle, and for converting alternating current to direct current when the vehicle decelerates. The electric motor 1404 may be referred to herein as a motor-generator. Further, the electric drive axle 1400 may include cooling fluid (not depicted) such as, but not limited to, automatic transmission fluid or axle oil integrated with the electric drive axle 1400 lubricant for cooling the electric motor 1404 and the inverter. In another embodiment (not depicted), the cooling fluid for the electric motor 1404 and the inverter may not be integrated with the axle oil. The electric drive may have either a co-axial or off axis layout where the axle shaft connecting the wheel to the differential does not pass through the center or the motor but rather parallel to the motor axis.

A motor output shaft 1406 is coupled with the rotor of the electric motor 1404 for rotation therewith. The output shaft 1406 is connected to a clutch assembly 1408. It should be appreciated that any type of clutch assembly 1408 can be employed as desired such as a wet clutch assembly, a simple dog clutch assembly, a dog clutch assembly with a synchronizer, and the like, for example.

In the embodiment shown, the clutch assembly 1408 includes a first or inner clutch 1410 concentrically disposed about the output shaft 1406 and a second or outer clutch 1414 concentrically disposed about the output shaft 1406 and the first clutch 1410. The clutches 1410, 1414 are positioned radially adjacent to each other such that a single actuator mechanism (not depicted) can separately actuate each of the clutches 1410, 1414. Accordingly, only one of the clutches 1410,1414 is engaged at any one time. The actuator mechanism can include an actuator, an additional gear set and a roller and ramp assembly. The actuator may be a reversible electric motor as it is compact and easily controllable. It is understood that any other appropriate type of actuator and actuator mechanism may be used such as hydraulic, mechanical, or pneumatic actuators, for example.

In the embodiment shown, the first clutch 1410 includes a set of clutch plates 1416 extending radially inward from a first clutch hub 1418. The clutch plates 1416 are mounted for axial movement with the first clutch hub 1418. The first clutch 1410 further includes a second clutch hub 1420. The second clutch hub 1420 has a set of clutch plates 1422 extending radially outward from the second clutch hub 1420. The clutch plates 1422 interleave with the clutch plates 1416. It should be appreciated that the first clutch 1410 may include any number of clutch plates 1416, 1422 as desired. The second clutch hub 1420 is connected to a common shaft 1423. The common shaft 1423 is disposed co-axially with the output shaft 1406 and is rotatably supported in an axle housing (not depicted) by at least one bearing 1424. It is understood that the at least one bearing 1424 can be any type of bearing as desired such as a roller bearing, a ball bearing, a tapered bearing, and the like, for example. A first gear 1426 is coupled for rotation with the common shaft 1423. Accordingly, the electric motor 1404 drives the first gear 1426 when the first clutch 1410 is engaged. In certain embodiments, the first gear 1426 is disposed axially adjacent to the at least one bearing 1424.

As illustrated, the second clutch 1414 includes a set of clutch plates 1428 extending radially inward from a first clutch hub 1430. The clutch plates 1428 are mounted for axial movement with the first clutch hub 1430. The second clutch 1414 further includes a second clutch hub 1432 having a set of clutch plates 1434 extending radially outward from the second clutch hub 1432. The clutch plates 1434 interleave with the clutch plates 1428. It should also be appreciated that the second clutch 1414 may include any number of clutch plates 1428, 1434 as desired. A second gear 1436 is operably connected to the second clutch 1414. In certain embodiments, the second gear 1436 is concentrically disposed about the common shaft 1423 between the first gear 1426 and the clutch assembly 1408. The second gear 1436 may rotate relative to the common shaft 1423 via at least one bearing (not depicted) disposed radially therebetween. It is understood that the at least one bearing can be any type of bearing as desired such as a needle bearing, a roller bearing, a ball bearing, a tapered bearing, and the like, for example. Accordingly, the electric motor 1404 drives the second gear 1436 when the second clutch 1414 is engaged.

In certain embodiments, the electric motor 1404 drives a first compound idler assembly 1440 via the first gear 1426 when the first clutch 1410 is engaged, or via the second gear 1436 when the second clutch 1414 is engaged. As illustrated in FIG. 16, the first compound idler assembly 1440 is disposed parallel with the output shaft 1406 of the electric motor 1404. The first compound idler assembly 1440 comprises an idler shaft 1442 rotatably supported in the axle housing via first and second bearings 1444, 1446. It is understood that each of the bearings 1444, 1446 can be any type of bearing as desired such as a roller bearing, a ball bearing, a tapered bearing, and the like, for example.

A third gear 1450 and a fourth gear 1452 concentrically disposed about and 20 coupled for rotation with the idler shaft 1442. The third gear 1450 is disposed axially adjacent the first bearing 1444. The third gear 1450 is in meshed engagement with the second gear 1436 and receives torque therefrom when the second clutch 1414 is engaged and the electric motor 1404 drives the electric drive axle 1400. The fourth gear 1452 is disposed axially adjacent the second bearing 1446. The fourth gear 1452 is in meshed engagement with the first gear 1426 and receives torque therefrom when the first clutch 1410 is engaged and the electric motor 1404 drives the electric drive axle 1400. A pair of positioning elements (not depicted) may be respectively disposed on ends of the idler shaft 1442 to maintain a position of the bearings 1444, 1446 and the third and fourth gears 1450, 1452. It is understood that each of the positioning elements can be any type of positioning element as desired such as a snap ring, for example but could use a shim and press fit bearings if the application allows for it. As illustrated, the third gear 1450 is in meshed engagement with a fifth gear 1454. The fifth gear 1454 is concentrically disposed about one of the first and second half shafts 16, 18, respectively. As shown, the fifth gear 1454 is disposed about the second half shaft 18. However, it is understood that the fifth gear 1454 may be disposed about the first half shaft 16 if desired. In certain embodiments, the fifth gear 1454 may rotate relative to the one of the first and second half shafts 16, 18 via at least one bearing 1456 disposed radially therebetween. It is understood that the at least one bearing 1456 can be any type of bearing as desired such as a needle bearing, a roller bearing, a ball bearing, a tapered bearing, and the like, for example. The third gear 1450 drives the fifth gear 1454 when one of the first and second clutches 1410, 1414 is engaged and the electric motor 1404 drives the electric drive axle 1400.

A planetary gear set 1460 is also concentrically disposed about one of the first and second half shafts 16,18. As shown, the planetary gear set 1460 is disposed about the second half shaft 18. However, it is understood that the planetary gear set 1460 may be disposed about the first half shaft 16 if desired. In certain embodiments, the planetary gear set 1460 may rotate relative to the one of the first and second half shafts 16, 18 via at least one bearing 1458 disposed radially therebetween. It is understood that the at least one bearing 1458 can be any type of bearing as desired such as a needle bearing, a roller bearing, a ball bearing, a tapered bearing, and the like, for example.

The planetary gear set 1460 includes a sun gear 1462, a plurality of planet gears 1464 mounted on a carrier 1466, and an annulus 1468. The planetary gear set 1460 is configured to produce a certain gear ratio between the fifth gear 1454 and a differential 1480. In certain embodiments, the planetary gear set 1460 is configured to produce a reduction in the gear ratio between the fifth gear 1454 and the differential 1480. It is understood, however, that the reduction in the gear ratio between the fifth gear 1454 and the differential 1480 depends upon which one of the sun gear 1462, the planet gears 1464, and the annulus 1468 is operatively connected to the fifth gear 1454, which one of the sun gear 1462, the planet gears 1464, and the annulus 1468 is stationary, and which one of the sun gear 1462, the planet gears 1464, and the annulus 1468 is operatively connected to the differential 1480.

It should be appreciated that the fifth gear 1454 and the planetary gear set 1460 may be operably connected and rotatably coupled to the differential 1480 and the one of the first and second half shafts 16, 18 by various other methods as desired. It is also understood that the planetary gear set 1460 can include any number and size of planet gears 1464 as desired. One of ordinary skill in the art should further understand that the planet gears 1464 may be mounted at various positions on the carrier 1466. As illustrated, each of the planet gears 1464 is in meshed engagement with the sun gear 1462 and the annulus 1468. Various methods of meshed engagement between each of the planet gears 1464, the sun gear 1462, and the annulus 1468 can be employed as desired.

In the embodiment shown in FIG. 16, the sun gear 1462 is operatively connected to the fifth gear 1454, the planet gears 1464 are operatively connected to a differential case 1488 of the differential 1480 via the carrier 1466, and the annulus 1468 stationary and fixedly mounted on a housing (not shown). For example, the annulus 1468 may be fixedly mounted on the axle housing, if desired. It should be appreciated that the sun gear 1462 may be operatively connected to the fifth gear 1454 by any suitable method as desired. The planetary gear set 1460 and the differential 1480 are rotatably supported within the axle housing via a pair of bearings 1482, 1484, and at least one bearing 1461, which is disposed the fifth gear 1454. It is understood that each of the bearings 1482, 1484, 1461 can be any type of bearing as desired such as a roller bearing, a ball bearing, a tapered bearing, and the like, for example.

The differential 1480 includes two or more differential pinions 1486 disposed within the differential case 1488. The differential pinions 1486 are coupled with the differential case 1488 via a pinion shaft (not depicted). In an embodiment, the pinion shaft may comprise a cross member (not depicted). The differential pinions 1486 are in meshed engagement with first and second side gears 1490, 1492. The first and second side gears 1490, 1492 are coupled for rotation with the first and second half shafts 16, 18, respectively, shown in FIG. 1.

In operation, when a first gear ratio is desired, the actuator mechanism causes the first clutch 1410 to engage, while the second clutch 1414 remains disengaged. When the first clutch 1410 is engaged, the output shaft 1406 of the electric motor 1404 causes the common shaft 1423 and the first gear 1426 coupled thereto, to rotate therewith. A rotation of the first gear 1426 drives the fourth gear 1452, and causes the idler shaft 1442 and the third gear 1450 coupled thereto, to rotate therewith. A rotation of the third gear 1450 drives the fifth gear 1454, and causes the sun gear 1462 of the planetary gear set 1460 to rotate therewith. A rotation of the sun gear 1462 drives the planet gears 1464 of the planetary gear set 1460, and causes the carrier 1466 coupled thereto, to rotate therewith. A rotation of the carrier 1466 of the planetary gear set 1460 simultaneously causes the differential case 1488 to rotate therewith. A rotation of the differential case 1488 further causes the first and second half shafts 16, 18 to rotate therewith. The rotation of the differential 1480 transfers a desired first torque from the output shaft 1406 to the first and second axle shafts 16, 18. When the electric drive axle 1400 is in a power generation mode, the torque transfer described above is reversed.

When a second gear ratio, which is less than the first gear ratio, is desired, the actuator mechanism causes the second clutch 1414 to engage, while the first clutch 1410 remains disengaged. When the second clutch 1414 is engaged, the output shaft 1406 of the electric motor 1404 causes the second gear 1436 to rotate therewith. A rotation of the second gear 1436 drives the third gear 1450, and causes the idler shaft 1442 and the third gear 1450 to rotate therewith. A rotation of the third gear 1450 drives the fifth gear 1454, and causes the sun gear 1462 of the planetary gear set 1460 to rotate therewith. A rotation of the sun gear 1462 drives the planet gears 1464 of the planetary gear set 1460, and causes the carrier 1466 coupled thereto, to rotate therewith. A rotation of the carrier 1466 of the planetary gear set 1460 simultaneously causes the differential case 1488 to rotate therewith. A rotation of the differential case 1488 further causes the first and second half shafts 16, 18 to rotate therewith. The rotation of the differential 1480 transfers a desired second torque from the output shaft 1406, which is less than the first torque, to the first and second axle shafts 16, 18. When the electric drive axle 1400 is in a power generation mode, the torque transfer described above is reversed.

Figure 17:
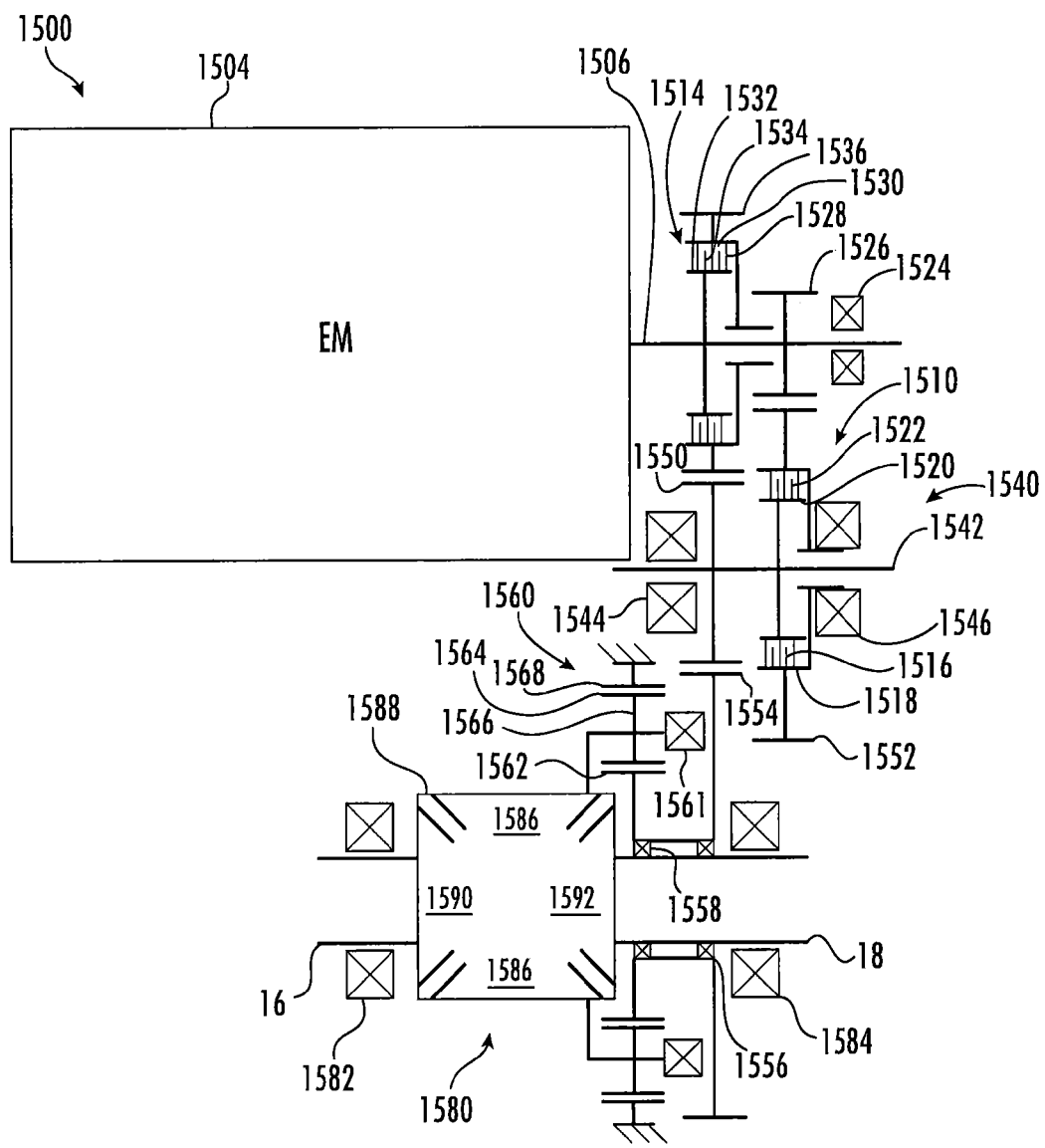
FIG. 17 is a schematic diagram of a portion of the electric drive axle shown in FIG. 1 according to another embodiment, including an electric motor, a compound idler assembly, a planetary gear set, and a differential.

Referring now to the embodiment shown in FIG. 17, the vehicle 10 may include an electric drive axle 1500. The electric drive axle 1500 may comprise an integrated drive system. In an embodiment, the electric drive axle 1500 includes an electric motor 1504 (e.g., electromotor) coupled with a power source (not depicted). The electric motor 1504 may be a permanent magnet synchronous machine comprising a stator disposed concentrically about a rotor. The electric drive axle 1500 may additionally comprise an inverter (not depicted) for converting direct, current to alternating current when the electric motor 1504 is utilized to drive the vehicle, and for converting alternating current to direct current when the vehicle decelerates. The electric motor 1504 may be referred to herein as a motor-generator. Further, the electric drive axle 1500 may include cooling fluid (not depicted) such as, but not limited to, automatic transmission fluid or axle oil integrated with the electric drive axle 1500 lubricant for cooling the electric motor 1504 and the inverter. In another embodiment (not depicted), the cooling fluid for the electric motor 1504 and the inverter may not be integrated with the axle oil. The electric drive may have either a co-axial or off axis layout where the axle shaft connecting the wheel to the differential does not pass through the center or the motor but rather parallel to the motor axis.

A motor output shaft 1506 is coupled with the rotor of the electric motor 1504 for rotation therewith. The output shaft 1506 is rotatably supported within an axle housing (not depicted) by at least one bearing 1524. It is understood that the at least one bearing 1524 can be any type of bearing as desired such as a roller bearing, a ball bearing, a tapered bearing, and the like, for example. The output shaft 1506 includes a first gear 1526 rotatably coupled thereto. In certain embodiments, the first gear 1526 is concentrically disposed about the output shaft 1506 axially adjacent the at least one bearing 1524. A second gear 1536 is coupled to the output shaft 1506. In certain embodiments, the second gear 1536 is concentrically disposed about the output shaft 1506 axially adjacent the first gear 1526. The second gear 1536 may rotate relative to the output shaft 1506 via at least one bearing (not depicted) disposed radially therebetween.

In certain embodiments, the electric motor 1504 drives a first compound idler assembly 1540 via the first gear 1526 when a first clutch 1510 (described in further detail hereinafter) is engaged, or via the second gear 1536 when a second clutch 1514 (described in further detail hereinafter) is engaged. As illustrated in FIG. 17, the first compound idler assembly 1540 is disposed parallel with the output shaft 1506 of the electric motor 1504. The first compound idler assembly 1540 comprises an idler shaft 1542 rotatably supported in the axle housing via first and second bearings 1544, 1546. It is understood that each of the bearings 1544, 1546 can be any type of bearing as desired such as a roller bearing, a ball bearing, a tapered bearing, and the like, for example.

A third gear 1550 and a fourth gear 1552 are coupled to the idler shaft 1542. The third gear 1550 is concentrically disposed about the idler shaft 1542 axially adjacent the first bearing 1544. The third gear 1550 is in meshed engagement with the second gear 1536 and receives torque therefrom when the second clutch 1514 is engaged and the electric motor 1504 drives the electric drive axle 1500. The fourth gear 1552 is concentrically disposed about the idler shaft 1542 axially adjacent to the second bearing 1546. The fourth gear 1552 may rotate relative to the idler shaft 1542 via at least one bearing (not depicted) disposed radially therebetween. It is understood that the at least one bearing can be any type of bearing as desired such as a needle bearing, a roller bearing, a ball bearing, a tapered bearing, and the like, for example. The fourth gear 1552 is in meshed engagement with the first gear 1526 and receives torque therefrom when the first clutch 1510 is engaged and the electric motor 1504 drives the electric drive axle 1500. A pair of positioning elements (not depicted) may be respectively disposed on ends of the idler shaft 1542 to maintain a position of the bearings 1544, 1546 and the third and fourth gears 1550, 1552. It is understood that each of the positioning elements can be any type of positioning element as desired such as a snap ring, for example but could use a shim and press fit bearings if the application allows for it.

As illustrated, the fourth gear 1552 is connected to the idler shaft 1542 by the first clutch 1510. At least one support member (not depicted) may be disposed adjacent the fourth gear 1552 and the first clutch 1510 to maintain a position thereof. For example, the at least one support member may be a plate disposed on at least one side of the fourth gear 1552 and the first clutch 1510 to maintain a position thereof. Further, the support member may be rotatably coupled to the idler shaft 1542 by at least one bearing (not depicted). It is understood that the at least one bearing can be any type of bearing as desired such as a needle bearing, a roller bearing, a ball bearing, a tapered bearing, and the like, for example. The first clutch 1510 is concentrically disposed about the idler shaft 1542. An actuator mechanism (not depicted) can actuate the first clutch 1510. The actuator mechanism can include an actuator, an additional gear set and a roller and ramp assembly. The actuator may be a reversible electric motor as it is compact and easily controllable. It is understood that any other appropriate type of actuator and actuator mechanism may be used such as hydraulic, mechanical, or pneumatic actuators, for example.

In the embodiment shown, the first clutch 1510 includes a set of clutch plates 1516 extending radially inward from a first clutch hub 1518. The clutch plates 1516 are mounted for axial movement with the first clutch hub 1518. The first clutch 1510 further includes a second clutch hub 1520. The second clutch hub 1520 has a set of clutch plates 1522 extending radially outward from the second clutch hub 1520. The clutch plates 1522 interleave with the clutch plates 1516. It should be appreciated that the first clutch 1510 may include any number of clutch plates 1516, 1522 as desired. The first clutch hub 1518 is operably connected to the fourth gear 1552 and the second clutch hub 1520 is connected to the idler shaft 1542. Accordingly, the electric motor 1504 drives the fourth gear 1552 when the first clutch 1510 is engaged. It should be appreciated that any type of the first clutch 1510 can be employed as desired such as a wet clutch assembly, a simple dog clutch assembly, a dog clutch assembly with a synchronizer, and the like, for example.

In certain embodiments, the second gear 1536 is connected to the output shaft 1506 via the second clutch 1514. At least one support member (not depicted) may be disposed adjacent the second gear 1536 and the second clutch 1514 to maintain a position thereof. For example, the at least one support member may be a plate disposed on at least one side of the second gear 1536 and the second clutch 1514 to maintain a position thereof. Further, the support member may be rotatably coupled to the output shaft 1506 by at least one bearing (not depicted). It is understood that the at least one bearing can be any type of bearing as desired such as a needle bearing, a roller bearing, a ball bearing, a tapered bearing, and the like, for example. The second clutch 1514 is concentrically disposed about the output shaft 1506. An actuator mechanism (not depicted) can actuate the second clutch 1514. The actuator mechanism can include an actuator, an additional gear set and a roller and ramp assembly. The actuator may be a reversible electric motor as it is compact and easily controllable. It is understood that any other appropriate type of actuator and actuator mechanism may be used such as hydraulic, mechanical, or pneumatic actuators, for example. It should be appreciated that the actuator mechanism for actuating the first clutch 1510 may be the same actuator mechanism for actuating the second clutch 1514, if desired.

As shown, the second clutch 1514 includes a set of clutch plates 1528 extending radially inward from a first clutch hub 1530. The clutch plates 1528 are mounted for axial movement with the first clutch hub 1530. The second clutch 1514 further includes a second clutch hub 1532 having a set of clutch plates 1534 extending radially outward from the second clutch hub 1532. The clutch plates 1534 interleave with the clutch plates 1528. It should also be appreciated that the second clutch 1514 may include any number of clutch plates 1528, 1534 as desired. The first clutch hub 1530 is operably connected to the second gear 1536 and the second clutch hub 1532 is connected to the output shaft 1506. Accordingly, the electric motor 1504 drives the second gear 1536 when the second clutch 1514 is engaged. It should be appreciated that any type of the second clutch 1514 can be employed as desired such as a wet clutch assembly, a simple dog clutch assembly, a dog clutch assembly with a synchronizer, and the like, for example.

As illustrated, the third gear 1550 is in meshed engagement with a fifth gear 1554. The fifth gear 1554 is concentrically disposed about one of the first and second half shafts 16, 18, respectively. As shown, the fifth gear 1554 is disposed about the second half shaft 18. However, it is understood that the fifth gear 1554 may be disposed about the first half shaft 16 if desired. In certain embodiments, the fifth gear 1554 may rotate relative to one of the first and second half shafts 16, 18 via at least one bearing 1556 disposed radially therebetween. It is understood that the at least one bearing 1556 can be any type of bearing as desired such as a needle bearing, a roller bearing, a ball bearing, a tapered bearing, and the like, for example. The third gear 1550 drives the fifth gear 1554 when one of the first and second clutches 1510, 1514 is engaged and the electric motor 1504 drives the electric drive axle 1500.

A planetary gear set 1560 is also concentrically disposed about one of the first and second half shafts 16, 18. As shown, the planetary gear set 1560 is disposed about the second half shaft 18. However, it is understood that the planetary gear set 1560 may be disposed about the first half shaft 16 if desired. In certain embodiments, the planetary gear set 1560 may rotate relative to one of the first and second half shafts 16, 18 via at least one bearing 1558 disposed radially therebetween. It is understood that the at least one bearing 1558 can be any type of bearing as desired such as a needle bearing, a roller bearing, a ball bearing, a tapered bearing, and the like, for example.

The planetary gear set 1560 includes a sun gear 1562, a plurality of planet gears 1564 mounted on a carrier 1566, and an annulus 1568. The planetary gear set 1560 is configured to produce a certain gear ratio between the fifth gear 1554 and a differential 1580. In certain embodiments, the planetary gear set 1560 is configured to produce a reduction in the gear ratio between the fifth gear 1554 and the differential 1580. It is understood, however, that the reduction in the gear ratio between the fifth gear 1554 and the differential 1580 depends upon which one of the sun gear 1562, the planet gears 1564, and the annulus 1568 is operatively connected to the fifth gear 1554, which one of the sun gear 1562, the planet gears 1564, and the annulus 1568 is stationary, and which one of the sun gear 1562, the planet gears 1564, and the annulus 1568 is operatively connected to the differential 1580.

It should be appreciated that the fifth gear 1554 and the planetary gear set 1560 may be operably connected and rotatably coupled to the differential 1580 and the one of the first and second half shafts 16, 18 by various other methods as desired. It is also understood that the planetary gear set 1560 can include any number and size of planet gears 1564 as desired. One of ordinary skill in the art should further understand that the planet gears 1564 may be mounted at various positions on the carrier 1566. As illustrated, each of the planet gears 1564 is in meshed engagement with the sun gear 1562 and the annulus 1568. Various methods of meshed engagement between each of the planet gears 1564, the sun gear 1562, and the annulus 1568 can be employed as desired.

In the embodiment shown in FIG. 17, the sun gear 1562 is operatively connected to the fifth gear 1554, the planet gears 1564 are operatively connected to a differential case 1588 of the differential 1580 via the carrier 1566, and the annulus 1568 stationary and fixedly mounted on a housing (not shown). For example, the annulus 1568 may be fixedly mounted on the axle housing, if desired. It should be appreciated that the sun gear 1562 may be operatively connected to the fifth gear 1554 by any suitable method as desired. The planetary gear set 1560 and the differential 1580 are rotatably supported within the axle housing via a pair of bearings 1582, 1584, and at least one bearing 1561 which is disposed in the fifth gear 1554. It is understood that each of the bearings 1582, 1584, 1561 can be any type of bearing as desired such as a roller bearing, a ball bearing, a tapered bearing, and the like, for example.

The differential 1580 includes two or more differential pinions 1586 disposed within the differential case 1588. The differential pinions 1586 are coupled with the differential case 1588 via a pinion shaft (not depicted). In an embodiment, the pinion shaft may comprise a cross member (not depicted). The differential pinions 1586 are in meshed engagement with first and second side gears 1590, 1592. The first and second side gears 1590, 1592 are coupled for rotation with the first and second half shafts 16, 18, respectively, shown in FIG. 1.

In operation, when a first gear ratio is desired, the actuator mechanism causes the first clutch 1510 to engage, while the second clutch 1514 remains disengaged. When the first clutch 1510 is engaged, the output shaft 1506 of the electric motor 1504 causes the output shaft 1506 and the first gear 1526 coupled thereto, to rotate therewith. A rotation of the first gear 1526 drives the fourth gear 1552 of the first compound idler assembly 1540, and causes the idler shaft 1542 and the third gear 1550 coupled thereto, to rotate therewith. A rotation of the third gear 1550 drives the fifth gear 1570, and causes the sun gear 1562 of the planetary gear set 1560 to rotate therewith. A rotation of the sun gear 1562 drives the planet gears 1564 of the planetary gear set 1560, and causes the carrier 466 coupled thereto, to rotate therewith. A rotation of the carrier 1566 of the planetary gear set 1560 simultaneously causes the differential case 1588 to rotate therewith. A rotation of the differential case 1588 further causes the first and second half shafts 16, 18 to rotate therewith. The rotation of the differential 1580 transfers a desired first torque from the output shaft 1506 to the first and second axle shafts 16, 18. When the electric drive axle 1500 is in a power generation mode, the torque transfer described above is reversed.

When a second gear ratio, which is less than the first gear ratio, is desired, the actuator mechanism causes the second clutch 1514 to engage, while the first clutch 1510 remains disengaged. When the second clutch 1514 is engaged, the output shaft 1506 of the electric motor 1504 causes the second gear 1536 to rotate therewith. A rotation of the second gear 1536 drives the third gear 1550 of the first compound idler assembly 1540, and causes the idler shaft 1542 and the third gear 1550 to rotate therewith. A rotation of the third gear 1550 drives the fifth gear 1570, and causes one of the first and second half shafts 16, 18 to rotate therewith. A rotation of the one of the first and second half shafts 16, 18 causes the planetary gear set 1560 to rotate therewith. A rotation of the planetary gear set 1560 simultaneously causes the differential case 1588 to rotate therewith. A rotation of the differential case 1588 further causes the remaining one of first and second half shafts 16, 18 to rotate therewith. The rotation of the differential 1580 transfers a desired second torque from the output shaft 1506, which is less than the first torque, to the first and second axle shafts 16, 18. When the electric drive axle 1500 is in a power generation mode, the torque transfer described above is reversed.

Figure 18:
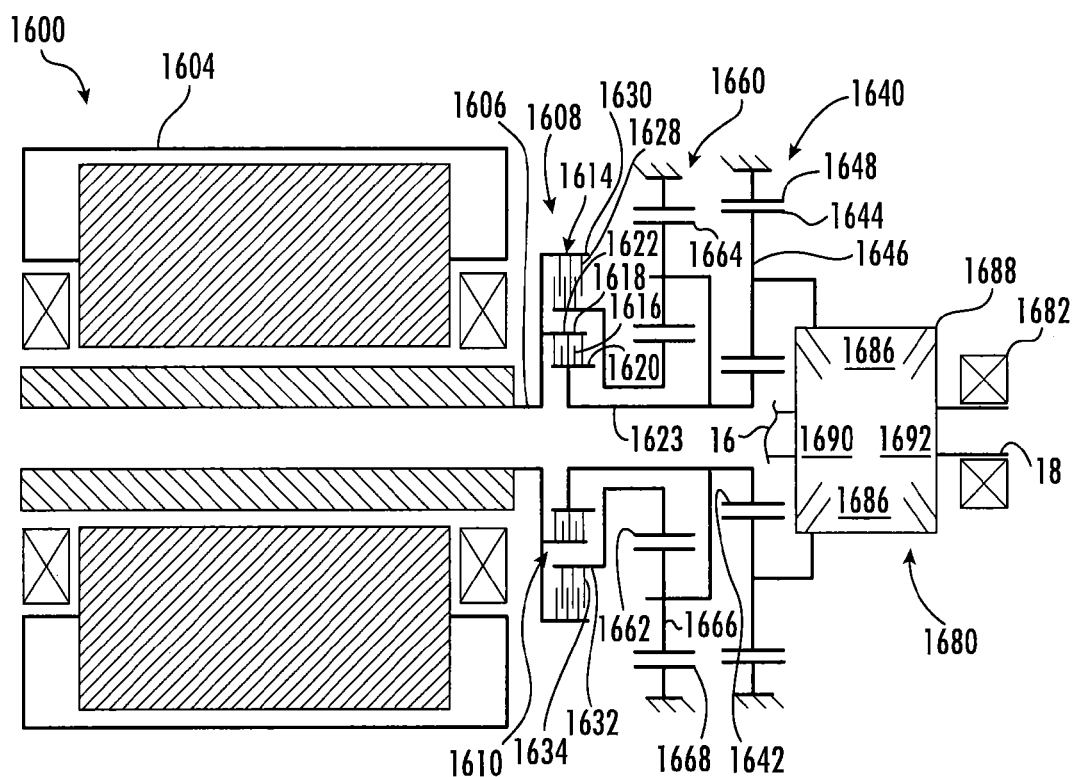
FIG. 18 is a schematic diagram of a portion of the electric drive axle shown in FIG. 1 according to another embodiment, including a first planetary gear set, a second planetary gear set, and a differential.

Referring now to the embodiment shown in FIG. 18, the vehicle 10 may include an electric drive axle 1600. The electric drive axle 1600 may comprise an integrated drive system. In an embodiment, the electric drive axle 1600 includes an electric motor 1604 (e.g., electromotor) coupled with a power source (not depicted). The electric motor 1604 may be a permanent magnet synchronous machine comprising a stator disposed concentrically about a rotor. The electric drive axle 1600 may additionally comprise an inverter (not depicted) for converting direct current to alternating current when the electric motor 1604 is utilized to drive the vehicle, and for converting alternating current to direct current when the vehicle decelerates. The electric motor 1604 may be referred to herein as a motor-generator. Further, the electric drive axle 1600 may include cooling fluid (not depicted) such as, but not limited to, automatic transmission fluid or axle oil integrated with the electric drive axle 1600 lubricant for cooling the electric motor 1604 and the inverter. In another embodiment (not depicted), the cooling fluid for the electric motor 1604 and the inverter may not be integrated with the axle oil. The electric drive may have either a co-axial (as shown) or off axis layout where the axle shaft connecting the wheel to the differential does not pass through the center or the motor but rather parallel to the motor axis.

A motor output shaft 1606 is coupled with the rotor of the electric motor 1604 for rotation therewith. The output shaft 1606 is connected to a clutch assembly 1608. It should be appreciated that any type of clutch assembly 1608 can be employed as desired such as a wet clutch assembly, a simple dog clutch assembly, a dog clutch assembly with a synchronizer, and the like, for example.

In the embodiment shown, the clutch assembly 1608 includes a first or inner clutch 1610 concentrically disposed about the output shaft 1606 and a second or outer clutch 1614 concentrically disposed about the output shaft 1606 and the first clutch 1610. The clutches 1610,1614 are positioned radially adjacent to each other such that a single actuator mechanism (not depicted) can separate actuate each of the clutches 1610, 1614. Accordingly, only one of the clutches 1610, 1614 is engaged at any one time. The actuator mechanism can include an actuator, an additional gear set and a roller and ramp assembly. The actuator may be a reversible electric motor as it is compact and easily controllable. It is understood that any other appropriate type of actuator and actuator mechanism may be used such as hydraulic, mechanical, or pneumatic actuators, for example.

In the embodiment shown, the first clutch 1610 includes a set of clutch plates 1616 extending radially inward from a first clutch hub 1618. The clutch plates 1616 are mounted for axial movement with the first clutch hub 1618. The first clutch 1610 further includes a second clutch hub 1620. The second clutch hub 1620 has a set of clutch plates 1622 extending radially outward from the second clutch hub 1620. The clutch plates 1622 interleave with the clutch plates 1616. It should be appreciated that the first clutch 1610 may include any number of clutch plates 1616,1622 as desired. The second clutch hub 1620 is connected to a common shaft 1623. The common shaft 1623 is disposed co-axially with the output shaft 1606 and may be rotatably supported in an axle housing (not depicted) by at least one bearing (not depicted). It is understood that the at least one bearing can be any type of bearing as desired such as a roller bearing, a ball bearing, a tapered bearing, and the like, for example. A first planetary gear set 1640 (described in further detail hereinafter) is operably connected to the first clutch 1610. Accordingly, the electric motor 1604 drives the first planetary gear set 1640 when the first clutch 1610 is engaged.

Similarly, the second clutch 1614 includes a set of clutch plates 1628 extending radially inward from a first clutch hub 1630. The clutch plates 1628 are mounted for axial movement with the first clutch hub 1630. The second clutch 1614 further includes a second clutch hub 1632 having a set of clutch plates 1634 extending radially outward from the second clutch hub 1632. The clutch plates 1634 interleave with the clutch plates 1628. It should also be appreciated that the second clutch 1614 may include any number of clutch plates 1628, 1634 as desired. A second planetary gear set 1660 (described in further detail hereinafter) is operably connected to the second clutch 1614. In certain embodiments, the second planetary gear set 1660 is concentrically disposed about the common shaft 1623 between the first planetary gear set 1640 and the clutch assembly 1608. A sun gear 1662 of the second planetary gear set 1660 may rotate relative to the common shaft 1623 via at least one bearing (not depicted) disposed radially therebetween. It is understood that the at least one bearing can be any type of bearing as desired such as a needle bearing, a roller bearing, a ball bearing, a tapered bearing, and the like, for example. Accordingly, the electric motor 1604 drives the second planetary gear set 1660 when the second clutch 1614 is engaged.

In the embodiment shown, the first planetary gear set 1640 includes a sun gear 1642, a plurality of planet gears 1644 mounted on a carrier 1646, and an annulus 1648. As illustrated, the sun gear 1642 is integrally formed with the common shaft 1623. It is understood, however, that the sun gear 1642 may be a separate and distinct component of the first planetary gear set 1640 and coupled to the common shaft 1623, if desired. It is understood that the first planetary gear set 1640 can include any number and size of planet gears 1644 as desired. One of ordinary skill in the art should further understand that the planet gears 1644 may be mounted at various positions on the carrier 1646. As illustrated, each of the planet gears 1644 is in meshed engagement with the sun gear 1642 and the annulus 1648. Various methods of meshed engagement between each of the planet gears 1644, the sun gear 1642, and the annulus 1648 can be employed as desired.

The first planetary gear set 1640 is configured to produce a certain gear ratio between the output shaft 1606 and a differential 1680. In certain embodiments, the first planetary gear set 1640 is configured to produce a reduction in the gear ratio between the output shaft 1606 and the differential 1680. It is understood, however, that the reduction in the gear ratio between the output shaft 1606 and the differential 1680 depends upon which one of the sun gear 1642, ~he planet gears 1644, and the annulus 1648 is operatively connected to the output shaft 1606, which one of the sun gear 1642, the planet gears 1644, and the annulus 1648 is stationary, and which one of the sun gear 1642, the planet gears 1644, and the annulus 1648 is operatively connected to the differential 1680. In the embodiment shown in FIG. 18, the sun gear 1642 is operatively connected to the output shaft 1606 via the common shaft 1623 when the first clutch 1610 is engaged, the planet gears 1644 are operatively connected to a differential case 1688 of the differential 1680 via the carrier 1646, and the annulus 1648 is stationary and fixedly mounted on a housing (not shown). For example, the annulus 1648 may be fixedly mounted on the axle housing, if desired.

In certain embodiments, the second planetary gear set 1660 includes the sun gear 1662, a plurality of planet gears 1664 mounted on a carrier 1666, and an annulus 1668. The second planetary gear set 1660 is configured to produce a certain gear ratio between the output shaft 1606 and the differential 1680. As illustrated, the sun gear 1662 is connected to the second clutch 1614. It is understood that the second planetary gear set 1660 can include any number and size of planet gears 1664 as desired. One of ordinary skill in the art should further understand that the planet gears 1664 may be mounted at various positions on the carrier 1666. As illustrated, each of the planet gears 1664 is in meshed engagement with the sun gear 1662 and the annulus 1668. Various methods of meshed engagement between each of the planet gears 1664, the sun gear 1662, and the annulus 1668 can be employed as desired.

In certain embodiments, the second planetary gear set 1660 is configured to produce a further reduction in the gear ratio between the output shaft 1606, the first planetary gear set 1640, and the differential 1680. It is understood, however, that the reduction in the gear ratio between the output shaft 1606, the first planetary gear set 1640, and the differential 1680 depends upon which one of the sun gear 1662, the planet gears 1664, and the annulus 1668 is operatively connected to the output shaft 1606, which one of the sun gear 1662, the planet gears 1664, and the annulus 1668 is stationary, and which one of the sun gear 1662, the planet gears 1664, and the annulus 1668 is operatively connected to the first planetary gear set 1640, and thereby the differential 1680. In the embodiment shown in FIG. 18, the sun gear 1662 is operatively connected to the output shaft 1606 via the second clutch 1614 when the second clutch 1614 is engaged, the planet gears 1664 are operatively connected to the first planetary gear set 1640 via the common shaft 1623, and thereby the differential case 1688 of the differential 1680 via the carrier 1666, and the annulus 1668 is stationary and fixedly mounted on a housing (not shown). For example, the annulus 1668 may be fixedly mounted on the axle housing, if desired.

In certain embodiments, the differential 1680 is rotatably supported within the axle housing via at least one bearing 1682. It is understood that the at least one bearing 1682 can be any type of bearing as desired such as a roller bearing, a ball bearing, a tapered bearing, and the like, for example. As illustrated, the differential 1680 includes two or more differential pinions 1686 disposed within the differential case 1688. The differential pinions 1686 are coupled with the differential case 1688 via a pinion shaft (not depicted). In an embodiment, the pinion shaft may comprise a cross member (not depicted). The differential pinions 1686 are in meshed engagement with first and second side gears 1690, 1692. The first and second side gears 1690, 1692 are coupled for rotation with the first and second half shafts 16, 18, respectively, shown in FIG. 1.

In operation, when a first gear ratio is desired, the actuator mechanism causes the first clutch 1610 to engage, while the second clutch 1614 remains disengaged. When the first clutch 1610 is engaged, the output shaft 1606 of the electric motor 1604 causes the common shaft 1623, the sun gear 1642 of the first planetary gear set 1640, and the carrier 1666 of the second planetary gear set 1660 coupled thereto, to rotate therewith. A rotation of the carrier 1666 of the second planetary gear set 1660 drives the sun gear 1662 thereof. However, no torque is transferred from the first planetary gear set 1640 to the second planetary gear set 1660 since the second clutch 1614 is disengaged. A rotation of the sun gear 1642 drives the planet gears 1644 of the first planetary gear set 1640, and causes the carrier 1646 coupled thereto, to rotate therewith. A rotation of the carrier 1646 of the first planetary gear set 1640 simultaneously causes the differential case 1688 to rotate therewith. A rotation of the differential case 1688 further causes the first and second half shafts 16, 18 to rotate therewith. The rotation of the differential 1680 transfers a desired first torque from the output shaft 1606 to the first and second axle shafts 16, 18. When the electric drive axle 1600 is in a power generation mode, the torque transfer described above is reversed.

When a second gear ratio, which is greater than the first gear ratio, is desired, the actuator mechanism causes the second clutch 1614 to engage, while the first clutch 1610 remains disengaged. When the second clutch 1614 is engaged, the output shaft 1606 of the electric motor 1604 causes the sun gear 1662 of the second planetary gear set 1660 to rotate therewith. A rotation of the sun gear 1662 drives the planet gears 1664 of the second planetary gear set 1660, and causes the carrier 1666 coupled thereto, to rotate therewith. A rotation of the carrier 1666 of the second planetary gear set 1660 drives the common shaft 1623, and causes the sun gear 1642 of the first planetary gear set 1640 fixedly coupled to the carrier 1666, to rotate therewith. A rotation of the sun gear 1642 drives the planet gears 1644 of the first planetary gear set 1640, and causes the carrier 1646 coupled thereto, to rotate therewith. A rotation of the carrier 1646 of the first planetary gear set 1640 simultaneously causes the differential case 1688 to rotate therewith. A rotation of the differential case 1688 further causes the first and second half shafts 16, 18 to rotate therewith. The rotation of the differential 1680 transfers a desired second torque from the output shaft 1606, which is greater than the first torque, to the first and second axle shafts 16, 18. When the electric drive axle 1600 is in a power generation mode, the torque transfer described above is reversed.

Figure 19:
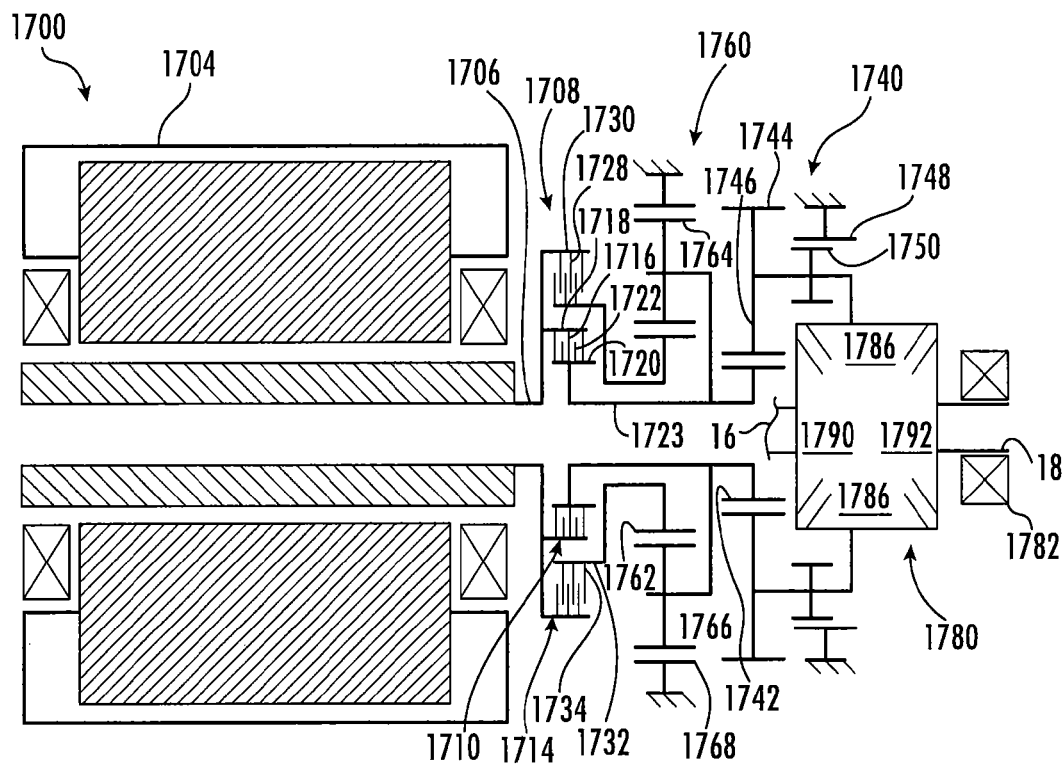
FIG. 19 is a schematic diagram of a portion of the electric drive axle shown in FIG. 1 according to another embodiment, including a first planetary gear set, a second planetary gear set, and a differential.

Referring now to the embodiment shown in FIG. 19, the vehicle 10 may include an electric drive axle 1700. The electric drive axle 1700 may comprise an integrated drive system. In an embodiment, the electric drive axle 1700 includes an electric motor 1704 (e.g., electromotor) coupled with a power source (not depicted). The electric motor 1704 may be a permanent magnet synchronous machine comprising a stator disposed concentrically about a rotor. The electric drive axle 1700 may additionally comprise an inverter (not depicted) for converting direct current to alternating current when the electric motor 1704 is utilized to drive the vehicle, and for converting alternating current to direct current when the vehicle decelerates. The electric motor 1704 may be referred to herein as a motor-generator. Further, the electric drive axle 1700 may include cooling fluid (not depicted) such as, but not limited to, automatic transmission fluid or axle oil integrated with the electric drive axle 1700 lubricant for cooling the electric motor 1704 and the inverter. In another embodiment (not depicted), the cooling fluid for the electric motor 1704 and the inverter may not be integrated with the axle oil. The electric drive may have either a co-axial (as shown) or off axis layout where the axle shaft connecting the wheel to the differential does not pass through the center or the motor but rather parallel to the motor axis.

A motor output shaft 1706 is coupled with the rotor of the electric motor 1704 for rotation therewith. The output shaft 1706 is connected to a clutch assembly 1708. It should be appreciated that any type of clutch assembly 1708 can be employed as desired such as a wet clutch assembly, a simple dog clutch assembly, a dog clutch assembly with a synchronizer, and the like, for example.

In the embodiment shown, the clutch assembly 1708 includes a first or inner clutch 1710 concentrically disposed about the output shaft 1706 and a second or outer clutch 1714 concentrically disposed about the output shaft 1706 and the first clutch 1710. The clutches 1710, 1714 are positioned radially adjacent to each other such that a single actuator mechanism (not depicted) can separate actuate each of the clutches 1710, 1714. Accordingly, only one of the clutches 1710, 1714 is engaged at any one time. The actuator mechanism can include an actuator, an additional gear set and a roller and ramp assembly. The actuator may be a reversible electric motor as it is compact and easily controllable. It is understood that any other appropriate type of actuator and actuator mechanism may be used such as hydraulic, mechanical, or pneumatic actuators, for example.

In the embodiment shown, the first clutch 1710 includes a set of clutch plates 1716 extending radially inward from a first clutch hub 1718. The clutch plates 1716 are mounted for axial movement with the first clutch hub 1718. The first clutch 1710 further includes a second clutch hub 1720. The second clutch hub 1720 has a set of clutch plates 1722 extending radially outward from the second clutch hub 1720. The clutch plates 1722 interleave with the clutch plates 1716. It should be appreciated that the first clutch 1710 may include any number of clutch plates 1716, 1722 as desired. The second clutch hub 1720 is connected to a common shaft 1723. The common shaft 1723 is disposed co-axially with the output shaft 1706 and may be rotatably supported in an axle housing (not depicted) by at least one bearing (not depicted). It is understood that the at least one bearing can be any type of bearing as desired such as a roller bearing, a ball bearing, a tapered bearing, and the like, for example. A first planetary gear set 1740 (described in further detail hereinafter) is operably connected to the first clutch 1710. Accordingly, the electric motor 1704 drives the first planetary gear set 1740 when the first clutch 1710 is engaged.

Similarly, the second clutch 1714 includes a set of clutch plates 1728 extending radially inward from a first clutch hub 1730. The clutch plates 1728 are mounted for axial movement with the first clutch hub 1730. The second clutch 1714 further includes a second clutch hub 1732 having a set of clutch plates 1734 extending radially outward from the second clutch hub 1732. The clutch plates 1734 interleave with the clutch plates 1728. It should also be appreciated that the second clutch 1714 may include any number of clutch plates 1728, 1734 as desired. A second planetary gear set 1760 (described in further detail hereinafter) is operably connected to the second clutch 1714. In certain embodiments, the second planetary gear set 1760 is concentrically disposed about the common shaft 1723 between the first planetary gear set 1740 and the clutch assembly 1708. A sun gear 1762 of the second planetary gear set 1760 may rotate relative to the common shaft 1723 via at least one bearing (not depicted) disposed radially therebetween. It is understood that the at least one bearing can be any type of bearing as desired such as a needle bearing, a roller bearing, a ball bearing, a tapered bearing, and the like, for example. Accordingly, the electric motor 1704 drives the second planetary gear set 1760 when the second clutch 1714 is engaged.

In the embodiment shown, the first planetary gear set 1740 includes a sun gear 1742, a plurality of first planet gears 1744 mounted on a carrier 1746, a plurality of second planet gears 1750 fixedly coupled to the carrier 1746, and an annulus 1748. As illustrated, the sun gear 1742 is integrally formed with the common shaft 1723. It is understood, however, that the sun gear 1742 may be a separate and distinct component of the first planetary gear set 1740 and coupled to the common shaft 1723, if desired. It is understood that the first planetary gear set 1740 can include any number and size of first and second planet gears 1744,1750, respectively, as desired. One of ordinary skill in the art should further understand that the first and second planet gears 1744, 1750 may be mounted at various positions on the carrier 1746. As illustrated, each of the first planet gears 1744 is in meshed engagement with the sun gear 1742 and each of the second planet gears 1750 is in meshed engagement with the annulus 1748. Various methods of meshed engagement between each of the first planet gears 1744 and the sun gear 1742, and between each of the second planet gears 1750 and the annulus 1748 can be employed as desired.

The first planetary gear set 1740 is configured to produce a certain gear ratio between the output shaft 1706 and a differential 1780. In certain embodiments, the first planetary gear set 1740 is configured to produce a reduction in the gear ratio between the output shaft 1706 and the differential 1780. It is understood, however, that the reduction in the gear ratio between the output shaft 1706 and the differential 1780 depends upon which one of the sun gear 1742, the first planet gears 1744, the second planet gears 1750, and the annulus 1748 is operatively connected to the output shaft 1706, which one of the sun gear 1742, the first planet gears 1744, the second planet gears 1750, and the annulus 1748 is stationary, and which one of the sun gear 1742, the first planet gears 1744, the second planet gears 1750, and the annulus 1748 is operatively connected to the differential 1780. In the embodiment shown in FIG. 19, the sun gear 1742 is operatively connected to the output shaft 1706 via the common shaft 1723 when the first clutch 1710 is engaged, the first planet gears 1744 and second planet gears 1750 are operatively connected to a differential case 1788 of the differential 1780 via the carrier 1746, and the annulus 1748 is stationary and fixedly mounted on a housing (not shown). For example, the annulus 1748 may be fixedly mounted on the axle housing, if desired. In certain embodiments, the second planet gears 1750 are operably coupled to the differential case 1788 of the differential 1788 for rotation therewith.

As illustrated in FIG. 19, the second planetary gear set 1760 includes the sun gear 1762, a plurality of planet gears 1764 mounted on a carrier 1766, and an annulus 1768. The second planetary gear set 1760 is configured to produce a certain gear ratio between the output shaft 1706 and the differential 1780. As illustrated, the sun gear 1762 is connected to the second clutch 1714. It is understood that the second planetary gear set 1760 can include any number and size of planet gears 1764 as desired. One of ordinary skill in the art should further understand that the planet gears 1764 may be mounted at various positions on the carrier 1766. As illustrated, each of the planet gears 1764 is in meshed engagement with the sun gear 1762 and the annulus 1768. Various methods of meshed engagement between each of the planet gears 1764, the sun gear 1762, and the annulus 1768 can be employed as desired.

In certain embodiments, the second planetary gear set 1760 is configured to produce a further reduction in the gear ratio between the output shaft 1706, the first planetary gear set 1740, and the differential 1780. It is understood, however, that the reduction in the gear ratio between the output shaft 1706, the first planetary gear set 1740, and the differential 1780 depends upon which one of the sun gear 1762, the planet gears 1764, and the annulus 1768 is operatively connected to the output shaft 1706, which one of the sun gear 1762, the planet gears 1764, and the annulus 1768 is stationary, and which one of the sun gear 1762, the planet gears 1764, and the annulus 1768 is operatively connected to the first planetary gear set 1740, and thereby the differential 1780. In the embodiment shown in FIG. 19, the sun gear 1762 is operatively connected to the output shaft 1706 via the second clutch 1714 when the second clutch 1714 is engaged, the planet gears 1764 are operatively connected to the first planetary gear set 1740 via the common shaft 1723, and thereby the differential case 1788 of the differential 1780 via the carrier 1766, and the annulus 1768 is stationary and fixedly mounted on a housing (not shown). For example, the annulus 1768 may be fixedly mounted on the axle housing, if desired.

In certain embodiments, the differential 1780 is rotatably supported within the axle housing via at least one bearing 1782. It is understood that the at least one bearing 1782 can be any type of bearing as desired such as a roller bearing, a ball bearing, a tapered bearing, and the like, for example. As illustrated, the differential 1780 includes two or more differential pinions 1786 disposed within the differential case 1788. The differential pinions 1786 are coupled with the differential case 1788 via a pinion shaft (not depicted). In an embodiment, the pinion shaft may comprise a cross member (not depicted). The differential pinions 1786 are in meshed engagement with first and second side gears 1790, 1792. The first and second side gears 1790, 1792 are coupled for rotation with the first and second half shafts 16, 18, respectively, shown in FIG. 1.

In operation, when a first gear ratio is desired, the actuator mechanism causes the first clutch 1710 to engage, while the second clutch 1714 remains disengaged. When the first clutch 1710 is engaged, the output shaft 1706 of the electric motor 1704 causes the common shaft 1723, the sun gear 1742 of the first planetary gear set 1740, and the carrier 1766 of the second planetary gear set 1760 coupled thereto, to rotate therewith. A rotation of the carrier 1766 of the second planetary gear set 1760 drives the sun gear 1762 thereof. However, no torque is transferred from the first planetary gear set 1740 to the second planetary gear set 1760 since the second clutch 1714 is disengaged. A rotation of the sun gear 1742 of the first planetary gear set 1740 drives the first planet gears 1744 thereof, and causes the carrier 1746 coupled thereto, to rotate therewith. A rotation of the carrier 1746 of the first planetary gear set 1740 simultaneously drives the second planet gears 1750 and causes the second planet gears 1750 to rotate therewith. A rotation of the second planet gears 1750 drives the differential case 1788, and thereby causes the differential case 1788 to rotate therewith. A rotation of the differential case 1788 further causes the first and second half shafts 16, 18 to rotate therewith. The rotation of the differential 1780 transfers a desired first torque from the output shaft 1706 to the first and second axle shafts 16, 18. When the electric drive axle 1700 is in a power generation mode, the torque transfer described above is reversed.

When a second gear ratio, which is greater than the first gear ratio, is desired, the actuator mechanism causes the second clutch 1714 to engage, while the first clutch 1710 remains disengaged. When the second clutch 1714 is engaged, the output shaft 1706 of the electric motor 1704 causes the sun gear 1762 of the second planetary gear set 1760 to rotate therewith. A rotation of the sun gear 1762 drives the planet gears 1764 of the second planetary gear set 1760, and causes the carrier 1766 coupled thereto, to rotate therewith. A rotation of the carrier 1766 of the second planetary gear set 1760 drives the common shaft 1723, and causes the sun gear 1742 of the first planetary gear set 1740 fixedly coupled to the 10 carrier 1766, to rotate therewith. A rotation of the sun gear 1742 of the first planetary gear set 1740 drives the first planet gears 1744 thereof, and causes the carrier 1746 coupled thereto, to rotate therewith. A rotation of the carrier 1746 of the first planetary gear set 1740 simultaneously drives the second planet gears 1750 and causes the second planet gears 1750 to rotate therewith. A rotation of the second planet gears 1750 drives the differential case 1788, and thereby causes the differential case 1788 to rotate therewith. A rotation of the differential case 1788 further causes the first and second half shafts 16, 18 to rotate therewith. The rotation of the differential 1780 transfers a desired second torque from the output shaft 1706, which is greater than the first torque, to the first and second axle shafts 16, 18. When the electric drive axle 1700 is in a power generation mode, the torque transfer described above is reversed.

Figure 20:
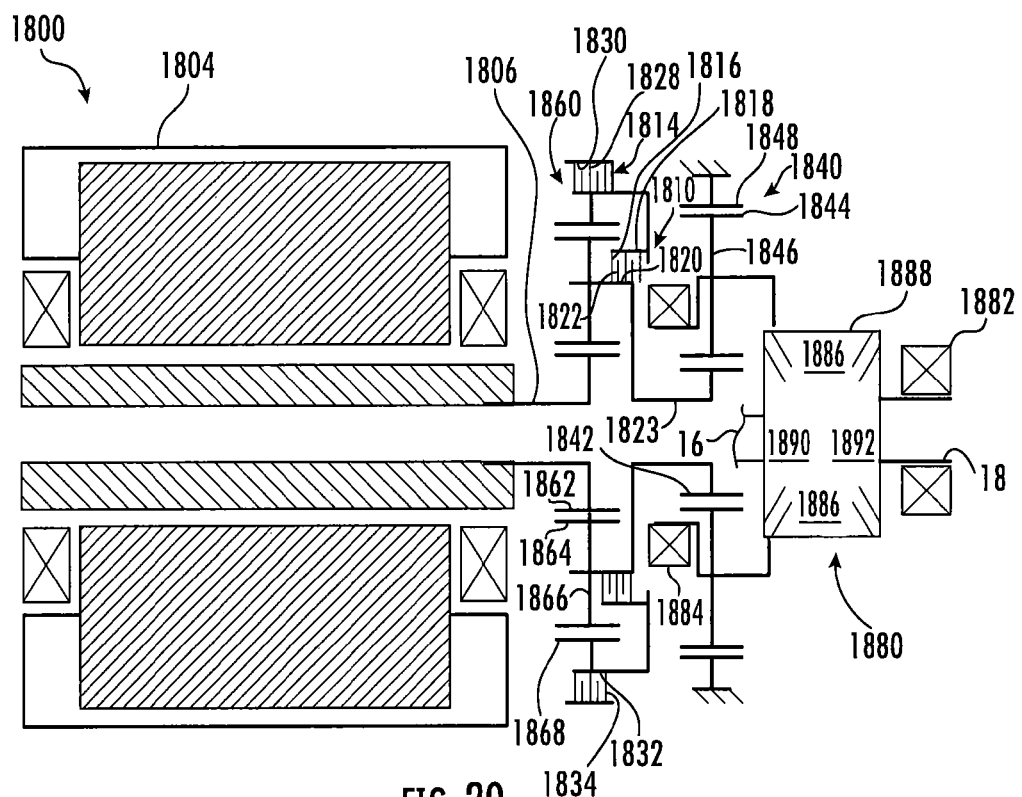
FIG. 20 is a schematic diagram of a portion of the electric drive axle shown in FIG. 1 according to another embodiment, including a first planetary gear set, a second planetary gear set, and a differential.

Referring now to the embodiment shown in FIG. 20, the vehicle 10 may include an electric drive axle 1800. The electric drive axle 1800 may comprise an integrated drive system. In an embodiment, the electric drive axle 1800 includes an electric motor 1804 (e.g., electromotor) coupled with a power source (not depicted). The electric motor 1804 may be a permanent magnet synchronous machine comprising a stator disposed concentrically about a rotor. The electric drive axle 1800 may additionally comprise an inverter (not depicted) for converting direct current to alternating current when the electric motor 1804 is utilized to drive the vehicle, and for converting alternating current to direct current when the vehicle decelerates. The electric motor 1804 may be referred to herein as a motor-generator. Further, the electric drive axle 1800 may include cooling fluid (not depicted) such as, but not limited to, automatic transmission fluid or axle oil integrated with the electric drive axle 1800 lubricant for cooling the electric motor 1804 and the inverter. In another embodiment (not depicted), the cooling fluid for the electric motor 1604 and the inverter may not be integrated with the axle oil. The electric drive may have either a co-axial (as shown) or off axis layout where the axle shaft connecting the wheel to the differential does not pass through the center or the motor but rather parallel to the motor axis.

A motor output shaft 1806 is coupled with the rotor of the electric motor 1804 for rotation therewith. In certain embodiments, the electric motor 1804 drives a first planetary gear set 1840 (described in further detail hereinafter) when a first clutch 1810 is engaged, or both the first planetary gear set 1840 and a second planetary gear set 1860 (described in further detail hereinafter) when a second clutch 1814 is engaged. In certain embodiments, only one of the clutches 1810, 1814 is engaged at any one time by at least one actuator mechanism. The at least one actuator mechanism can include an actuator, an additional gear set and a roller and ramp assembly. The actuator may be a reversible electric motor as it is compact and easily controllable. It is understood that any other appropriate type of actuator and actuator mechanism may be used such as hydraulic, mechanical, or pneumatic actuators, for example.

In the embodiment shown, the first clutch 1810 includes a set of clutch plates 1816 extending radially inward from a first clutch hub 1818. The clutch plates 1816 are mounted for axial movement with the first clutch hub 1818. The first clutch 1810 further includes a second clutch hub 1820. The second clutch hub 1820 has a set of clutch plates 1822 extending radially outward from the second clutch hub 1820. The clutch plates 1822 interleave with the clutch plates 1816. It should be appreciated that the first clutch 1810 may include any number of clutch plates 1816, 1822 as desired. The second clutch hub 1820 is connected to a common shaft 1823. The common shaft 1823 is disposed co-axially with the output shaft 1806 and may be rotatably supported in an axle housing (not depicted) by at least one bearing (not depicted). It is understood that the at least one bearing can be any type of bearing as desired such as a roller bearing, a ball bearing, a tapered bearing, and the like, for example. The first planetary gear set 1840 is operably connected to the first clutch 1810.

Similarly, the second clutch 1814 includes a set of clutch plates 1828 extending radially inward from a first clutch hub 1830. The clutch plates 1828 are mounted for axial movement with the first clutch hub 1830. The second clutch 1814 further includes a second clutch hub 1832 having a set of clutch plates 1834 extending radially outward from the second clutch hub 1832. The clutch plates 1834 interleave with the clutch plates 1828. It should also be appreciated that the second clutch 1814 may include any number of clutch plates 1828, 1834 as desired. The second planetary gear set 1860 (described in further detail hereinafter) is operably connected to the second clutch 1814.

In the embodiment shown, the first planetary gear set 1840 includes a sun gear 1842, a plurality of planet gears 1844 mounted on a carrier 1846, and an annulus 1848. As illustrated, the sun gear 1842 is integrally formed with the common shaft 1823. It is understood that the sun gear 1842 may be a separate and distinct component of the first planetary gear set 1840 and coupled to the common shaft 1823, if desired. It is understood that the first planetary gear set 1840 can include any number and size of planet gears 1844 as desired. One of ordinary skill in the art should further understand that the planet gears 1844 may be mounted at various positions on the carrier 1846. As illustrated, each of the planet gears 1844 is in meshed engagement with the sun gear 1842 and the annulus 1848. Various methods of meshed engagement between each of the planet gears 1844, the sun gear 1842, and the annulus 1848 can be employed as desired.

The first planetary gear set 1840 is configured to produce a certain gear ratio between the output shaft 1806 and a differential 1880. In certain embodiments, the first planetary gear set 1840 is configured to produce a reduction in the gear ratio between the output shaft 1806 and the differential 1880. It is understood, however, that the reduction in the gear ratio between the output shaft 1806 and the differential 1880 depends upon which one of the sun gear 1842, the planet gears 1844, and the annulus 1848 is operatively connected to the output shaft 1806, which one of the sun gear 1842, the planet gears 1844, and the annulus 1848 is stationary, and which one of the sun gear 1842, the planet gears 1844, and the annulus 1848 is operatively connected to the differential 1880. In the embodiment shown in FIG. 20, the sun gear 1842 is operatively connected to the output shaft 1806 via the common shaft 1823 when the first clutch 1810 is engaged, the planet gears 1844 are operatively connected to a differential case 1888 of the differential 1880 via the carrier 1846, and the annulus 1848 is stationary and fixedly mounted on a housing (not shown). For example, the annulus 1848 may be fixedly mounted on the axle housing, if desired.

In certain embodiments, the second planetary gear set 1860 includes the sun gear 1862, a plurality of planet gears 1864 mounted on a carrier 1866, and an annulus 1868. The second planetary gear set 1860 is configured to produce a certain gear ratio between the output shaft 1806 and the differential 1880. As illustrated, the annulus 1868 is connected to the second clutch 1814. It is understood that the second planetary gear set 1860 can include any number and size of planet gears 1864 as desired. One of ordinary skill in the art should further understand that the planet gears 1864 may be mounted at various positions on the carrier 1866. As illustrated, each of the planet gears 1864 is in meshed engagement with the sun gear 1862 and the annulus 1868. Various methods of meshed engagement between each of the planet gears 1864, the sun gear 1862, and the annulus 1868 can be employed as desired.

In certain embodiments, the second planetary gear set 1860 is configured to produce a further reduction in the gear ratio between the output shaft 1806, the first planetary gear set 1840, and the differential 1880. It is understood, however, that the reduction in the gear ratio between the output shaft 1806, the first planetary gear set 1840, and the differential 1880 depends upon which one of the sun gear 1862, the planet gears 1864, and the annulus 1868 is operatively connected to the output shaft 1806, which one of the sun gear 1862, the planet gears 1864, and the annulus 1868 is stationary, and which one of the sun gear 1862, the planet gears 1864, and the annulus 1868 is operatively connected to the first planetary gear set 1840, and thereby the differential 1880. In the embodiment shown in FIG. 20, the sun gear 1862 is operatively connected to the output shaft 1806, the planet gears 1864 are operatively connected to the first planetary gear set 1840 via the common shaft 1823, and thereby the differential case 1888 of the differential 1880 via the carrier 1866, and the annulus 1868 is stationary when the second clutch 1814 is engaged. For example, the second clutch 1814 may be mounted on the axle housing, if desired.

In certain embodiments, the differential 1880 is rotatably supported within the axle housing via first and second bearings 1882, 1884. It is understood that each of the bearings 1882, 1884 can be any type of bearing as desired such as a roller bearing, a ball bearing, a tapered bearing, and the like, for example. As illustrated, the differential 1880 includes two or more differential pinions 1886 disposed within the differential case 1888. The differential pinions 1886 are coupled with the differential case 1888 via a pinion shaft (not depicted). In an embodiment, the pinion shaft may comprise a cross member (not depicted). The differential pinions 1886 are in meshed engagement with first and second side gears 1890, 1892. The first and second side gears 1890, 1892 are coupled for rotation with the first and second half shafts 16, 18, respectively, shown in FIG. 1.

In operation, when a first gear ratio is desired, the actuator mechanism causes the first clutch 1810 to engage, while the second clutch 1814 remains disengaged. When the first clutch 1810 is engaged, the output shaft 1806 of the electric motor 1804 causes the sun gear 1862 of the second planetary gear set 1860 coupled thereto, to rotate therewith. A rotation of the sun gear 1862 and causes the carrier 1866 coupled thereto, to rotate therewith. Since the second clutch 1814 is disengaged, the annulus 1868 freely rotates, and therefore the second planetary gear set 1860 does not cause a reduction in torque from the output shaft 1806. A rotation of the carrier 1866 of the second planetary gear set 1860 causes the common shaft 1823 and the sun gear 1842 of the first planetary gear set 1840 coupled thereto, to rotate therewith. A rotation of the sun gear 1842 drives the planet gears 1844 of the first planetary gear set 1840, and causes the carrier 1846 coupled thereto, to rotate therewith. A rotation of the carrier 1846 of the first planetary gear set 1840 drives the differential case 1888 and simultaneously causes the differential case 1888 to rotate therewith. A rotation of the differential case 1888 further causes the first and second half shafts 16, 18 to rotate therewith. The rotation of the differential 1880 transfers a desired first torque from the output shaft 1806 to the first and second axle shafts 16, 18. When the electric drive axle 1800 is in a power generation mode, the torque transfer described above is reversed.

When a second gear ratio, which is greater than the first gear ratio, is desired, the actuator mechanism causes the second clutch 1814 to engage, while the first clutch 1810 remains disengaged. When the second clutch 1814 is engaged, the output shaft 1806 of the electric motor 1804 causes the sun gear 1862 of the second planetary gear set 1860 to rotate therewith. Since the second clutch 1814 is engaged, the annulus 1868 is stationary, and a rotation of the sun gear 1862 drives the planet gears 1864 of the second planetary gear set 1860 and causes the carrier 1866 coupled thereto, to rotate therewith. Accordingly, the second planetary gear set 1860 causes a reduction in torque from the output shaft 1806. A rotation of the carrier 1866 of the second planetary gear set 1860 drives the common shaft 1823, and causes the sun gear 1842 of the first planetary gear set 1840 coupled thereto, to rotate therewith. A rotation of the sun gear 1842 drives the planet gears 1844 of the first planetary gear set 1840, and causes the carrier 1846 coupled thereto, to rotate therewith. A rotation of the carrier 1846 of the first planetary gear set 1840 drives the differential case 1888 and simultaneously causes the differential case 1888 to rotate therewith. A rotation of the differential case 1888 further causes the first and second half shafts 16, 18 to rotate therewith. The rotation of the differential 1880 transfers a desired second torque from the output shaft 1806, which is greater than the first torque, to the first and second axle shafts 16, 18. When the electric drive axle 1800 is in a power generation mode, the torque transfer described above is reversed.

Figure 21:
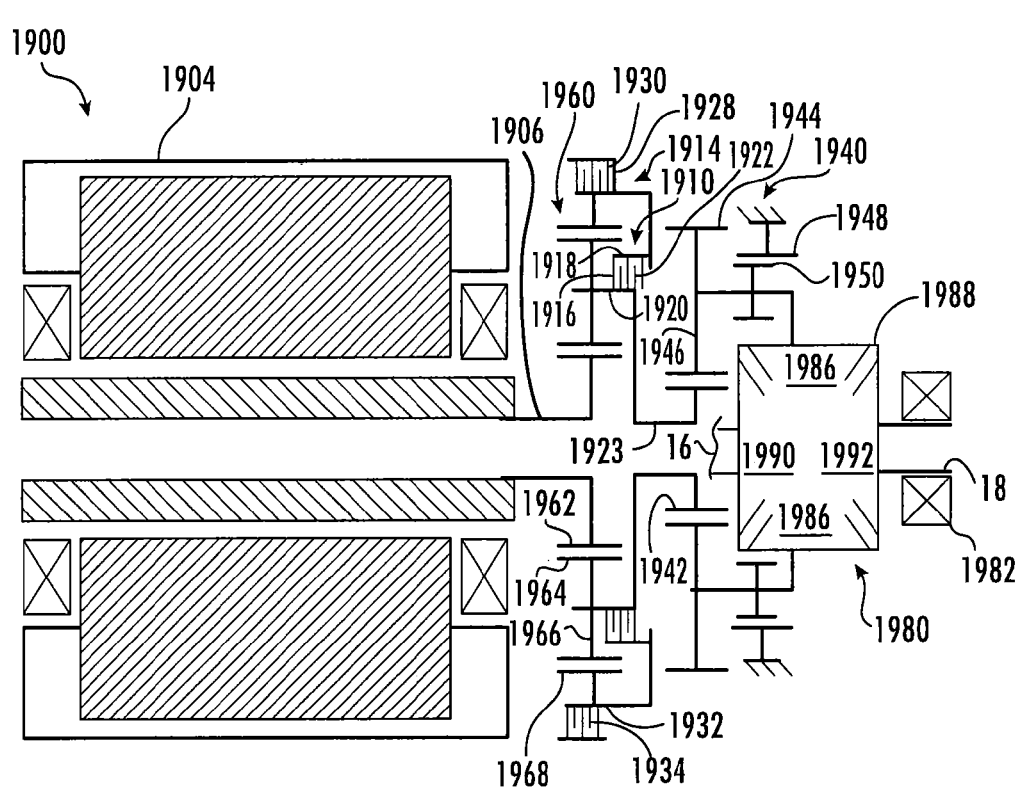
FIG. 21 is a schematic diagram of a portion of the electric drive axle shown in FIG. 1 according to yet another embodiment, including a first planetary gear set, a second planetary gear set, and a differential.

Referring now to the embodiment shown in FIG. 21, the vehicle 10 may include an electric drive axle 1900. The electric drive axle 1900 may comprise an integrated drive system. In an embodiment, the electric drive axle 1900 includes an electric motor 1904 (e.g., electromotor) coupled with a power source (not depicted). The electric motor 1904 may be a permanent magnet synchronous machine comprising a stator disposed concentrically about a rotor. The electric drive axle 1900 may additionally comprise an inverter (not depicted) for converting direct current to alternating current when the electric motor 1904 is utilized to drive the vehicle, and for converting alternating current to direct current when the vehicle decelerates. The electric motor 1904 may be referred to herein as a motor-generator. Further, the electric drive axle 1900 may include cooling fluid (not depicted) such as, but not limited to, automatic transmission fluid or axle oil integrated with the electric drive axle 1900 lubricant for cooling the electric motor 1904 and the inverter. In another embodiment (not depicted), the cooling fluid for the electric motor 1904 and the inverter may not be integrated with the axle oil. The electric drive may have either a co-axial (as shown) or off axis layout where the axle shaft connecting the wheel to the differential does not pass through the center or the motor but rather parallel to the motor axis.

A motor output shaft 1906 is coupled with the rotor of the electric motor 1904 for rotation therewith. In certain embodiments, the electric motor 1904 drives a first planetary gear set 1940 (described in further detail hereinafter) when a first clutch 1810 is engaged, or both the first planetary gear set 1940 and a second planetary gear set 1960 (described in further detail hereinafter) when a second clutch 1914 is engaged. In certain embodiments, only one of the clutches 1910,1914 is engaged at any one time by at least one actuator mechanism. The at least one actuator mechanism can include an actuator, an additional gear set and a roller and ramp assembly. The actuator may be a reversible electric motor as it is compact and easily controllable. It is understood that any other appropriate type of actuator and actuator mechanism may be used such as hydraulic, mechanical, or pneumatic actuators, for example.

In the embodiment shown, the first clutch 1910 includes a set of clutch plates 1916 extending radially inward from a first clutch hub 1918. The clutch plates 1916 are mounted for axial movement with the first clutch hub 1918. The first clutch 1910 further includes a second clutch hub 1920. The second clutch hub 1920 has a set of clutch plates 1922 extending radially outward from the second clutch hub 1920. The clutch plates 1922 interleave with the clutch plates 1916. It should be appreciated that the first clutch 1910 may include any number of clutch plates 1916, 1922 as desired. The second clutch hub 1920 is connected to a common shaft 1923. The common shaft 1923 is disposed co-axially with the output shaft 1906 and may be rotatably supported in an axle housing (not depicted) by at least one bearing (not depicted). It is understood that the at least one bearing can be any type of bearing as desired such as a roller bearing, a ball bearing, a tapered bearing, and the like, for example. The first planetary gear 1940 is operably connected to the first clutch 1910.

Similarly, the second clutch 1914 includes a set of clutch plates 1928 extending radially inward from a first clutch hub 1930. The clutch plates 1928 are mounted for axial movement with the first clutch hub 1930. The second clutch 1914 further includes a second clutch hub 1932 having a set of clutch plates 1934 extending radially outward from the second clutch hub 1932. The clutch plates 1934 interleave with the clutch plates 1928. It should also be appreciated that the second clutch 1914 may include any number of clutch plates 1928, 1934 as desired. The second planetary gear set 1960 (described in further detail hereinafter) is operably connected to the second clutch 1914. In the embodiment shown, the first planetary gear set 1940 includes a sun gear 1942, a plurality of first planet gears 1944 mounted on a carrier 1946, a plurality of second planet gears 1950 fixedly coupled to the carrier 1946, and an annulus 1948. As illustrated, the sun gear 1942 is integrally formed with the common shaft 1923. It is understood, however, that the sun gear 1942 may be a separate and distinct component of the first planetary gear set 1940 and coupled to the common shaft 1923, if desired. It is understood that the first planetary gear set 1940 can include any number and size of first and second planet gears 1944, 1950, respectively, as desired. One of ordinary skill in the art should further understand that the first and second planet gears 1944, 1950 may be mounted at various positions on the carrier 1946. As illustrated, each of the first planet gears 1944 is in meshed engagement with the sun gear 1942 and each of the second planet gears 1950 is in meshed engagement with the annulus 1948. Various methods of meshed engagement between each of the first planet gears 1944 and the sun gear 1942, and between each of the second planet gears 1950 and the annulus 1948 can be employed as desired.

The first planetary gear set 1940 is configured to produce a certain gear ratio between the output shaft 1906 and a differential 1980. In certain embodiments, the first planetary gear set 1940 is configured to produce a reduction in the gear ratio between the output shaft 1906 and the differential 1980. It is understood, however, that the reduction in the gear ratio between the output shaft 1906 and the differential 1980 depends upon which one of the sun gear 1942, the first planet gears 1944, the second planet gears 1950, and the annulus 1948 is operatively connected to the output shaft 1906, which one of the sun gear 1942, the first planet gears 1944, the second planet gears 1950, and the annulus 1948 is stationary, and which one of the sun gear 1942, the first planet gears 1944, the second planet gears 1950, and the annulus 1948 is operatively connected to the differential 1980. In the embodiment shown in FIG. 21, the sun gear 1942 is operatively connected to the output shaft 1906 via the common shaft 1923 when the first clutch 1910 is engaged, the first planet gears 1944 and second planet gears 1950 are operatively connected to a differential case 1988 of the differential 1980 via the carrier 1946, and the annulus 1948 is stationary and fixedly mounted on a housing (not shown). For example, the annulus 1948 may be fixedly mounted on the axle housing, if desired. In certain embodiments, the second planet gears 1950 are operably coupled to the differential case 1988 of the differential 1988 for rotation therewith.

In certain embodiments, the second planetary gear set 1960 includes the sun gear 1962, a plurality of planet gears 1964 mounted on a carrier 1966, and an annulus 1968. The second planetary gear set 1960 is configured to produce a certain gear ratio between the output shaft 1906 and the differential 1980. As illustrated, the annulus 1968 is connected to the second clutch 1914. It is understood that the second planetary gear set 1960 can include any number and size of planet gears 1964 as desired. One of ordinary skill in the art should further understand that the planet gears 1964 may be mounted at various positions on the carrier 1966. As illustrated, each of the planet gears 1964 is in meshed engagement with the sun gear 1962 and the annulus 1968. Various methods of meshed engagement between each of the planet gears 1964, the sun gear 1962, and the annulus 1968 can be employed as desired.

In certain embodiments, the second planetary gear set 1960 is configured to produce a further reduction in the gear ratio between the output shaft 1906, the first planetary gear set 1940, and the differential 1980. It is understood, however, that the reduction in the gear ratio between the output shaft 1906, the first planetary gear set 1940, and the differential 1980 depends upon which one of the sun gear 1962, the planet gears 1964, and the annulus 1968 is operatively connected to the output shaft 1906, which one of the sun gear 1962, the planet gears 1964, and the annulus 1968 is stationary, and which one of the sun gear 1962, the planet gears 1964, and the annulus 1968 is operatively connected to the first planetary gear set 1940, and thereby the differential 1980. In the embodiment shown in FIG. 21, the sun gear 1962 is operatively connected to the output shaft 1906, the planet gears 1964 are operatively connected to the first planetary gear set 1940 via the common shaft 1923, and thereby the differential case 1988 of the differential 1980 via the carrier 1966, and the annulus 1968 is stationary when the second clutch 1914 is engaged. For example, the second clutch 1914 may be mounted on the axle housing, if desired.

In certain embodiments, the differential 1980 is rotatably supported within the axle housing via at least one bearing 1982. It is understood that the at least one bearing 1982 can be any type of bearing as desired such as a roller bearing, a ball bearing, a tapered bearing, and the like, for example. As illustrated, the differential 1980 includes two or more differential pinions 1986 disposed within the differential case 1988. The differential pinions 1986 are coupled with the differential case 1988 via a pinion shaft (not depicted). In an embodiment, the pinion shaft may comprise a cross member (not depicted). The differential pinions 1986 are in meshed engagement with first and second side gears 1990, 1992. The first and second side gears 1990, 1992 are coupled for rotation with the first and second half shafts 16, 18, respectively, shown in FIG. 1.

In operation, when a first gear ratio is desired, the actuator mechanism causes the first clutch 1910 to engage, while the second clutch 1914 remains disengaged. When the first clutch 1910 is engaged, the output shaft 1906 of the electric motor 1904 causes the sun gear 1962 of the second planetary gear set 1960 coupled thereto, to rotate therewith. A rotation of the sun gear 1962 drives the planet gears 1964 of the second planetary gear set 1960, and causes the carrier 1966 coupled thereto, to rotate therewith. Since the second clutch 1914 is disengaged, the annulus 1968 freely rotates, and therefore the second planetary gear set 1960 does not cause a reduction in torque from the output shaft 1906. A rotation of the carrier 1966 of the second planetary gear set 1960 causes the common shaft 1923 and the sun gear 1942 of the first planetary gear set 1940 coupled thereto, to rotate therewith. A rotation of the sun gear 1942 of the first planetary gear set 1940 drives the first planet gears 1944 thereof, and causes the carrier 1946 coupled thereto, to rotate therewith. A rotation of the carrier 1946 of the first planetary gear set 1940 simultaneously drives the second planet gears 1950 and causes the second planet gears 1950 to rotate therewith. A rotation of the second planet gears 1950 drives the differential case 1988, and thereby causes the differential case 1988 to rotate therewith. A rotation of the differential case 1988 further causes the first and second half shafts 16, 18 to rotate therewith. The rotation of the differential 1980 transfers a desired first torque from the output shaft 1906 to the first and second axle shafts 16, 18. When the electric drive axle 1900 is in a power generation mode, the torque transfer described above is reversed.

When a second gear ratio, which is greater than the first gear ratio, is desired, the actuator mechanism causes the second clutch 1914 to engage, while the first clutch 1910 remains disengaged. When the second clutch 1914 is engaged, the output shaft 1906 of the electric motor 1904 causes the sun gear 1962 of the second planetary gear set 1960 to rotate therewith. Since the second clutch 1914 is engaged, the annulus 1968 is stationary, and a rotation of the sun gear 1962 drives the planet gears 1964 of the second planetary gear set 1960 and causes the carrier 1966 coupled thereto, to rotate therewith. Accordingly, the second planetary gear set 1960 causes a reduction in torque from the output shaft 1906. A rotation of the carrier 1966 of the second planetary gear set 1960 drives the common shaft 1923, and causes the sun gear 1942 of the first planetary gear set 1940 fixedly coupled to the carrier 1966, to rotate therewith. A rotation of the sun gear 1942 of the first planetary gear set 1940 drives the first planet gears 1944 thereof, and causes the carrier 1946 coupled thereto, to rotate therewith. A rotation of the carrier 1946 of the first planetary gear set 1940 simultaneously drives the second planet gears 1950 and causes the second planet gears 1950 to rotate therewith. A rotation of the second planet gears 1950 drives the differential case 1988 and simultaneously causes the differential case 1988 to rotate therewith. A rotation of the differential case 1988 further causes the first and second half shafts 16, 18 to rotate therewith. The rotation of the differential 1980 transfers a desired second torque from the output shaft 1906, which is greater than the first torque, to the first and second axle shafts 16, 18. When the electric drive axle 1900 is in a power generation mode, the torque transfer described above is reversed.

It should be appreciated that various types of differentials may be employed for each of the differentials 180, 280, 380, 480, 580, 680, 780, 880, 980, 1160, 1280, 1380, 1480, 1580, 1680, 1780, 1880, 1980 such as a locking differential and a torque vectoring dual clutch, for example.

While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

The invention claimed is:

1. A drive axle, comprising:
   an electric motor having an output shaft;
   a first gear positioned on the output shaft;
   a first idler shaft;
   a second gear positioned on the idler shaft and engaged with the first gear;
   at least one clutch selectively engaged with a gear of the output shaft or the idler shaft, the at least one clutch movable between a first position to select a first gear ratio and a second position to select a second gear ratio;

a differential engaged with two axle half shafts;

a third gear positioned on the output shaft and a fourth gear positioned on the first idler shaft and engaged with the third gear; and a second idler shaft and a fifth gear of the second idler shaft engaged with a gear of the first idler shaft.

2. The drive axle of claim 1, further comprising a planetary gear set positioned on the idler shaft, and the at least one clutch comprising a first clutch selectively engaged with the idler shaft and a second clutch selectively engaged with a carrier of the planetary gear set, engagement of the first clutch selecting the first gear ratio, and engagement of the second clutch selecting the second gear ratio.

3. The drive axle of claim 2, wherein a gear coupled to the carrier of the planetary gear set is engaged with a gear of the differential.

4. The drive axle of claim 1, further comprising a third gear positioned on the output shaft and a fourth gear positioned on the idler shaft and engaged with the third gear, and wherein the at least one clutch is positioned on the output shaft, engaged with the first gear in the first position to select the first gear ratio, and engaged with the third gear in the second position to select the second gear ratio.

5. The drive axle of claim 1, further comprising a third gear positioned on the output shaft and a fourth gear positioned on the idler shaft and engaged with the third gear, and wherein the at least one clutch comprises a first clutch and a second clutch, the first clutch selectively engages the first gear to the output shaft to select the first gear ratio, the second clutch selectively engages the fourth gear to the idler shaft to select the second gear ratio.

6. The drive axle of claim 1, further comprising a sixth gear positioned on the second idler shaft, and the sixth gear engaged with the differential.

7. The drive axle of claim 1, further comprising a third gear positioned on the output shaft and a fourth gear positioned on the idler shaft and engaged with the third gear, and wherein the differential engages with the second gear or the fourth gear.

8. A drive axle, comprising:

an electric motor having an output shaft;

a first gear positioned on the output shaft;

a first idler shaft;

a second gear positioned on the idler shaft and engaged with the first gear;

at least one clutch selectively engaged with a gear of the output shaft or the idler shaft, the at least one clutch movable between a first position to select a first gear ratio and a second position to select a second gear ratio;

a differential engaged with a gear of the idler shaft and with two axle half shafts;

a third gear positioned on the output shaft and a fourth gear positioned on the first idler shaft and engaged with the third gear; and a second idler shaft and a fifth gear of the second idler shaft engaged with a gear of the first idler shaft.

9. The drive axle of claim 8, further comprising a third gear positioned on the output shaft and a fourth gear positioned on the idler shaft and engaged with the third gear, and wherein the at least one clutch comprises a first clutch and a second clutch, the first clutch selectively engages the first gear to select the first gear ratio, the second clutch selectively engages the third gear to select the second gear ratio.

10. The drive axle of claim 8, further comprising a third gear positioned on the output shaft and a fourth gear positioned on the idler shaft and engaged with the third gear, and wherein the at least one clutch comprises a first clutch and a second clutch, the first clutch selectively engages the first gear to select the first gear ratio, the second clutch selectively engages the fourth gear to select the second gear ratio.

11. The drive axle of claim 10, wherein the differential engages with the second gear or the fourth gear.

12. The drive axle of claim 1, further comprising a sixth gear positioned on the second idler shaft, and the sixth gear engaged with the differential.

13. The drive axle of claim 8, further comprising a third gear positioned on the output shaft and a fourth gear positioned on the idler shaft and engaged with the third gear, and a fifth gear positioned on the idler shaft engaged with the differential.

* * * * *